(12) United States Patent
Sachedina

(10) Patent No.: US 7,912,747 B2
(45) Date of Patent: Mar. 22, 2011

(54) FACILITY MANAGEMENT SYSTEM AND METHOD

(75) Inventor: Sher (Karim) M. Sachedina, Solon, OH (US)

(73) Assignee: Okraa, LLC, Solon, OH (US)

( * ) Notice: Subject to any disclaimer, the term of this patent is extended or adjusted under 35 U.S.C. 154(b) by 1055 days.

(21) Appl. No.: 10/830,655

(22) Filed: Apr. 23, 2004

(65) Prior Publication Data

US 2004/0196740 A1    Oct. 7, 2004

Related U.S. Application Data

(63) Continuation of application No. 09/632,949, filed on Aug. 5, 2000, now abandoned.

(51) Int. Cl.
*G06F 17/30* (2006.01)
(52) U.S. Cl. ............................................. 705/10; 705/32
(58) Field of Classification Search .................... 705/32, 705/7, 10, 8
See application file for complete search history.

(56) References Cited

U.S. PATENT DOCUMENTS

| | | | | |
|---|---|---|---|---|
| 5,325,292 A * | 6/1994 | Crockett | ........................... | 705/9 |
| 5,832,456 A * | 11/1998 | Fox et al. | ......................... | 705/10 |
| 5,918,219 A * | 6/1999 | Isherwood | ....................... | 705/37 |
| 5,953,707 A * | 9/1999 | Huang et al. | ................... | 705/10 |
| 6,029,131 A * | 2/2000 | Bruckert | ....................... | 704/260 |
| 6,032,125 A * | 2/2000 | Ando | ............................. | 705/10 |
| 6,199,047 B1 * | 3/2001 | Dimino et al. | .................. | 705/10 |
| 6,249,770 B1 * | 6/2001 | Erwin et al. | ..................... | 705/10 |
| 6,859,529 B2 * | 2/2005 | Duncan et al. | ............. | 379/266.1 |

OTHER PUBLICATIONS

NPL 705 Search Template Report Jun. 9, 2010.*
International Search Report mailed Nov. 16, 2001 for PCT Application No. PCT/US01/24662, 1 page.
Office Action mailed Dec. 19, 2001, for U.S. Appl. No. 09/632,949, 8 pages.
Office Action mailed May 20, 2002, for U.S. Appl. No. 09/632,949, 7 pages.

* cited by examiner

*Primary Examiner* — Ronald Laneau
(74) *Attorney, Agent, or Firm* — Turocy & Watson, LLP

(57) ABSTRACT

A system and method are disclosed for aligning stored data in a matter that may facilitate budgeting and/or forecasting. A definable calendar period is provided which has a starting day. The starting day is applied to the stored data to locate and align each of a plurality of time periods associated with the stored data so that each time period has a starting day that matches the starting day of the calendar period.

27 Claims, 42 Drawing Sheets

| Attribute Name | Type | Size | Reference | Key? | Description |
|---|---|---|---|---|---|
| COA_ID | Integer | 1 | | Primary | |
| COA_COL1 | varchar | 25 | | | |
| COA_COL2 | varchar | 25 | | | |
| COA_COL3 | varchar | 25 | | | |
| COA_COL4 | varchar | 25 | | | |
| COA_COL5 | varchar | 25 | | | |
| COA_COL6 | varchar | 25 | | | |
| COA_COL7 | varchar | 25 | | | |
| COA_COL8 | varchar | 25 | | | |
| COA_COL9 | varchar | 25 | | | |
| COA_COL10 | varchar | 25 | | | |
| Description | varchar | 255 | | | |
| COA_CONCAT_VAL | varchar | 260 | | | |
| Status | Bit | | | | |
| Created_By | Integer | | | | |
| Created_On | Datetime | | | | |
| Updated_By | Integer | | | | |
| Updated_On | Datetime | | | | |

FIG. 5

Account Creation

Account Level: [    ▼] — 320

| COAID | Description | Account Level | Account Type |
|---|---|---|---|
| BEA | Beachwood | Site | Asset |
| CLA | Airport | Site | Asset |
| COL | Columbus | Site | Asset |
| MAR | Marriot | Site | Revenue |
| TCS | Casa Serena | Site | Asset |
| 1 | | Department | |
| 10 | Rooms | Department | Revenue |
| 20 | Restaurant | Department | Expense |
| 30 | Kitchen | Department | Expense |
| 1001 | | Account | |
| 3000 | Transient Rooms | Account | Revenue |
| 3001 | Suites | Account | Expense |

FIG. 7

Profile Details ← 652      ← 650

| | |
|---|---|
| Profile Type | Competition |
| Profile Name | New Supply |
| Profile Description | Hotel 1 |
| Profile Date: | mm/dd/yyyy to mm/dd/yyyy |
| Distance | 2 Miles |
| SWOT | T |
| SWOT Details | Dilute Demand |

| Attributes | Avg. -2 | Avg. -1 | Avg. -0 |
|---|---|---|---|
| Available Rooms | | | |
| Fitness Center | | | |
| Suites | | | |
| Meeting Room Sq. Ft. | | | |
| Ball Room Sq. Ft. | | | |
| Expected Occupancy | | | |
| Expected Transient Mix | | | |
| Weekday Rate | | | |
| Weekend Rate | | | |
| Opening Rate | | | |
| Season 1 Average Rate | | | |
| Season 2 Average Rate | | | |
| Season 3 Average Rate | | | |
| Season 4 Average Rate | | | |
| Location Rating | | | |
| Overall Product Rating | | | |
| Guest Room Quality Rating | | | |
| Brand Recognition Rating | | | |
| Service Quality Rating | | | |
| Meeting Room Space Rating | | | |
| Ball Room Space Rating | | | |

654 brackets the Attributes rows; 656, 658, 660 label the three Avg. columns.

FIG. 20

ACTION PLAN — 690

| Field | Value |
|---|---|
| Action Name: | ACTION PLAN1 — 692 |
| | KRA Name: TESTKRA1 — 694 |
| | 696 |
| Description: 698 | FIRST ACTION |
| Account From: 700 | CLA20 |
| | From Date: MM/DD/YYYY — 704 |
| Account To: 702 | CLA20 |
| | To Date: MM/DD/YYYY |
| Accumulator: 706 | |
| | Due Date: MM/DD/YYYY |
| Assigned To: 708 | SALES MANAGER |
| | Completion Date: MM/DD/YYYY |
| Status: 710 | ACTIVE |
| Status Comment: | |

IMPACT TYPE — 712

- ● Percentage    ○ Absolute Value
- Method: METHOD1 — 714       Impact Value: 111
- Impact %: 11

Buttons — 716: ADD, EDIT, DELETE, SAVE, CANCEL

<<  <  >  >>    << PROFILES — 718    < KRAs — 720

Fig. 22

KRA/ACTION PLAN NAMES — 730

KRA NAMES — 736, 732, 738, 740

| KRA NAME | PROFILE TYPE | |
|---|---|---|
| ▶ TESTKRA1 | ▼ | Add |
| TESTKRA2 | | Edit |
| TESTKRA3 | | Delete |
| TESTKRA4 | | Save |
| | | Cancel |

ACTION PLAN NAMES — 742, 734, 744, 746

| ACTION PLAN NAME | PROFILE TYPE | |
|---|---|---|
| ▶ ACTION PLAN1 | ▼ | Add |
| ACTION PLAN2 | | Edit |
| ACTION PLAN3 | | Delete |
| ACTION PLAN4 | | Save |
| | | Cancel |

Fig. 23

FACILITY MANAGEMENT SYSTEM AND METHOD

CROSS-REFERENCE TO RELATED APPLICATIONS

This application is a continuation of U.S. application Ser. No. 09/632,949, filed Aug. 5, 2000 now abandoned, entitled System and Method of Aligning Data the entirety of which is incorporated herein by reference.

TECHNICAL FIELD

The present invention generally relates to computer programming and, more particularly, to a system and method to align stored data to facilitate analysis and processing of the data.

BACKGROUND OF THE INVENTION

In order to remain competitive in any business, the business and each of its individual parts or business units must run efficiently to meet or exceed the demands of its customers. For example, in the hospitality industry, a typical facility, such as a hotel, spa, or other hospitality facility, includes several areas of operation. Each area of operation requires a certain level of personnel, maintenance, supplies, and management during each year. In the hospitality industry the day-to-day needs of each area of operation are subject to significant change, which the management responsible for each area of the facility must accommodate. Accordingly, an important aspect of operation is budgeting and forecasting to properly adapt to the changing circumstances so as to maximize profits.

A facility, such as a hotel, may include several business units, each of which may have an impact on hotel operation. The hotel may have several points of sale (POS), such as restaurants, bars, etc., where customers perform commercial transactions. Also within a hotel are other business units that provide other hotel services to customers. Each business unit may maintain a record of its associated activities, which may be stored in an associated computer database. Other aspects of hotel operation, such as payroll and accounts payable, sales and catering, etc., also employ a system for accumulating information on each respective aspect of its operation. Each system usually operates independently, each maintaining its own records, which may be kept on paper or stored in computer files.

Historically, there has been little centralized budget planning in the hospitality industry. For example, each business unit within a hotel may have its own budget. Moreover, each budget may be produced with a different tool. That is, one business unit may keep its books using pen and paper, another business unit may employ a commercially available spread sheet, and yet another may utilize a commercial software business package to keep its books. Even when business Units may keep their books electronically and employ the same software (e.g., a spread sheet), a department head or other individual responsible for the performing a budget analysis and/or forecasting may require different data fields pertinent to that unit's budgeting and/or forecasting. Additionally, each data set may be stored in a unique record format selected by that individual.

As a result, diverse databases, file systems, and data sources, often employing several unique record formats, may have evolved for numerous business units within a single company or other type of business organization. Consequently, within a management organization responsible for several business units, the diversity of databases and record formats is compounded as various databases, computer file systems and data sources may have evolved, thus resulting in numerous unique and inconsistent record formats. As a result, it may take several individuals weeks or even months to enter appropriate data and prepare an annual budget for a given facility. Moreover, accurate forecasting may further be hindered, as it tends to be complicated to correlate historical data among such diverse types of data.

SUMMARY OF THE INVENTION

The present invention relates to a system and method to align calendars and data associated with each calendar.

One aspect of the present invention provides a system for arranging stored data to facilitate analysis of the stored data. The system includes a calendar alignment function programmed to align each of a plurality of time periods associated with the stored data relative to a starting day of a calendar time period, such that each day in each of the plurality of time periods is aligned with a corresponding day in the calendar time period. Another aspect of the present invention provides a computer-readable medium having computer-executable instructions. The computer executable instructions are for performing the steps of defining a starting day for a selectable calendar period and locating a day in each of a plurality of time periods associated with stored data that matches the defined starting day of the selectable calendar period, the stored data having a plurality of records stored by date. Each of the plurality of time periods of the stored data is aligned so as to have a starting day that matches the defined starting day of the selectable calendar period, whereby each day associated with each of the plurality of time periods is aligned with a corresponding day of the selectable calendar period.

Still another aspect of the present invention provides a method for arranging stored data to facilitate analysis thereof. The method includes defining a starting day for a calendar period and locating a day in each of a plurality of time periods associated with stored data matching the defined starting day of the calendar period. Each of the plurality of time periods of the stored data is aligned so as to have a starting day that matches the defined starting day of the calendar period, whereby each day associated with each of the plurality of time periods is aligned with a corresponding day of the calendar period.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 5 is a table illustrating an example of an account data structure that may be utilized in a system in accordance with the present invention;

FIG. 7 is an example of a graphical user interface that may be employed to manage a chart of accounts in accordance with the present invention;

FIG. 20 is an example of a data structure for a profile in accordance with the present invention;

FIG. 22 is an example of a graphical user interface that may be employed to manage action plan characteristics in accordance with the present invention;

FIG. 23 is an example of a graphical user interface that may be employed to view characteristics of defined key result areas and action plans in accordance with the present invention;

DETAILED DESCRIPTION OF THE INVENTION

Figure 1:
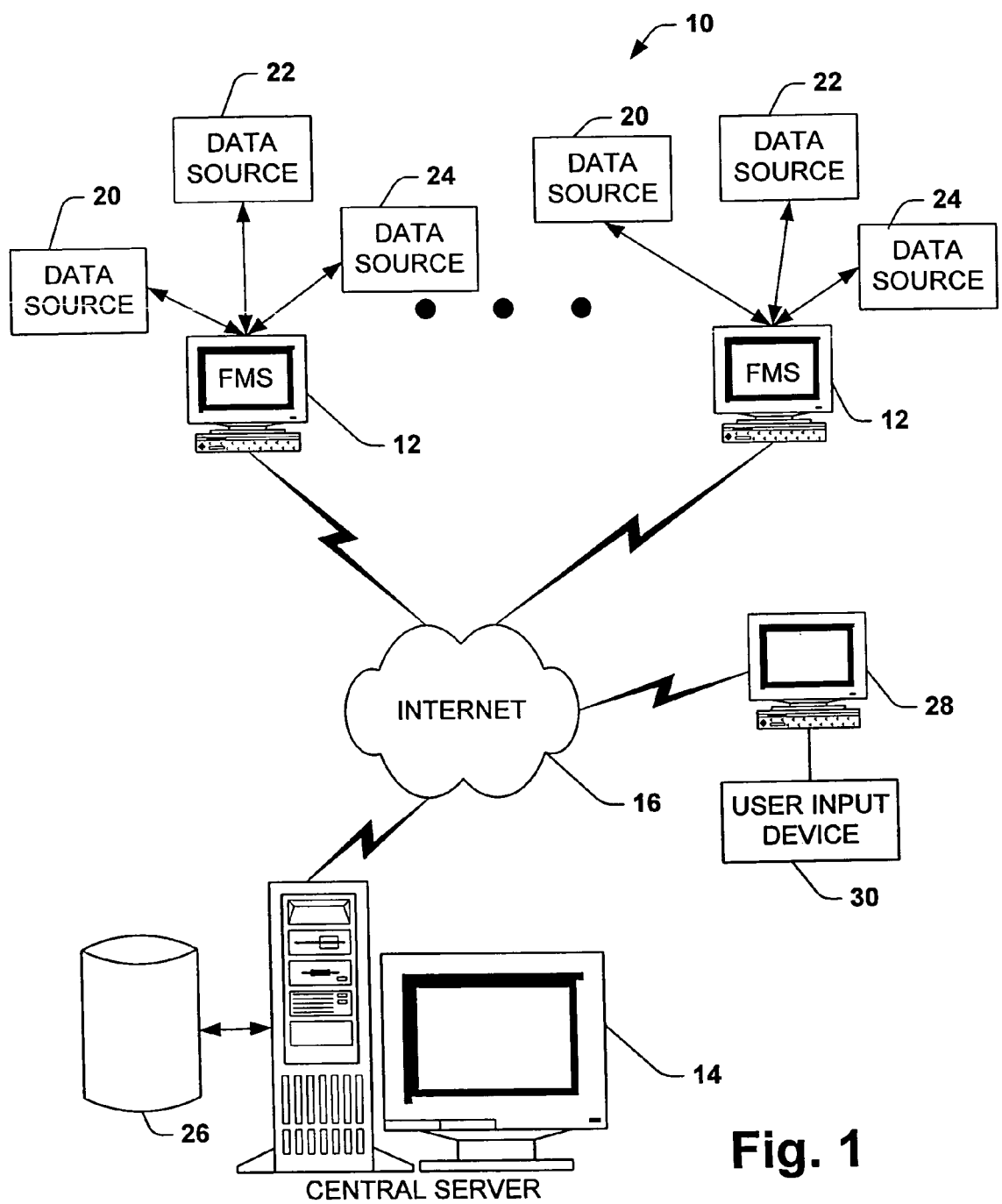
FIG. 1 is block diagram of a system for facilitating budgeting and/or forecasting in accordance with the present invention.

The present invention will now be described with reference to the drawings, wherein like reference numerals are used to refer to like elements throughout. The present invention relates to a system and method to align data. The present invention provides a powerful tool to enable management to plan, among other things, budgets, personnel scheduling, product inventory, room prices, meal prices and discounts. In accordance with an aspect of the present invention, planning may be done at any time period level, such as from a daily level to an annual level or greater.

In the following description, for purposes of explanation, numerous specific details are set forth in order to provide a thorough understanding of the present invention. It will be evident to one skilled in the art, however, that the present invention may be practiced without these specific details. In other instances, well-known structures and devices are shown in block diagram form in order to facilitate description of the present invention. While for purpose of illustration various aspects of the present invention are disclosed in the context of the hospitality industry, those skilled in the art will understand and appreciate that the various aspects have broader applications and that all such applications are contemplated as being within the scope of the present invention.

Various aspects of the present invention also have been organized under headings to facilitate an understanding of the principles of the present invention. The particular arrangement and subject matter under each heading is for simplicity of explanation and is not to be considered restrictive or limiting of the various aspects of the present invention, which are set forth in the appended claims.

Basic System Architecture

Turning now to FIG. 1, a budget forecasting system 10 in accordance with an aspect of the present invention is illustrated. The system 10 includes a plurality of facility management systems (FMS) 12 that may communicate with a central server 14 through a network infrastructure, such as the Internet 16. Each FMS 12 is operative to receive data from a plurality of data collecting sources 20, 22, and 24. The data sources 20, 22, and 24 may be operatively connected to the FMS 12 or the data may be communicated from the nodes to the FMS by other data transfer mechanisms (e.g., data for a data source may be entered directly into the FMS). While, for purposes of illustration, three such data sources 20, 22, and 24 are shown in FIG. 1 as being associated with each FMS, it will be understood and appreciated by those skilled in the art that any number of such data sources may be implemented in a system 10, in accordance with the present invention. It also is to be appreciated that the system 10 alternatively may be configured such tat each data source communicates directly with the central sewer 14 for transmitting and receiving data.

By way of example, the data source 20 may correspond to a business unit, such as a point of sale (POS) or another aspect of business operation. The data source 20 collects or accumulates data having a plurality of attributes indicative of different operational aspects associated with the respective business unit. Similarly, each of the data sources 22 and 24 also may collect data that corresponds to one or more other aspects associated with operation at one or more business units. For example, in the hospitality industry, the data source 22 may collect data pertaining to facility reservations, banquets, sales and catering, telephone usage and call accounting, time keeping, payroll processing, accounts payable, general ledger, daily revenue recording, and/or any other internal system associated with the facility or its operation.

The data source 24 may collect data related to circumstances external to the internal operation at the facility. By way of example, the data source 24 may collect information related to convention center activity, events at local sporting and music venues, opinion polls, guest services scores, other nearby events and activities, and/or other information that may directly or indirectly affect the operation of the facility. The data source 24 further may collect environmental (e.g., weather, news, etc.) or economic information at a regional or local level that may have an impact on or be indicative of facility performance. Such external information may be created at each FMS 12 or be acquired from other service providers, such as the GDS center and STAR information.

In the example of FIG. 1, the data sources 20, 22, and 24 feed into an associated FMS 12. Each FMS 12 may transmit the collected information to the central server 14 via the Internet 16. The central server 14 processes the information received from each FMS 12 into consistent record formats and stores the consistent data in a database 26 in accordance with an aspect of the present invention. As described in greater detail below, the database 26 may be an Online Key Results Area Analysis (OKRAA) database, which stores various data for a plurality of accounts of a chart of accounts (COA). Each account may include a plurality of fields that contain different types of data indicative of various business aspects associated with each respective account.

A computer 28, such as a PC or workstation, may be operatively connectable to the central server 14 for performing forecasting and budgeting in accordance with an aspect of the present invention. The computer 28 includes a user input device 30 (e.g., keyboard, mouse, etc.) through which a user may interact with application software for entering parameters or constraints for controlling the budgeting and/or forecasting process. The application software may be resident on the server 14 and/or at the remote computer 28. It is to be appreciated that, while the user input device 30 is illustrated as being associated with the remote computer 28, such a user input device may be associated with one of the FMS systems 12 or it may be connected to the server 14 directly or indirectly through a private network.

Database Structure

Figure 2:
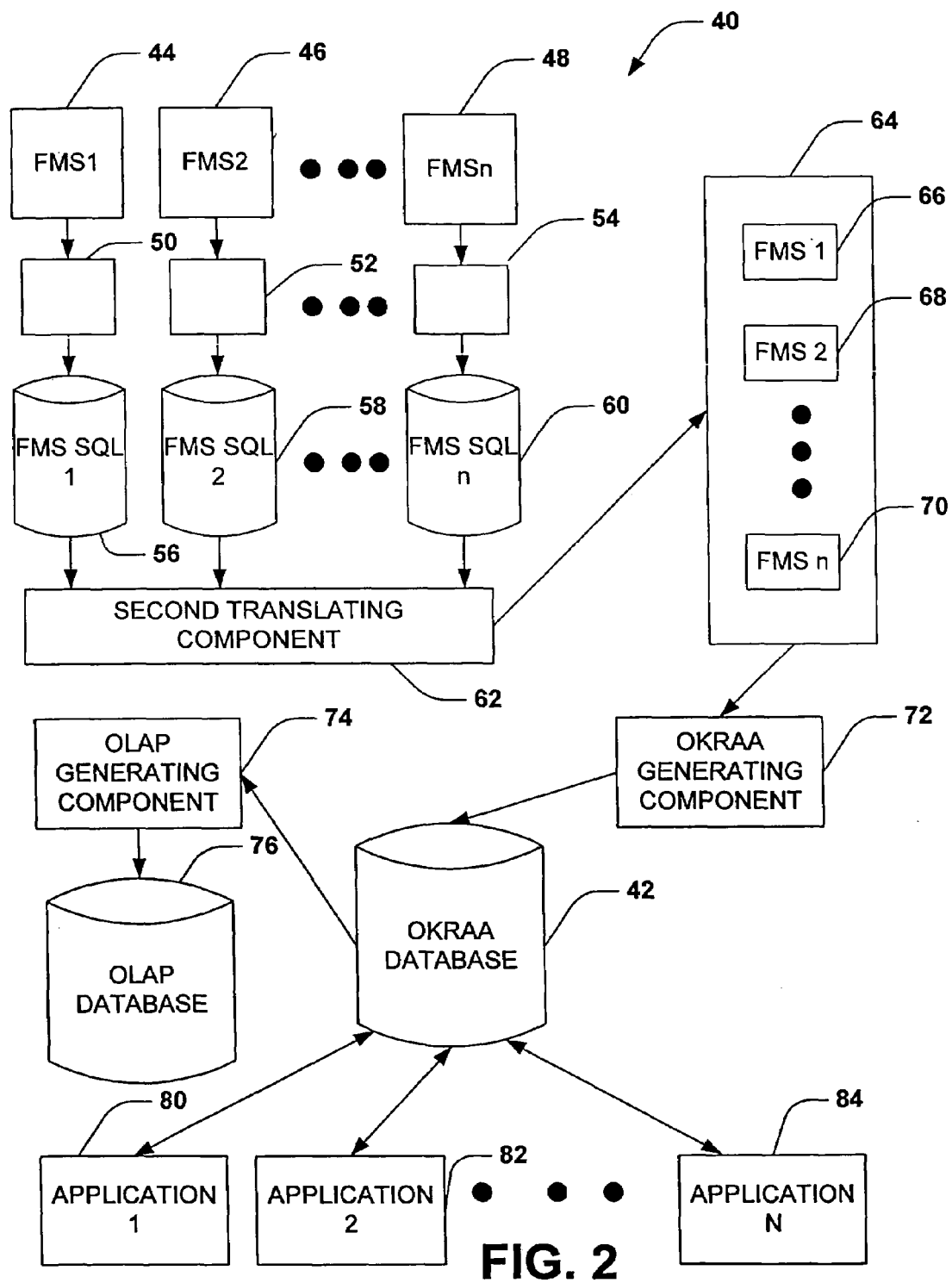
FIG. 2 is schematic block diagram illustrating a system for collecting data from a plurality of data sources to facilitate budgeting and/or forecasting in accordance with the present invention.

Turning now to FIG. 2, a system 40 for creating a database 42 having consistent record formats in accordance with an aspect of the present invention is illustrated. A plurality of facility management systems (FMSs) 44, 46 and 48 collect data from several data sources, such as those described above with respect to FIG. 1. A first translating component 50, 52, 54 pulls data from each respective FMS 44, 46, 48 into an associated FMS SQL database 56, 58, 60. Alternatively, or additionally, each FMS 44, 46, 48 may push collected data to each respective first translating component 50, 52, 54. The first translating components 50, 52 and 54 translate the data collected from the respective FMS 44, 46 and 48 into FMS record formats and write the translated records to corresponding FMS SQL databases 56, 58 and 60.

The data stored in FMS SQL databases 56, 58 and 60 is then pulled by a second translating component 62 that processes and stores selected portions of the FMS data in a central storage SQL database 64. The second translating component 62 may pull data from the plurality of SQL databases 56, 58 and 60, for example, on a predetermined basis or on an ad hoc basis. Alternatively, or additionally, records may be pushed from the FMS SQL databases 56, 58 and 60 to the second translating component 62. The second translating component 62 processes the records stored in the FMS SQL databases 56, 58 and 60 into a consistent predetermined format such as an OKRAA record format. As set forth below in FIG. 3, the second translating component 62 may access several components (e.g., rule sets) to perform the translation.

The second translating component 62 may store records in the central storage SQL database 64 in sets corresponding to their source FMS. For example, data set 66 may contain only records pulled and translated from FMS SQL database 1 56. Similarly, data set 68 may contain only records pulled and translated from FMS SQL database 2 58. Similarly, data set 70 may contain only records pulled and translated from FMS SQL database n 60. These groupings facilitate creating the database 42 in accordance with an aspect of the present invention.

An OKRAA generating component 72 may perform scheduled pulls of selected portions of the data from the central storage SQL database 64 to populate the OKRAA database 42. The selected data may be associated with specific accounts, accumulators (as described below), profiles (as described below) key results areas (as described below) and/or action plans (as described below) which may facilitate budgeting and forecasting. The OKRAA database 42, which may be a relational database, is suitable for access from a plurality of software applications 64, 66 and 68. Developing new hospitality software applications 80, 82 and 84 that process data from one or more diverse hospitality data sources is facilitated because the OKRAA database 42 stores selected information in OKRAA common record formats.

By way of example, the application 80 may correspond to a budgeting program, while the application 82 may correspond to a forecasting application, and the application 84 may correspond to a time keeping application. While, for purposes of illustration, three such software applications 80, 82 and 84 are shown in FIG. 2 associated with the OKRAA database 42, it will be understood and appreciated by those skilled in the art that a greater (or lesser) number of applications may be implemented in accordance with the present invention. Also, while the applications are illustrated as being external to the OKRAA database 42, these and other applications could be integrated into the OKRAA database.

The system 40 may also include an Online Analytical Processing (OLAP) generating component 74 that pulls data from the OKRAA database 42 to create an OLAP database 76. Alternatively, or additionally, the data may be pushed to the OLAP generating component 74. It will be understood and appreciated by those skilled in the art that various delivery mechanisms may be used to present the data to the OLAP generating component 74. The OLAP database 76 is organized using data storage techniques that facilitate online analytical processing, data mining and other such sophisticated data analysis techniques. The OLAP database 76 is organized in a manner that facilitates exporting data to other databases and applications.

Figure 3:
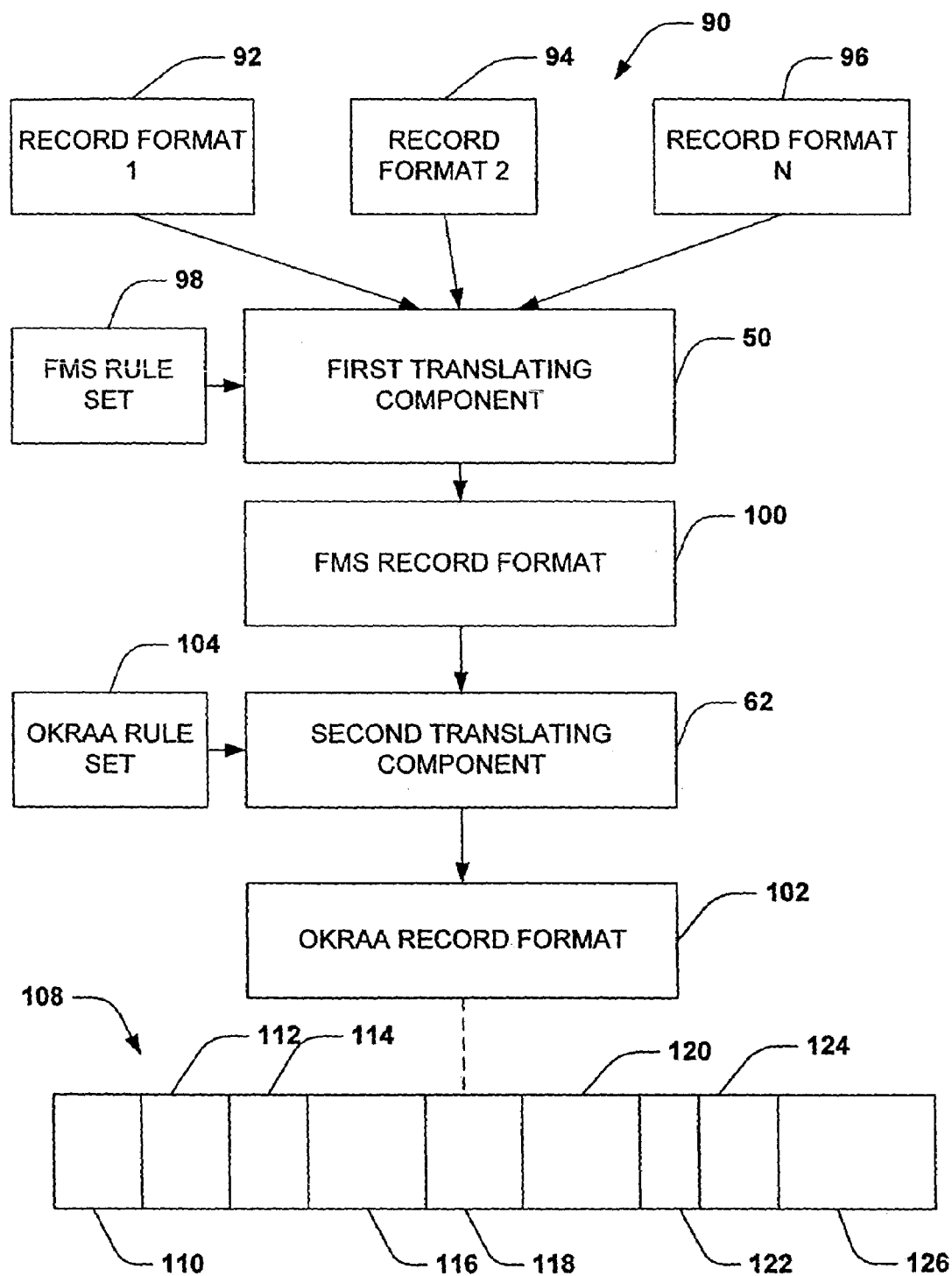
FIG. 3 is a functional block diagram illustrating a system for converting data to desired record formats in accordance with the present invention.

FIG. 3 illustrates an example of a data translation system 90 that may be implemented in the database creation system 40 of FIG. 2 to translate a plurality of record formats 92, 94 and 96 from data sources, such as those associated with FMS 12 (FIG. 1), to a desired format in accordance with an aspect of the present invention. The first translating component 50 may pull records from a plurality of data sources having a plurality of diverse record formats indicated in record format 1 92, record format 2 94, and record format n 96. The FMS rule set 98 contains rules corresponding to each record format that may be utilized by the first translating component 50 to convert received records into a desired format 100. The FMS rule set 98 is associated with the first translating component 50 to provide a mapping between the record formats 92, 94 and 96 and the FMS record format 100.

The first translating component 50 examines the records it receives and a source identification associated with those records. The first translating component 50, for example, applies an account identifier and/or a source identifier associated with the raw data to locate an appropriate rule in the FMS rule set 98. The first translating component 50 then applies the appropriate rule to the record to convert it to the desired FMS record format 100. The FMS rule set 98 defines rules for how to translate any particular input record format from any data source associated with any particular FMS 12 in the system 10 (FIG. 1) into a desired FMS record format 100. The FMS rule set 98 may contain mapping tables, conversion algorithms, concatenation routines, extraction routines and/or appending/deletion routines to implement the translation rules.

By way of example, Record format 1, 92 may correspond to a room sold record format, such as may originate at a data source associate with FMS1 44 (FIG. 2). As shown in Table I, the room sold record may contain fields storing information indicative of a date upon which the data was created, a booking date for a room, which room was booked and a room rate for that room.

TABLE I

| Name | Field 1 | Field 2 | Field 3 | Field 4 |
|---|---|---|---|---|
| Room Sold Record | Date Sold | Booking Date | Room Number | Room Rate |

The first translating component 50 also may pull records from other data sources, such as a restaurant. For example, record format 2 94 may correspond to a restaurant meal sold record format, such as may originate at another data source. As shown in Table II, a meal sold record format may contain fields storing information indicative of a date upon which the data was created, which appetizers were purchased, which entrées were purchased, which drinks were purchased, which deserts were purchased, an amount for a bill and an amount for a tip.

TABLE II

| Name | Field 1 | Field 2 | Field 3 | Field 4 | Field 5 | Field 6 | Field 7 |
|---|---|---|---|---|---|---|---|
| Meal Sold Record | Date sold | Appetizer | Entrée | Drink | Dessert | Bill Amount | Tip Amount |

In both of the above examples, the data could alternatively have been pushed from the respective data sources to the first translating component 50. It will be understood and appreciated by those skilled in the art that various delivery mechanisms could be used to present the data to the first translating component 50. It will further be appreciated that other record formats may also be utilized, in accordance with an aspect of the present invention, to characterize the various types of data that may be collected in connection with any aspect that may affect business operation. While, for purposes of illustration, three such record formats 92, 94 and 96 are shown in FIG. 3, it will be understood and appreciated by those skilled in the art that a greater (or lesser) number of record formats may be translated in accordance with the present invention.

Continuing with the above example of a room sold record and a meal sold record, several FMS records may be created. By way of example, each FMS record may contain fields concerning the date the data was created, the source identification from where the data came, with what account that data is associated, and the raw data from the data source. An FMS record corresponding to, for example, a room sold-record may contain a date field, a source identification field, and the raw data from the data source. The FMS record corresponding to the meal sold record may contain a date field, a source identification field, an account field, a sub account field, a minor account field, and the data specific to the data source. FMS records created from different data sources may be stored in different though consistent FMS record formats, such as those shown in Table III.

TABLE III

| Date | Source ID | COA_ID | Raw Data F1 | Raw Data F2 | ... | Raw Data Fn |
|---|---|---|---|---|---|---|
| D1 | 1 | 1 | Room 3 | $125 | | ... |
| D1 | 1 | 1 | Room 4 | $120 | | ... |

TABLE III-continued

| Date | Source ID | COA_ID | Raw Data F1 | Raw Data F2 | ... | Raw Data Fn |
|------|-----------|--------|-------------|-------------|-----|-------------|
| D2 | 2 | 13 | Cheese stick | Steak | ... | $3.50 |
| ... | ... | ... | ... | ... | ... | ... |
| D3 | 2 | 13 | Shrimp | Lobster | ... | $27.00 |

While the above example shows all the data fields being processed using a one to one mapping method, some translation rules may involve different mappings. For example, one rule may include features for processing a record with seven fields that originated from a point of sale. After identifying which rules from the FMS rule set 98 apply, by using the source identifier and the account identifier, the first translating component 50 may apply the rules to the record. When applying the rules to the record, the first translating component 50 may copy the first field directly from the input record to the FMS record. The first translating component 50 may then combine the second and third fields from the input record into one field in the FMS record and may discard the fourth and fifth fields from the input record. The first translating component 50 may then perform a look up in a table based on the sixth field in the input record to create a field in the output record. The first translating component 50 may then apply an algorithm to the seventh field to produce a new number that will become a field in the output record. The first translating component 50 may then add a source identifier field and time and date stamp fields to complete the example translation. Such rules may vary depending on, for example, the format of the data obtained from each data source and what information is desired and in what format it is to be stored.

The second translating component 62 translates each FMS record format 100 into an OKRAA record format 102. The second translating component 62 may pull records from the FMS SQL databases 56, 58 and 60 (FIG. 2). Alternatively, or additionally, records may be pushed from the FMS SQL databases 56, 58 and 60 to the second translating component 62.

An OKRAA rule set 104 is associated with the second translating component. The second translating component 62 may find a required rule in the OKRAA rule set 104 based on a source identifier and an account identifier associated with each FMS record. Once the appropriate rules are found, they are applied to the records from the FMS SQL databases 56, 58 and 60 to produce records in the desired OKRAA record format 102. The second translating component 62 may, for example, combine fields, copy fields, delete fields, perform look ups based on a field's value, apply an algorithm to a field and/or append additional fields to create an OKRAA record format 102 from an FMS record format 100 according to rules found in the OKRAA rule set 102. Additional rules sets also may be provided to convert the FMS record format data to other OKRAA record formats.

As mentioned above, the number and type of fields in the record formats 92, 94 and 96 may vary both in the number of fields present, the type of information in the fields and in the information stored in each field. To accommodate the varying record formats 92, 94 and 96, the OKRAA record format 102 includes a combination of base fields and variable fields that form an OKRAA record 108. The base fields may contain information associated with, for example, identifying a data source 110, identifying a transaction amount 112, identifying a currency type 114 and identifying a date 116. The OKRAA record format is extensible to include account fields containing information associated with, for example, identifying a site 118, identifying a department 120, identifying an account 122, identifying a sub account 124 and identifying a minor account 126.

It will be appreciated by those skilled in the art that the foregoing database structure and system for collecting data represents but one example that may be implemented in accordance with the present invention. Other types of databases could be employed to store both collected and computed data for use in a system operating in accordance with the present invention.

System Overview

Figure 4:
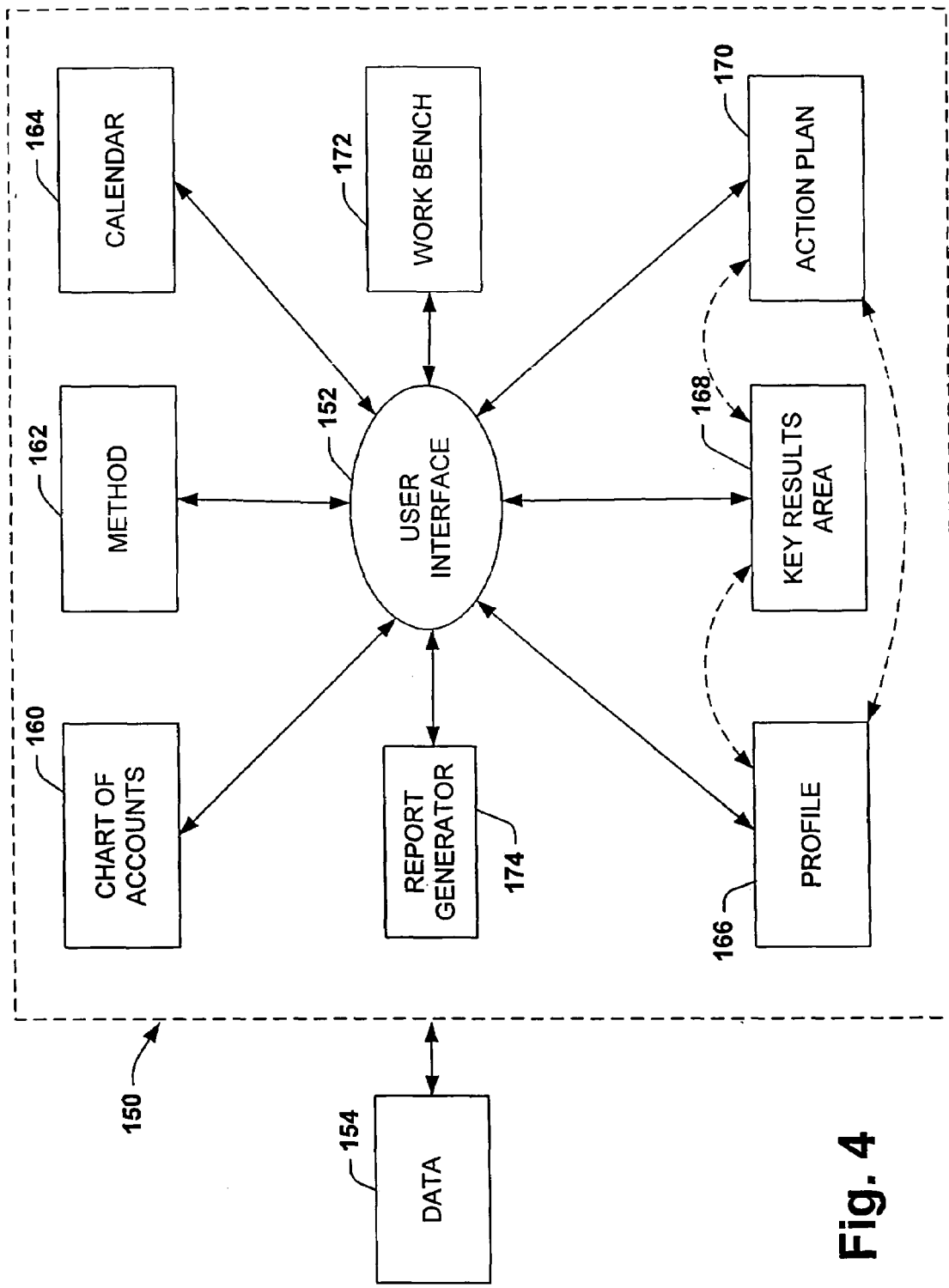
FIG. 4 is a functional block representation of a system for facilitating budgeting and/or forecasting in accordance with the present invention.

FIG. 4 is functional block diagram illustrating a system 150 in accordance with an aspect of the present invention. The system 150, which may run at the central server 14, includes a user interface 152 that is provided locally to a user. A user may interact with different aspects of the system 150 through the user interface 152 so as to perform budgeting, forecasting, trend analysis, business planning, as well as comparative analyses relating to one or more of the foregoing.

The system 150 includes several operative components (or interactive tools) 160-174, which cooperate to provide desired functionality according to stored data 154, such as data that may have been collected and stored in an OKRAA database (historical and computed data) and other data indicative of other factors that may provide some quantitative and/or qualitative measure related to some aspect of business operations. Such other factors may include circumstances associated with a local economy, weather, competition, nearby attractions or sporting events, and/or any other situation or circumstance that might affect some aspect of a company or business.

By way of example, the components may include a chart of accounts component 160, a method component 162, a calendar component 164, a profile component 166, a key results area component 168, an action plan component 170, a work bench component 172, and a report generating component 174. Collectively, the components 160-174 define a set of rules (as may be configured by a user) that may be applied to the stored data 154 to provide an indication of one or more operating characteristics associated with a facility or a group of facilities. Exemplary aspects associated with each of these components are described below under corresponding headings.

Chart of Accounts

The accounts for the system 150 are stored in a chart of accounts 160 (FIG. 4). In general, a chart of accounts is a systematic: listing of all accounts used by a company. The chart of accounts 160 for the system 150 (FIG. 4) lists accounts that may be represented by an account data structure. FIG. 5 illustrates an example of an account data structure 228 in accordance with an aspect of the present invention. An account record in the OKRAA database record format may comprise one or more required fields and optional fields. In the example illustrated in FIG. 5, ten fields 232 are available as optional, flexibly programmable fields. Allowing user-programmable optional fields 232 provides the flexibility to be able to reconcile the diverse record formats found at the data sources into a common OKRAA record format.

In the example account data structure 228 illustrated in FIG. 5, a first field contains a chart of accounts identifier (COA_ID) 230. This field is a primary key for accessing an account record in a chart of accounts. The COA_ID 230 also may be used as a key in other tables and databases to allow for cross referencing to the chart of accounts.

The next ten fields 232, which are identified as COA_COLx fields, where x ranges from 1 to 10, are optional flexibly defined fields. The fields 232 may contain different types of information for different accounts. For example, in the room sold OKRAA record discussed above, one of these flexibly defined fields could be used to store the room number and another flexibly defined field could be used to store the room rate. In the meal sold record described above, one flexibly defined field could store the appetizer purchased, one could store the entrée purchased, one could store the drink purchased and another could store the bill amount. Additionally or alternatively, the flexibly defined fields may define level attributes for each COA_ID within a hierarchy of accounts for a company or business.

The account data structure 228 also includes a field labeled COA_CONCAT_VAL 234 that facilitates the concatenation of accounts. By concatenating accounts, new and more flexible billing and/or forecasting is facilitated. The account record format illustrated also contains housekeeping fields 236, 238, 240 and 242 for determining who created or updated any particular record stored using the account data structure 228 as well as creation and update times.

In the example account data structure 228 illustrated, each attribute has a data type field 246, a size field 248, a reference field 250, a key indicator field 252, and a description field 254 associated with it. While, for purposes of illustration, each attribute has such associated data fields, it will be understood and appreciated by those skilled in the art that the account record may be configured to include a greater (or lesser) number of data fields associated with each attribute in accordance with the present invention. It also is to be understood and appreciated by those skilled in the art that an account record may be configured to contain a greater (or lesser) number of fields in accordance with the present invention.

Figure 6:
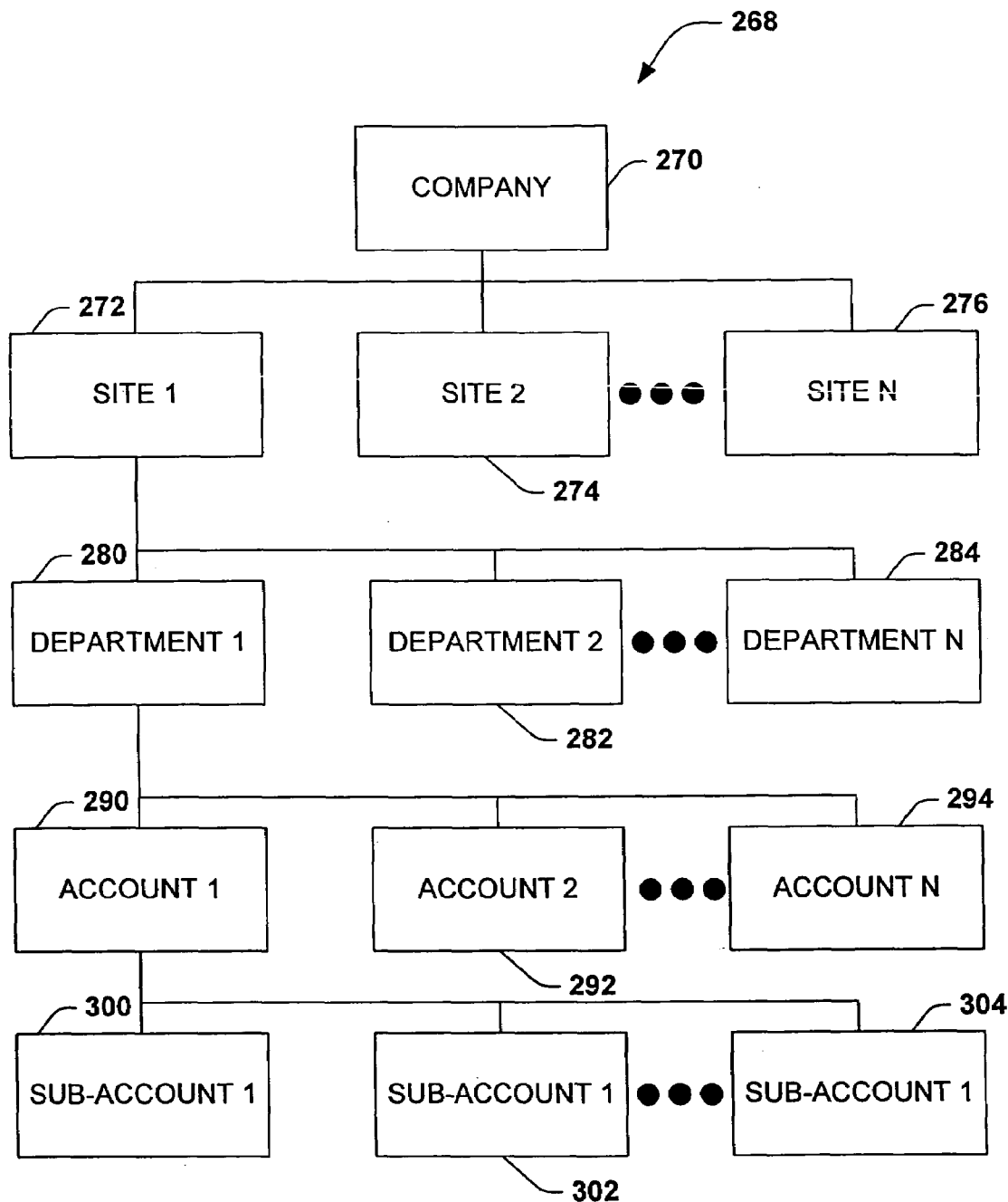
FIG. 6 is a block representation of an exemplary hierarchy of accounts that may be utilized in a system in accordance with the present invention.

FIG. 6 illustrates an example of a hierarchy of accounts 268 in accordance with an aspect of the present invention. A chart of accounts may store a collection of account identifying records, each of which identifying record contains an account level field, thus facilitating representing the hierarchy of accounts 268.

The hierarchy 268 may start with a company 270 or other organizational unit. The company 270 may comprise a plurality of sites (e.g., physical locations) 272, 274 and 276. A site 272 may, in turn, comprise a plurality of departments 280, 282 and 284. A department 280 may comprise a plurality of accounts 290, 292, 294. An account may comprise a plurality of sub-accounts 300, 302 and 304. While, for purposes of illustration, five levels of hierarchy are illustrated in FIG. 6, it will be understood and appreciated by those skilled in the art that a greater (or lesser) number of levels may be used in accordance with the present invention.

By way of illustration, a company level account record may contain the following fields: a COA_ID, a company identifier and a set of data fields. A site level account record may contain the following fields: a COA_ID, a company identifier, a site identifier and a set of data fields. Similarly, a department level account record may contain the following fields: a COA_ID, a company identifier, a site identifier, a department identifier and a set of data fields. An account level account record may contain the following fields: a COA_ID, a company identifier, a site identifier, a department identifier, an account identifier and a set of data fields. A sub-account level account record may contain the following fields: a COA_ID, a company identifier, a site identifier, a department identifier, an account-identifier, a sub-account identifier and a set of data fields. The flexibly defined fields, as described in FIG. 5, may be used to implement these and other account record formats for records at different levels in the account hierarchy 268.

FIG. 7 illustrates an example of a graphical user interface (GUI) 310 that may be used to create an account entry in a chart of accounts in accordance with an aspect of the present invention. That is, the GUI may be employed to define the various account entities in the system, such as the various sites, departments, accounts, sub-accounts and minor accounts described herein.

The GUI 310 includes a display table 311 that contains information about each account record in the chart of accounts. A key into the account entry shown on FIG. 7 is the COA_ID field 312, which is the chart of accounts identifier field. As mentioned above, the COA_ID field 312 may also be used as a key into other tables, like an account table, where the record structure for an account record is stored. By using the COA_ID field 312 as a key in associated database tables, the structure for any raw data may be obtained, thus facilitating interpretation, translation and other processing. The table shown in FIG. 7 includes four columns, namely, a COA_ID column 312, a description column 314, an account level column 316 and an account type column 318. While, for purposes of illustration, the account data structure is illustrated in FIG. 7 as a table, it will be understood and appreciated by those skilled in the art that other data structures may be utilized, in accordance with the present invention, to characterize the various account attributes.

The COA_ID column 312, as described above, is the primary key and is used to uniquely identify the description of the account. The description column 314 is a text description of the account to which the record applies. The account level column 316 records at which level in the hierarchy of accounts 268 (FIG. 6) the entity being modeled by an account resides (e.g., is it a site, a department, an account, a sub-account, etc.). The account type column 318 identifies which of several basic types of account the account represents.

The GUI 310 may also include a user interface element 320, such as may include a drop-down menu, for selecting a desired account level from a predetermined list of account levels. The graphical user interface 310 displays the accounts in an order organized according to the selected account level. Additional action buttons may be provided for adding, deleting, saving, and/or cancelling choices made concerning a selected account.

Figure 8:
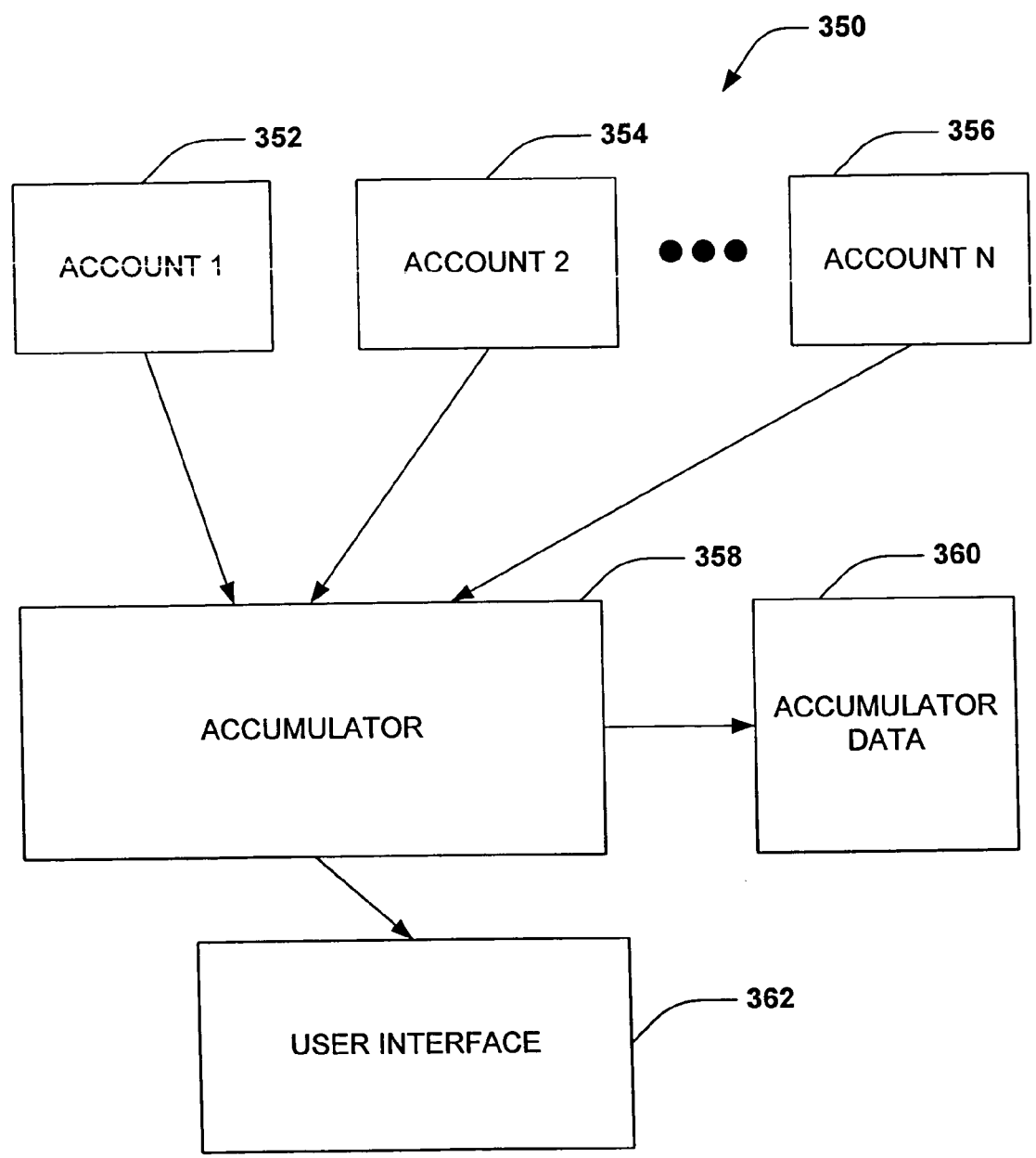
FIG. 8 illustrates a functional block representation of an accumulator for grouping accounts in accordance with the present invention.

FIG. 8 illustrates a system 350 for grouping selected accounts in accordance with one aspect of the present invention. An accumulator 358 may be employed to aggregate records from one or more accounts 352, 354 and 356. These accounts 352, 354, and 356, from which data will be extracted and aggregated, may be selected from a range of accounts. Such aggregations facilitate budgeting and forecasting. The aggregations are stored as accumulator data 360. For example, all the room sold records available for a plurality of accounts 352, 354, and 356 may be aggregated together by an accumulator 358 to create one data repository 360 of room sold records to facilitate access to such data via a user interface 362. For another example, selected accounts or all the accounts at one level of a hierarchy of accounts could be aggregated together to facilitate higher level budgeting and forecasting. An accumulator 358 may be described by its name, by the accounts from which it aggregates data, and the data that it aggregates. In this way, the accumulator function may be employed to group any number of accounts; from as few as a single account to as many as all the accounts.

Figure 9:
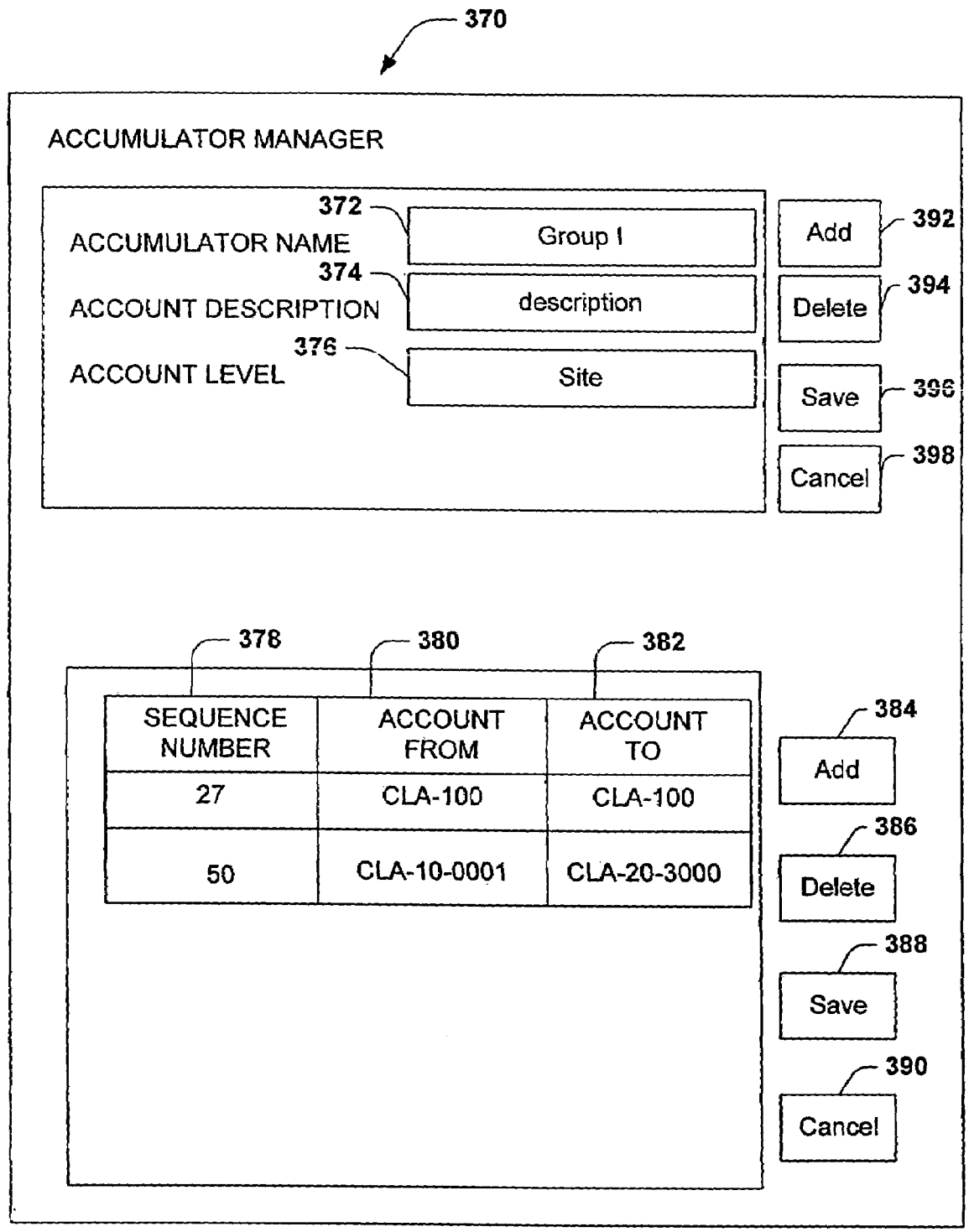
FIG. 9 is an example of a graphical user interface that may be employed to program an accumulator in accordance with the present invention.

FIG. 9 illustrates an example of a GUI 370 that may be used to program an accumulator 358 (FIG. 8). The GUI 370 includes a user interface element 372 for entering an accumulator name and a user interface element 374 for entering a description of the accumulator. The GUI 370 also includes a user interface element 376 for entering an account level that can be selected, for example, from a pre-determined set of choices displayed in a drop-down menu. When selecting options like names and account levels, a user may employ interface buttons to add 392, delete 394, save 396 and cancel 398 choices made concerning those options. The GUI 370 facilitates entering a sequence of accounts from which data may be aggregated. A sequence of accounts is identified by a sequence number 378, an account from number 380 and an account to number 382. When selecting the accounts from which data will be accumulated, the user has available buttons to add 384, delete 386, save 388, and cancel 390 choices to be included.

Methods

Figure 10:
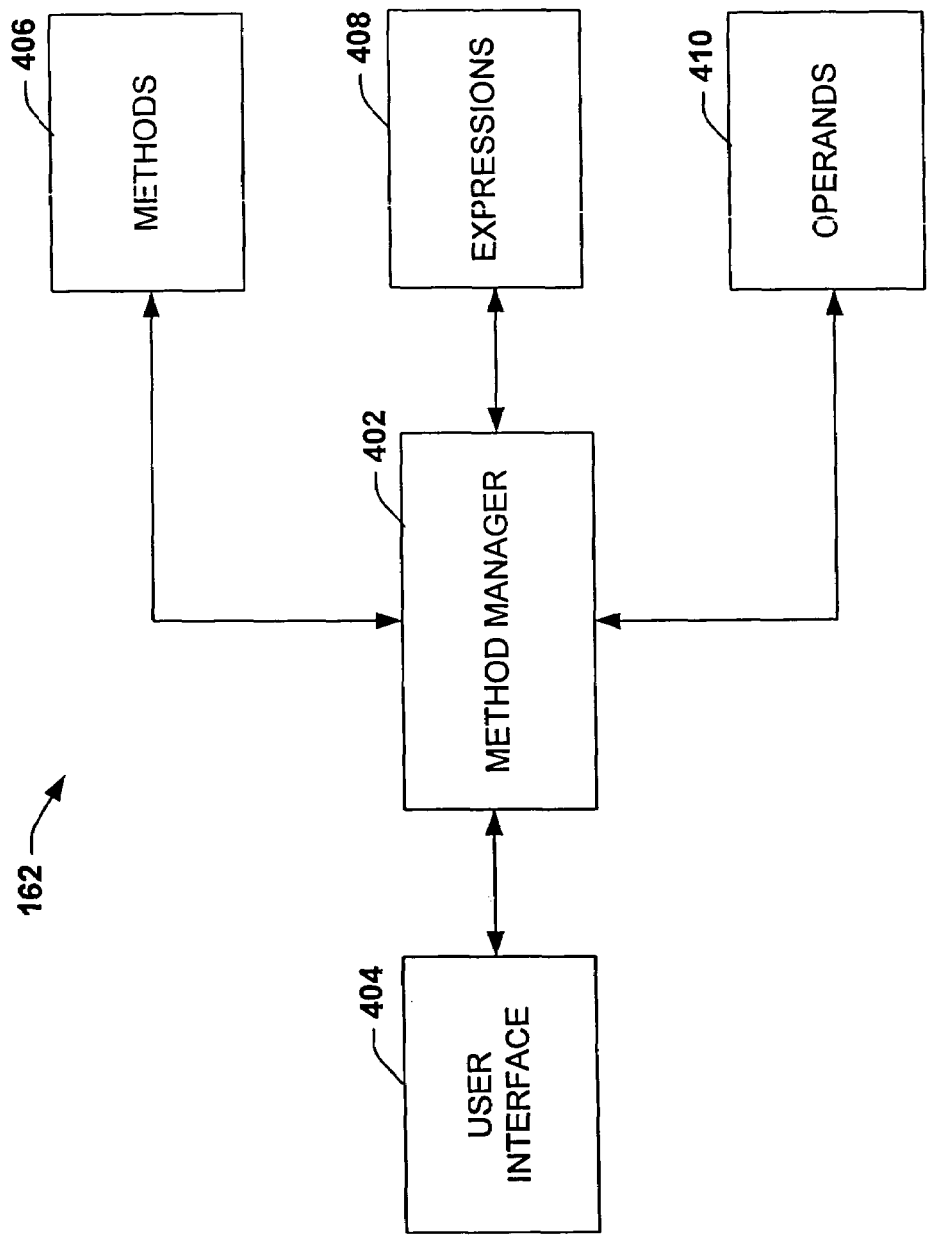
FIG. 10 is a functional block diagram of a method component in accordance with the present invention.

FIG. 10 illustrates a functional block diagram of the method component (or module) 162 in accordance with an aspect of the present invention. The method component 162 includes a method manager 402 that may be associated with a user interface 404, through which a user may add, remove, or otherwise manipulate a method that may be implemented within the system 150 (FIG. 4). The method component 162 also includes a methods interface 406 that may be employed to create one or more methods. Each method is a combination of one or more expressions that has a unique name and application characteristics that determine how and to which data each respective method may be applied. Expressions may be combined, for example, via programmatic operators (IF, WHEN, CASE, etc.) to define how and under what circumstances the component expressions are to be utilized. The methods data may be stored in a table or other data structure for identifying a list of defined methods that are available to the system. A method may also be utilized to retrieve desired data and/or to convert that data into a useful representation, such as may correspond to budget data for a given account on one or more days.

The method component 162 further includes an expressions interface 408 that may be employed to create expressions which, in turn, may be used in one or more methods. An expression, which may include constants, operands, and/or operators, characterizes what data is to be retrieved and how it is to be processed for each associated method. An expression may be stored in data a structure indicative of the available expressions for each method. An expression may contain an algorithm or stored procedure, such as in the form of a formula or expression, which may be applied to data stored in one or more records. Various operators may be utilized to combine operands in a desired way including, for example, arithmetic operators (e.g., +, −, ×, /, etc.), relational operators (e.g., <, >, =, etc.), Boolean operators (e.g., NOT, OR, XOR, AND, etc.), and other logical operations.

The method component 162 also includes an operand interface 410 that may be employed to create define segments of data that are to be processed or accumulated for use by the expressions interface to generate expressions. The operands may be global to the methods and the expressions so that a given operand may be applicable to numerous types of data. Each operand further may include attributes, which may define various characteristics of each respective operand. The data pulled from a database and utilized by an expression or an operand associated therewith may come, for example, from a single account record, from a range of account records, or from a set of account records.

A method thus includes a plurality of attributes that may include a name and an expression, which, in turn, may include one or more operands. A method may be utilized to retrieve historical data and/or it may utilize data derived from one or more other methods. A method also may be programmatically linked to one or more accounts listed in the COA. Programmatically linking a method to an account provides the benefit of automatically having the numbers or other logical results the method produces available for other applications or methods. This automation facilitates budgeting and forecasting by making derived data concerning the hospitality industry readily available.

By way of example, a method may pull data from database data fields into an active method and process selected data from the data fields with constant data fields defined in the method to produce a data item or result. The database data fields may correspond, for example, to a bill amount and whether a desert was ordered. The constant data fields may, for example, identify a percentage representing a historical ratio of deserts purchased to entrees purchased and the desired percentage of deserts purchased to entrees purchased. The derived data item, produced by the method applying its expression to the data fields, may be a number indicating whether a business unit associated with the data source supplying the database values is meeting or exceeding a desired desert to entrée ratio.

By way of further example, raw data may be collected concerning the number of rooms occupied at a hotel and the total revenue collected from selling those rooms. The two pieces of data may be stored in an FMS record. A method may be associated with an account(s) whose FMS record format includes those two fields. The method may retrieve those two pieces of information from a record for a specific date and produce a derived number, such as the average daily rate for that date.

By way of further example, raw data may also be collected concerning the number of rooms occupied at a hotel and the number of rooms vacant. These two pieces of data may be stored in an FMS record and translated into a desired record format (e.g. and OKRAA record format). A method may be associated with an account that includes the identified two fields. The method may retrieve those two pieces of information from the records for a range of dates and produce a derived number, namely, the occupancy rate for that hotel. The occupancy rate may then, in turn, be used by a separate method that employs a constant to represent the labor needs per room and the derived occupancy rate to compute the forecasted daily labor needs for that hotel over each day in a selected date range.

As set forth below, a method further may be associated with a Key Results Area (KRA), a profile, an action plan, or any other aspect of a budgeting and/or forecasting process, in accordance with an aspect of the present invention. The associated method(s) may be applied to data, such as may be stored in the OKRAA database, to provide an impact value or other quantitative (or qualitative) representation associated with an aspect of operation at a facility or group of facilities.

Figure 11A:
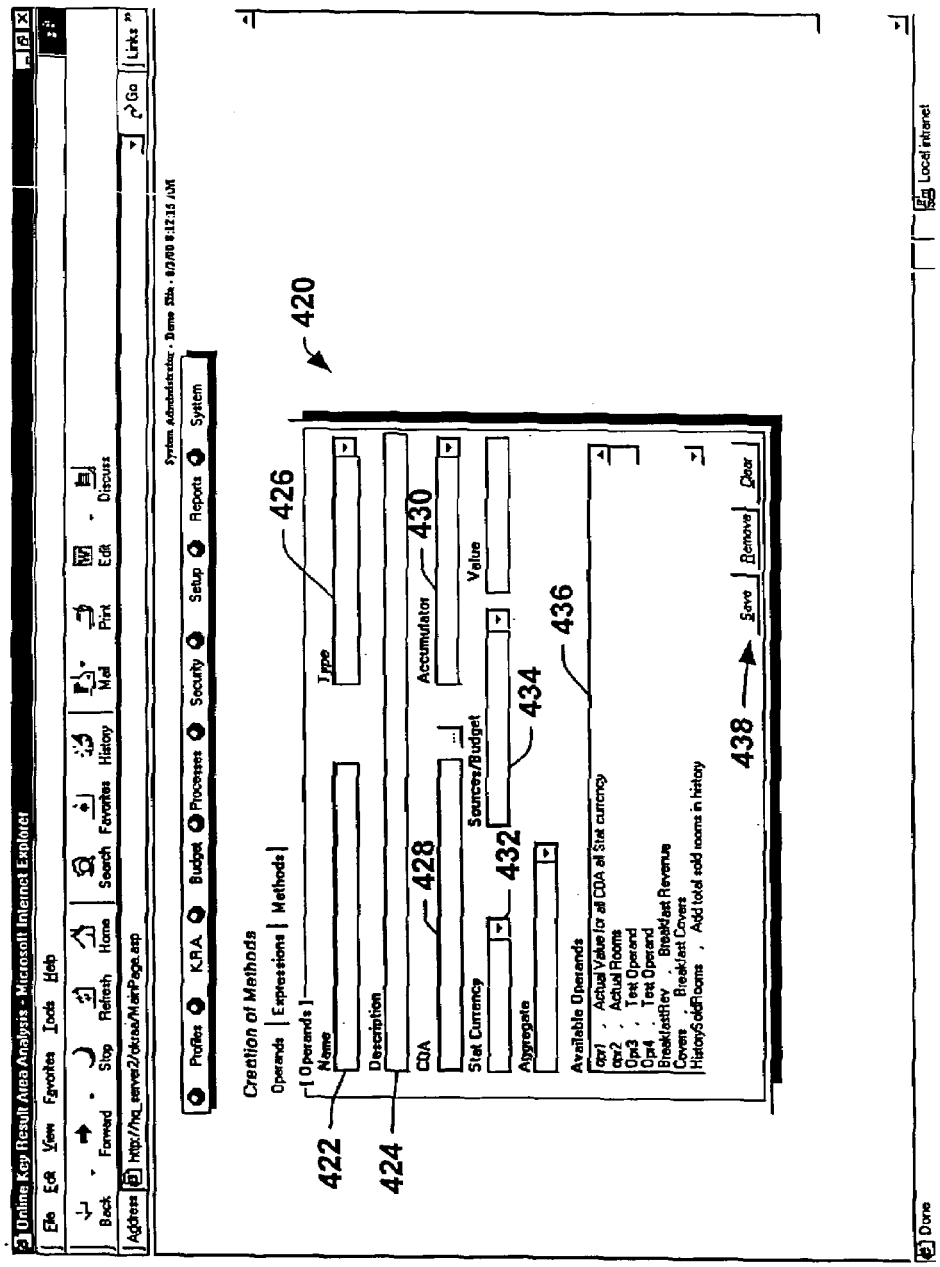
FIG. 11A is an example of a graphical user interface that may be employed to manage method operands in accordance with the present invention.

Some methods may be predefined while others may be created by a user. FIG. 11A illustrates an example of an operand GUI 420 that may be employed to create an operand for use by an expression in accordance with an aspect of the present invention. The GUI 420 includes user interface elements 422 and 424 for entering a name and a description of an operand. A drop down menu 426 may be employed to enter the type of data that may be defined by the operand (e.g., constants, currency, other data types data pulled from the database). An operand may be assigned to one or more COAs, such as by selecting a desired COA (e.g., by identifying a COA_ID) from a drop down menu 428 or selecting a desired accumulator from another drop down menu 430.

The GUI 420 also includes user interface elements 432 and 434 for respectively entering the type of currency (e.g., U.S. dollars, Canadian dollars, Mexican Pesos, etc.) and the data source or budget to which the operand may be applied. A list of the available operands is shown in a display portion 436 of the GUI 420. Action buttons 438 also are provided to save, remove, or clear fields associated with a corresponding operand.

Figure 11B:
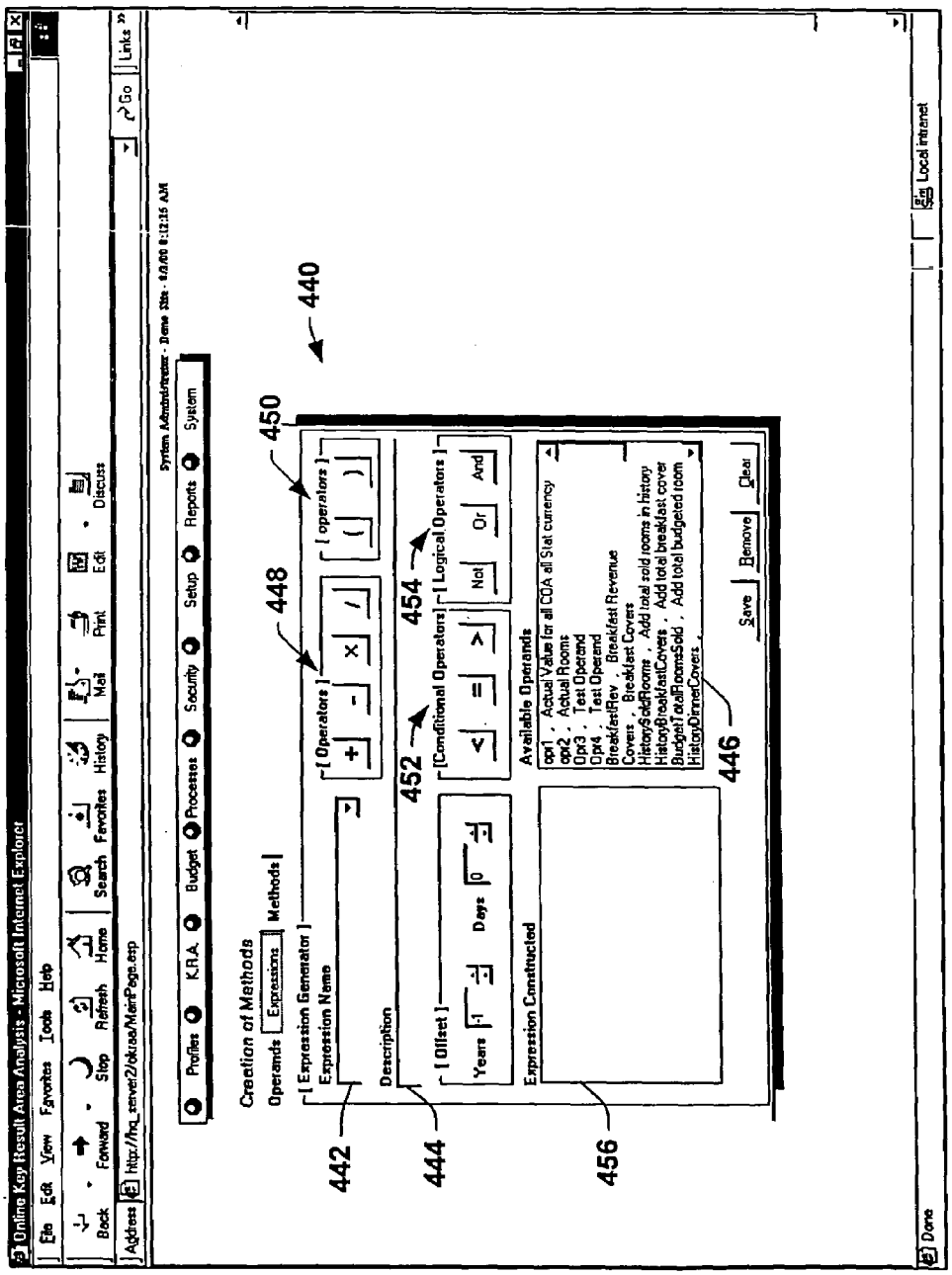
FIG. 11B is an example of a graphical user interface that may be employed to manage method expressions in accordance with the present invention.

FIG. 11B illustrates an expressions GUI 440 entering expression data, which may include constant data values, database lookup variables, arithmetic operators, and logical operators. The GUI 440 includes user interface elements 442 and 444 for entering a name and a description of an expression. A list of available operands are provided in an interactive display 446 from which operands may be selected for use in an expression. Operands may be combined by selectively employing operators, which may be implemented via user interface elements 448 (arithmetic operators), 450 (relational operators), 452 (conditional operators), and 454 (logical operators). The resulting expression is shown in an expression display 456.

Figure 11C:
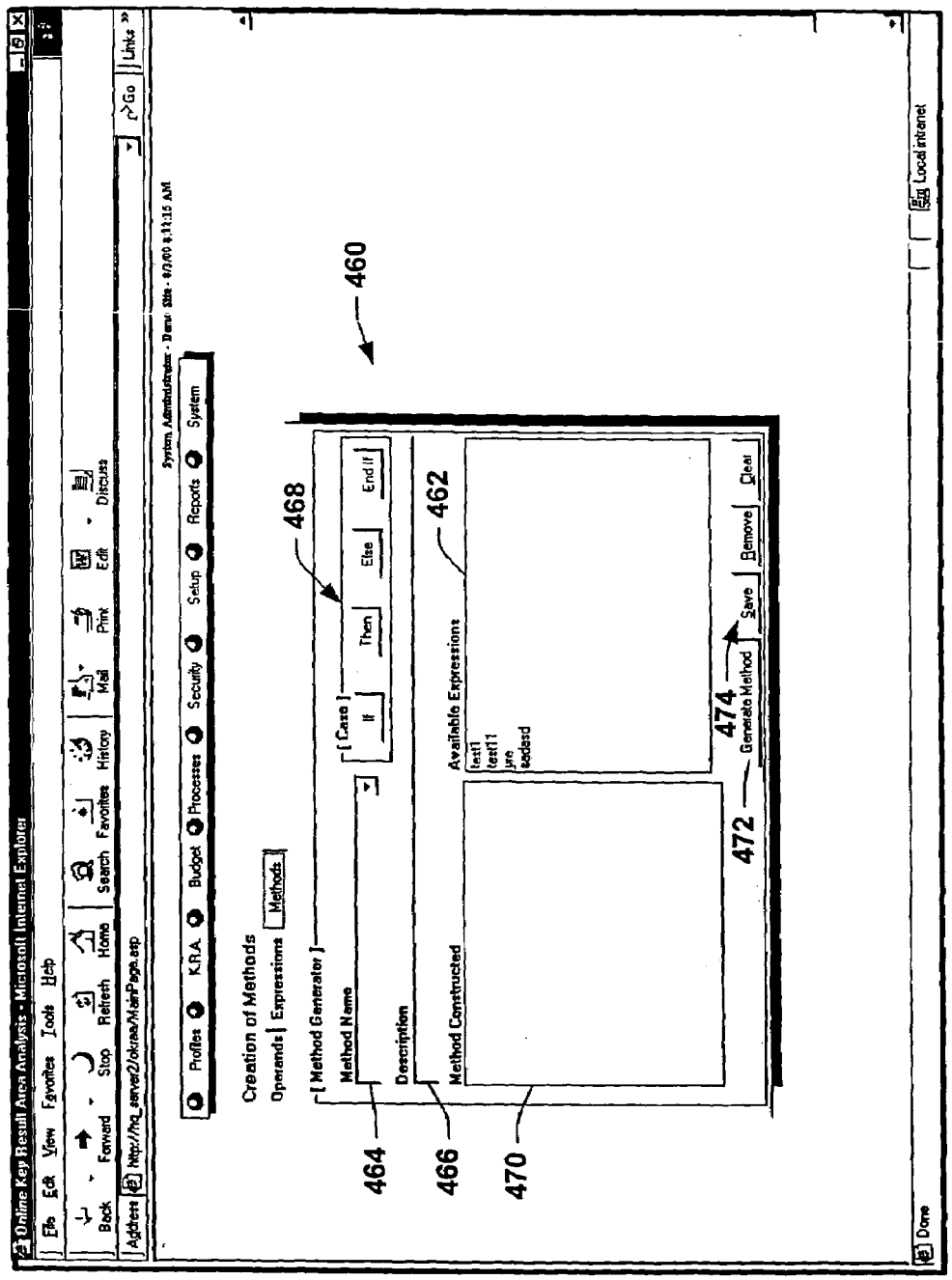
FIG. 11C is an example of a graphical user interface that may be employed to manage methods in accordance with the present invention.

An example of a method GUI 460 is shown in FIG. 11C, such may be employed to create a method from a list of available expressions. A method is assigned a name and a description by entering desired information at user interface elements 464 and 466, respectively. Various expressions may be combined to construct a method by arranging expressions with programmatic operators provided by user interface elements 468. The resulting method is displayed in a display portion 470. The constructed method may be generated by activating user interface element 472, which programmatically combines the associated data fields to facilitate its application to selected data. Other action buttons 474 may be utilized to save or remove methods as well as to clear the fields of a currently displayed method.

A method may be linked to one or more selected accounts by employing a method-account GUI 476, such as shown in FIG. 1D. The GUI includes user interface elements 478 and 480 for entering an account range for which a user desires to assign one or more methods (e.g., based on the COA_ID). Another user interface element 482 is provided for selecting the type of data (e.g., currency type or other units) of the selected account to which a method is to be applied. Examples of the type of data (or units) include U.S. dollars, rooms, sales, tips, etc. The available methods are listed in an selectable method display 484. The available methods for each account may assigned to one or more types of method for each respective account, such as by employing user interface elements 486. One type of method is a reference method 488 and other type of method is a historical method 490.

The results of the two types of methods, after being applied to the stored data, provides a comparison in the work bench component, as described herein. The historical method 490 provides a base method, such as may provide base budget information upon applying a selected method that performs a historical analysis (e.g., a trend analysis) on the stored data. The reference methods provide results that may be compared with other results to gauge the level of success or failure of that result.

Calendars

Figure 12:
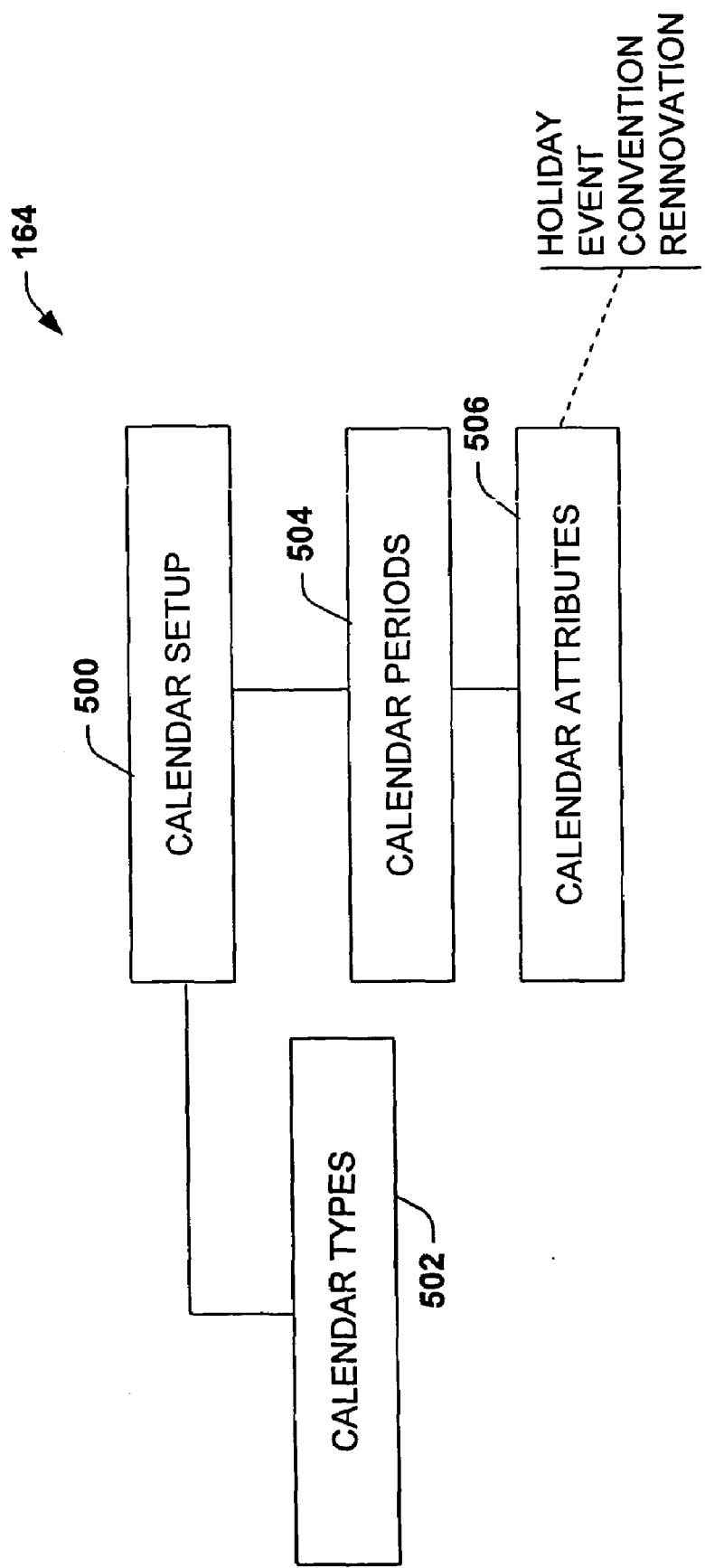
FIG. 12 is a functional block diagram of a calendar component in accordance with the present invention.

FIG. 12 illustrates a functional representation of the calendar component 164 in accordance with an aspect of the present invention. The calendar component 164 typically is employed during system setup via a calendar set up user interface 500 for defining one or more calendars that may be utilized in forecasting and/or budgeting processes and to generate corresponding reports. Each calendar has several characteristics, which may include the type of calendar, the period of the calendar, and calendar attributes (if any) within the defined period. Each characteristic may be stored in a corresponding data structure 502, 504 and 506 associated with the user interface 500.

By way of example, a user may employ the user interface 500 to create new types of calendars that are stored in the system database, although commonly used calendar types also may be predefined. For each calendar type, a user may specify the number of calendar periods associated with that type of calendar. Examples of the types of calendars include: daily, weekly, monthly, quarterly, semi-annually, annually, budget calendar, a forecast calendar, seasonal calendars, etc. A monthly calendar type may have 12 equal periods in a year and a daily calendar typically has 365 equal periods in a year. A seasonal calendar may be user-defined periods, which may be variable for each respective period. A calendar further may include a field that defines the periods in each respective type of calendar including its starting day and ending day. Specific GUIs may be provided to define the types of calendars and the period of each calendar.

Figure 13:
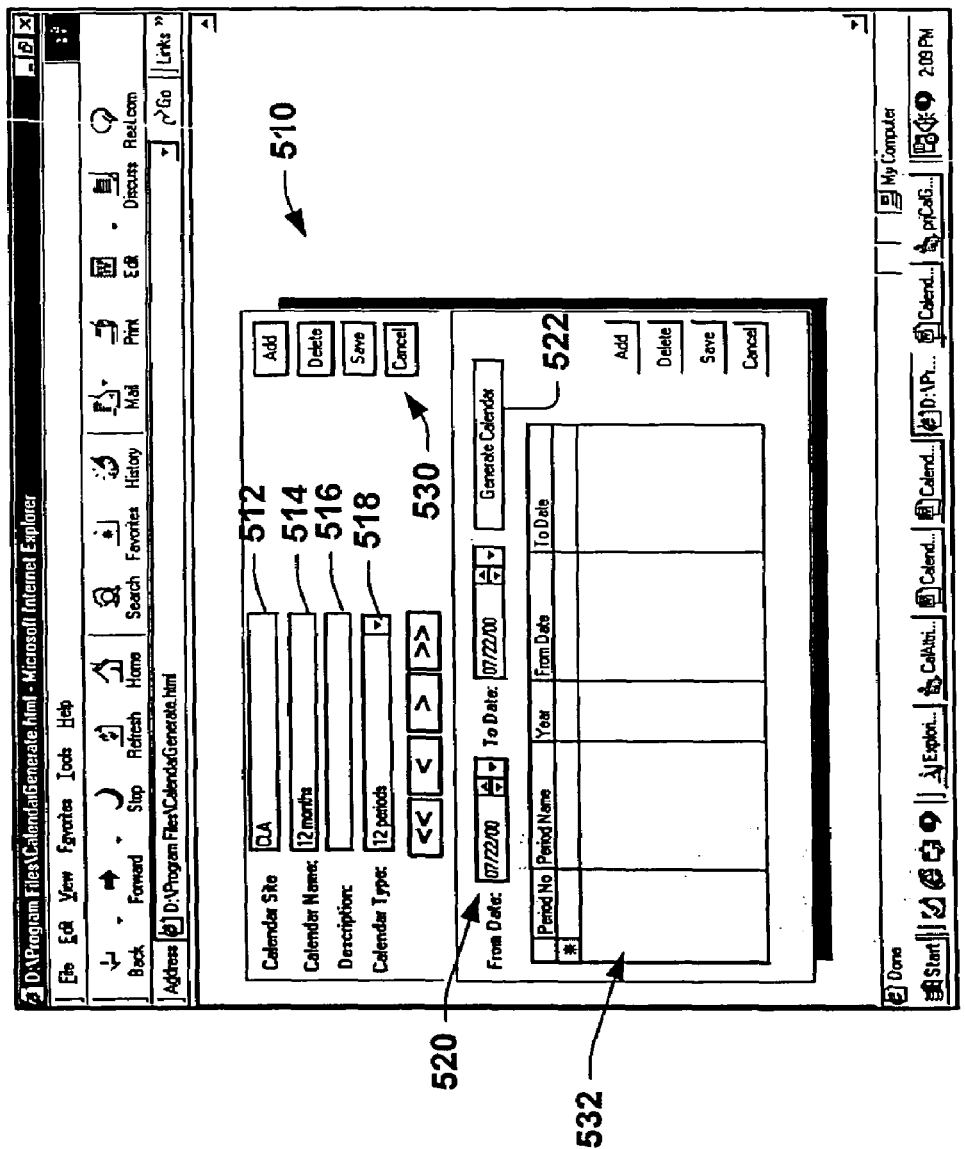
FIG. 13 is an example of a graphical user interface that may be employed to manage calendar characteristics in accordance with the present invention.

FIG. 13 illustrates an example of a GUI 510 that may be employed to generate and/or modify a calendar in accordance with an aspect of the present invention. The calendar GUI 510, for example, forms part of the user interface 500 (FIG. 12). The calendar GUI 510 may include a calendar site user interface element 512 for specifying with which site (or sites) the calendar may be utilized. The calendar GUI 510 also includes other user interface elements 512, 514, 516, 518, and 520 for respectively specifying a name for the calendar, a description of the calendar, the type of the calendar, and a date range for the calendar. A generate calendar button 522 also is provided to generate a calendar for the specified range. Other action buttons 530 may be provided to add a calendar to be generated, delete an existing calendar, save a generated calendar and/or cancel a previous operation. The various characteristics associated with the calendar may be shown on a corresponding display 532 of the calendar GUI 510.

Once the calendar types and periods have been defined, a user may the set or align the historical calendars with each calendar year for which budgeting and/or forecasting way be performed. Attributes associated with selected days in each calendar, such as by specifying desired characteristics about the calendar; also may be selected. The calendar may then be generated and stored as a table that includes fields identifying the specified characteristics of the respective calendar.

Calendar Alignment

As mentioned above, data may be stored in the OKRAA database organized by day for a plurality of calendar years. Information about various aspects of facility operation are stored in predefined fields associated with each day of each calendar year.

In various industries, such as service oriented businesses, facility operation and performance may be impacted differently depending on which day it is in a given week as well as based on external factors that may draw potential customers into a given geographic area. For example, different account attributes for a restaurant at a facility may be impacted differently during certain week days relative to one or both days in a particular weekend. Moreover, the level of activity may further vary depending on when a particular holiday occurs or when special events or activities may take place at the facility or at locations near the facility.

Figure 14:
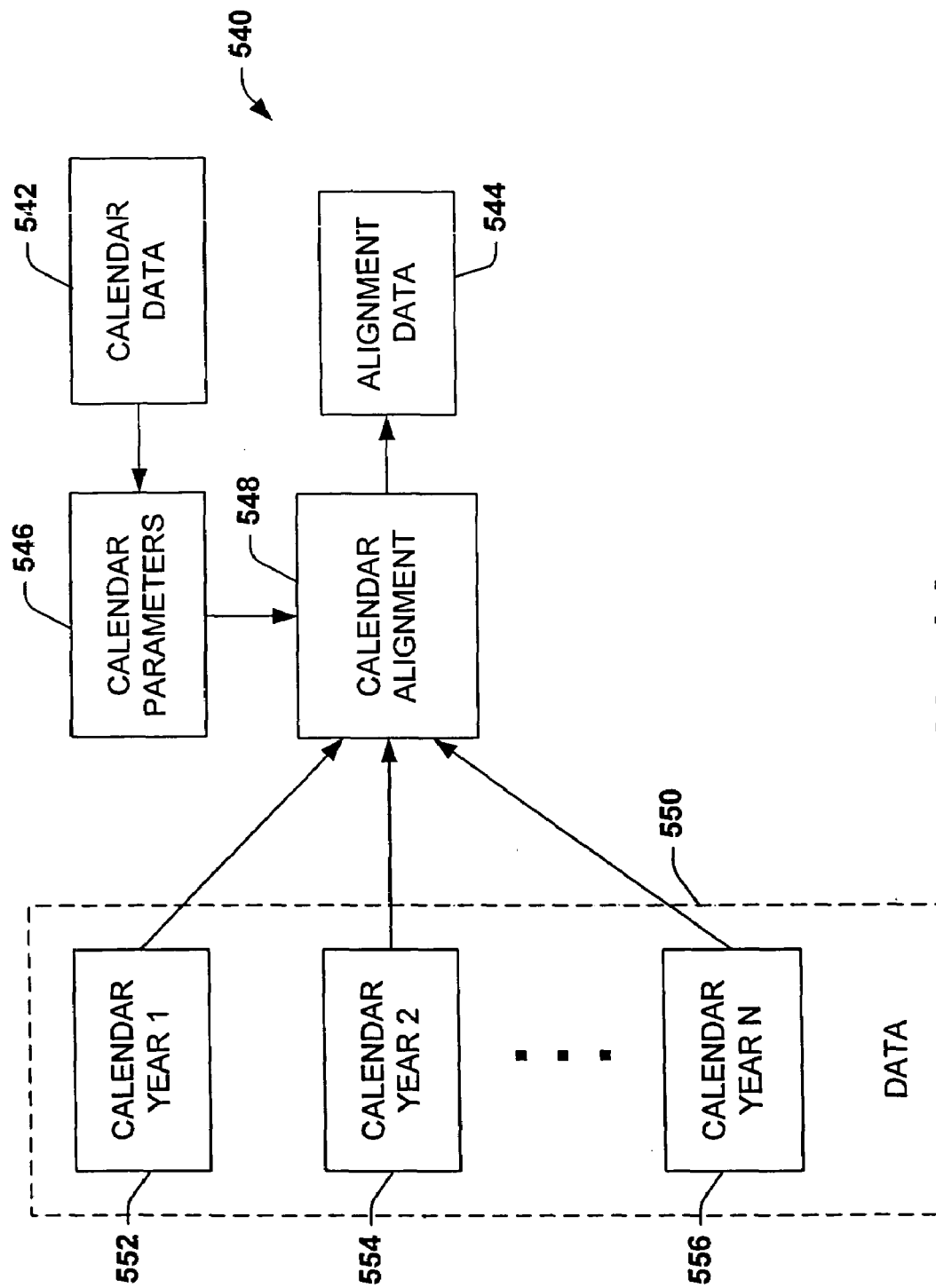
FIG. 14 is a functional block diagram of a calendar alignment system in accordance with the present invention.

Referring now to FIG. 14, the calendar component 164 (FIG. 4) may include a calendar alignment system 540, which aligns or links historical calendars based on calendar set up data 542, in accordance with an aspect of the present invention. The calendar alignment system 540 generates calendar alignment data 544 for each calendar in the historical database. The calendar alignment data 544, which may be stored at the central server 14 (FIG. 1), provides a day-to-day alignment between each day in a user-defined calendar and each day in the historical database. This enables the system 150 (FIG. 4) to budget/forecast a day-to-day (or other specified time base) impact on one or more account attributes of a COA for a facility or for a selected aspect of facility operation.

In particular, the calendar set up data 542 is converted into data 546 identifying the starting day parameters for a calendar year to be processed, such as may be set by a user via the user interface 500 (FIG. 12). A calendar alignment function 548 receives the data identifying starting day of the calendar year. The calendar alignment function 548 is interfaced with a historical database 550 containing historical data for a plurality of prior calendar years 552, 554, and 556, the extent of which may be defined by a user. The calendar alignment function 548 employs the starting day data to locate a day in each calendar 552, 554, 556 of the stored data 550 that matches the starting day of the calendar period and stores the corresponding data. Once the starting days are aligned to the same day of the year, the remaining days in each historical calendar fall into place. The stored data provides a day-to-day mapping between each day of the year in the defined calendar period and a corresponding day in the stored historical data 550. As a result, each defined calendar period over a given year (or years) may be mapped to a corresponding period in the historical calendars so that each day is aligned with the same day of the week and within the same week of the calendar year as its corresponding day of the user-defined calendar.

For example, May 1 in each of the years 1995 through 1999 occurs on a different day of the week, as indicated in Table IV. As mentioned above, operating characteristics in certain industries (e.g., the hospitality industry) may be more dependent on the day of the week than the date. Therefore, if Saturday, May 1, 1999 is the starting date of a user-defined calendar, the calendar alignment function 548 is programmed and/or configured to link each twenty-third Saturday of each other calendar year in the stored data, such as illustrated in Table V. The calendar alignment function 548, in turn, creates corresponding historical time periods in each calendar year tat include the same day of the week and year as its respective starting date. As a result, the alignment data may include alignment criteria indicating a starting day in each calendar year that is the first day of a calendar period for each user-defined calendar. The alignment data also may include parameters indicating an ending day and/or the duration of the respective calendar period.

TABLE IV

| DAY | MONTH | DATE | YEAR |
|---|---|---|---|
| Saturday | May | 1 | 1999 |
| Friday | May | 1 | 1998 |
| Thursday | May | 1 | 1997 |
| Wednesday | May | 1 | 1996 |
| Tuesday | May | 1 | 1995 |

TABLE V

| DAY | MONTH | DATE | YEAR |
|---|---|---|---|
| Saturday | May | 1 | 1999 |
| Saturday | May | 2 | 1998 |
| Saturday | May | 3 | 1997 |

TABLE V-continued

| DAY | MONTH | DATE | YEAR |
|---|---|---|---|
| Saturday | May | 4 | 1996 |
| Saturday | May | 6 | 1995 |

Calendar Attributes

Referring back to FIG. 12, another feature of the calendar component 164 relates to characterizing calendar attributes. Calendar attributes (or events) correspond to various types of days, such as holidays, events (e.g., sporting events, festivals, concerts, etc.), conventions (e.g., held at the facility or nearby venues), renovations and other types of days (e.g., attractions, weather, news, etc.) that may affect operating characteristics of a business over a period of one or more days. One or more aspects of facility operation (e.g., accounts from COA) may be designed for each calendar attribute in each user-defined calendar. The accounts may be designated by a user according to the type of day and/or which specific day it is (e.g., Is it Supper Bowl Sunday?, Independence Day?, Jazz Fest weekend?, etc.). More than one event may occur on a given day of the year (e.g., overlapping special days) and/or more than one account may be designated for each calendar event. The designated accounts are analyzed, for example, by a method that applies the designated accounts to corresponding days in the stored data, which may include historical data and computed data, to determine (quantitatively and/or qualitatively) an expected level of impact associated with each designated account for each event in the selected calendar period.

Figure 15:
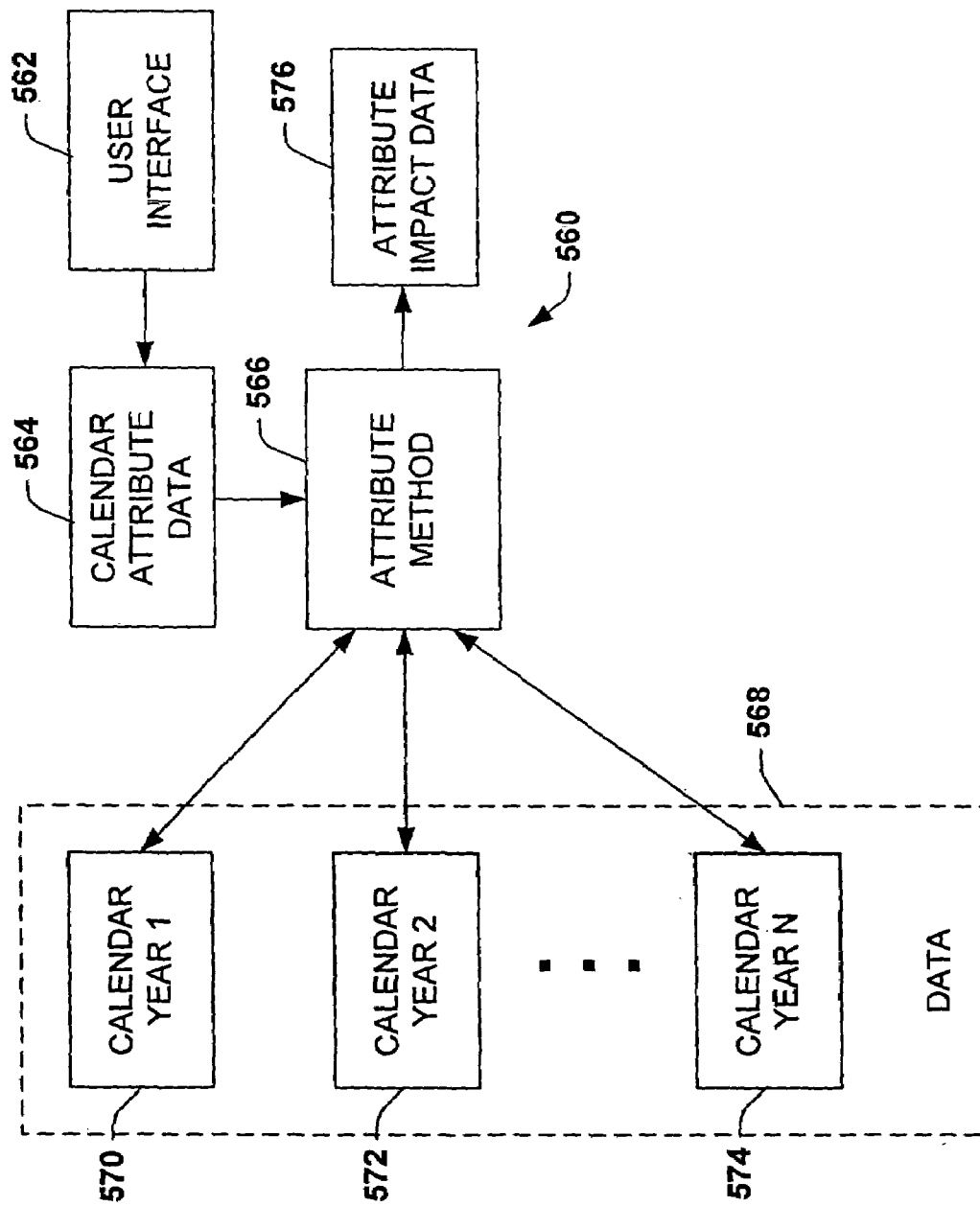
FIG. 15 is a functional block representation of a system for determining an impact associated with one or more calendar attributes in accordance with the present invention.

FIG. 15 illustrates a functional block representation of a system 560 for determining an impact associated with one or more calendar events in accordance with an aspect of the present invention. The system 560 includes a user interface 562 that receives calendar attribute data 564, which may include an identifier for each event and information identifying each designated account. An attribute method (or function) 566 applies the calendar attribute data 564 to stored data 568 that includes historical data and computed data for a plurality of calendar years 570, 572, and 574 (e.g., stored in the OKRAA database) to determine what impact (if any) may be expected for each designated account on each day corresponding to the selected calendar event. The impact for each designated account for each identified day may be provided as attribute impact data 576 that is mapped to its associated date in the budget/forecast calendar. By way of example, the system may automatically create a KRA for the determined impact for each designated account associated with the selected event. The impact value may, in turn, be employed to adjust budget/forecast data accordingly. An impact value may be determined automatically after an identified day/event and its account attributes are designated for a period of one or more days.

An example of calendar attribute data that may be entered is illustrated in Table VI. The calendar attribute data may include a name for identifying the particular event (e.g., event, holiday, convention, renovation, etc.), which is employed by the attribute method 566 to locate like days in the historical data 568. The identified day may correspond to one or more days, as specified by the date or dates entered by the user for the respective day. One or more account attributes (Attribute 1 to Attribute N) may be designated for each day, which a user may enter an expected/estimated value. The estimated value may be based on a historical analysis or on information provided by an event coordinator. The estimated value provides information that helps the user better determine which account attributes should be designated for a particular event.

TABLE VI

| Field Name | Description/Functionality |
|---|---|
| Name | Name of selected day (e.g., event) needed to mark the dates associated with them |
| Month | Month in which the attribute is to be marked |
| Year | Year in which the attribute is to be marked. |
| From Date | The From date to be selected to mark a block of Attributes |
| To Date | The To date to be selected to mark a block of Attributes |
| Attribute 1 | Name of first attribute |
| . | . |
| . | . |
| . | . |
| Attribute N | Name of Nth attribute |

Figure 16A:
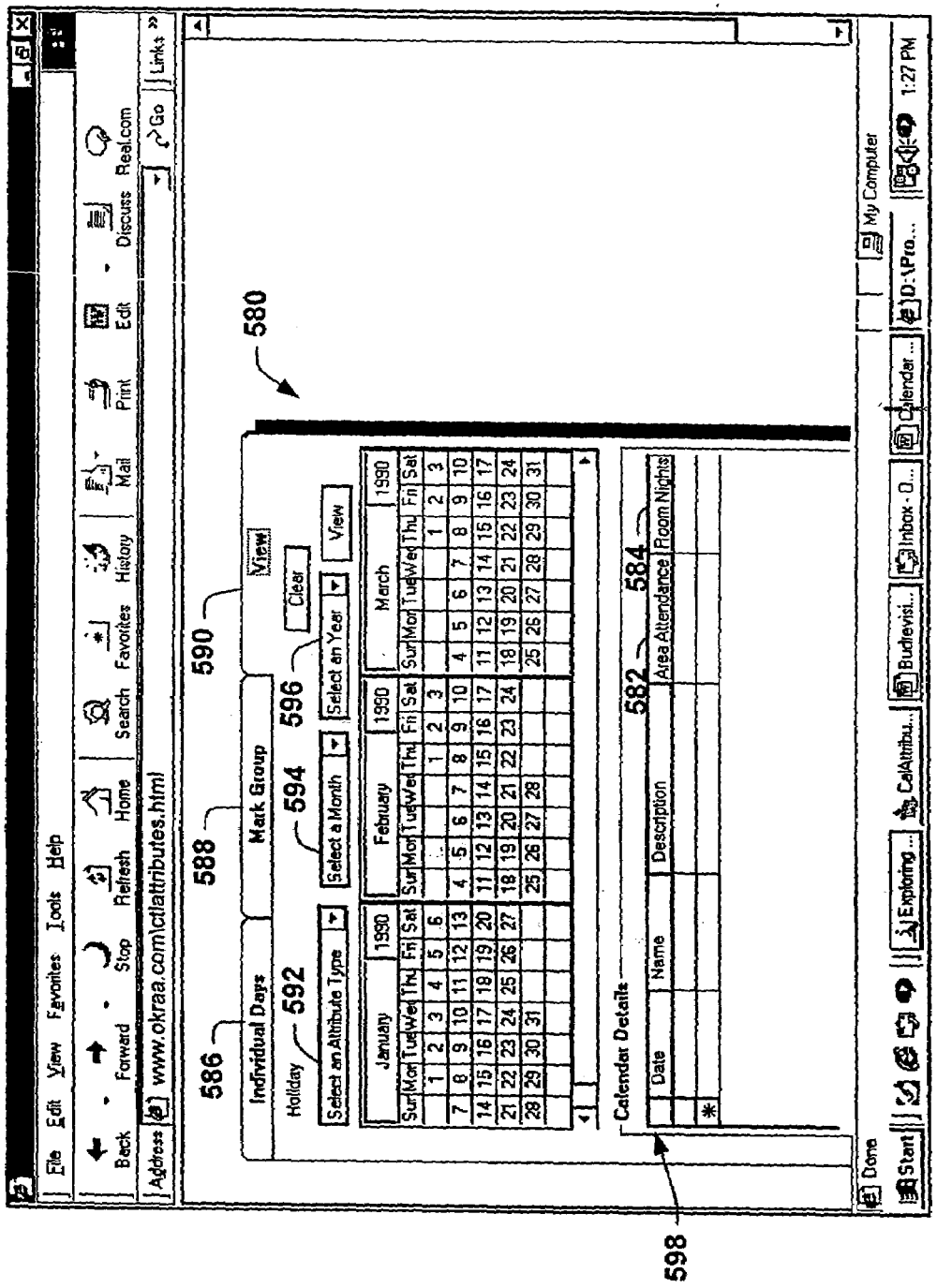
FIG. 16A is an example of a graphical user interface that may be employed to set calendar attributes in accordance with the present invention.
Figure 16B:
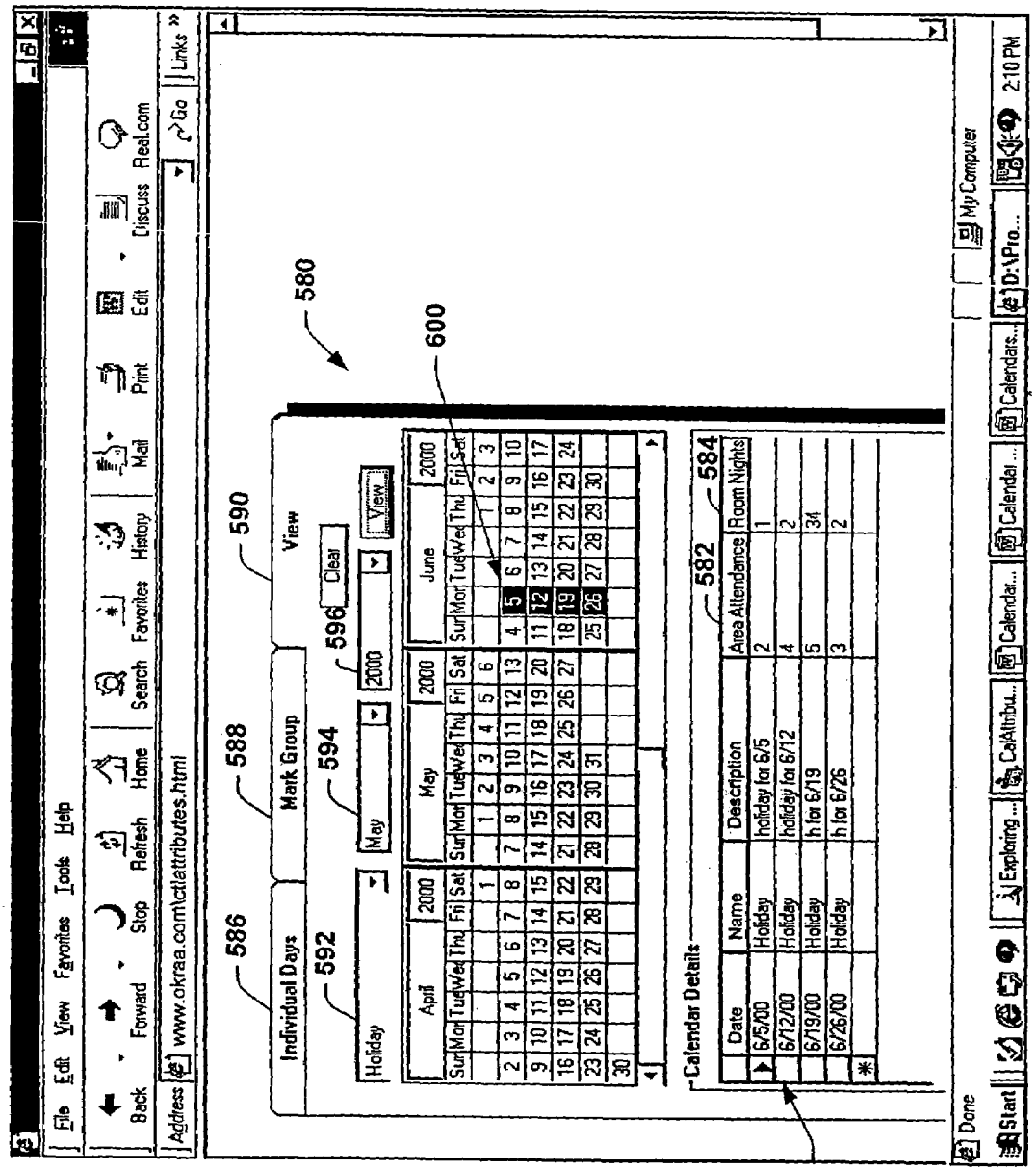
FIG. 16B is another view of the graphical user interface of FIG. 16A in which a selected group of days have been identified in accordance with the present invention.

FIGS. 16A and 16B illustrate an example of a GUI 580 that may be employed, in accordance with an aspect of the present invention, to define calendar attributes, such as may correspond to an event, holiday convention, renovation, etc. In the illustrated example, fields 582 and 584, which include area attendance and room nights, have been defined for holidays. A user enters an expected value for each field indicative of an estimated and/or expected number based on, for example, an event coordinator or based on some report. As a result, each holiday day entered as an identified day may be assigned for the area attendance and room nights to help a user determine what accounts may be impacted by the event on the appropriate days. While in this example, fields are assigned for a type of day, those skilled in the art will understand and appreciate that attributes could be assigned as a function of the particular identified day (e.g., by holiday name).

In FIG. 16A, a user may select an INDIVIDUAL DAY tab 586 to enter calendar attribute data for a single day, a MARK GROUP tab 588 to enter calendar attribute data for a group of days, and/or a VIEW tab 590 to view attribute data previously entered and the impact values associated with each such attribute. Pull down menus 592, 594, and 596 also are provided-so that a user may select a type of day, select a month and select a year. A display table 598 associated with the GUI 580 displays calendar details associated with each attribute in the selected range based on the user entered information. The display table 598 may, for example include fields for the date of the identified day, the name of the identified day, a description of each identified day, and fields identifying expected numbers for fields 582 and 584 associated with each identified day.

In FIG. 16B, for example, a group of days 600 has been selected or identified, such as via a user input device (e.g., a mouse or keyboard). The identified days are listed in the display table 598 together with estimates for selected parameters. The area attendance field 582 is provided a value indicative of the number of persons are expected due to the event on the identified day and the room nights field 584 is provided a value indicative of how many rooms/night are expected due to the event on each identified day.

Figure 17:
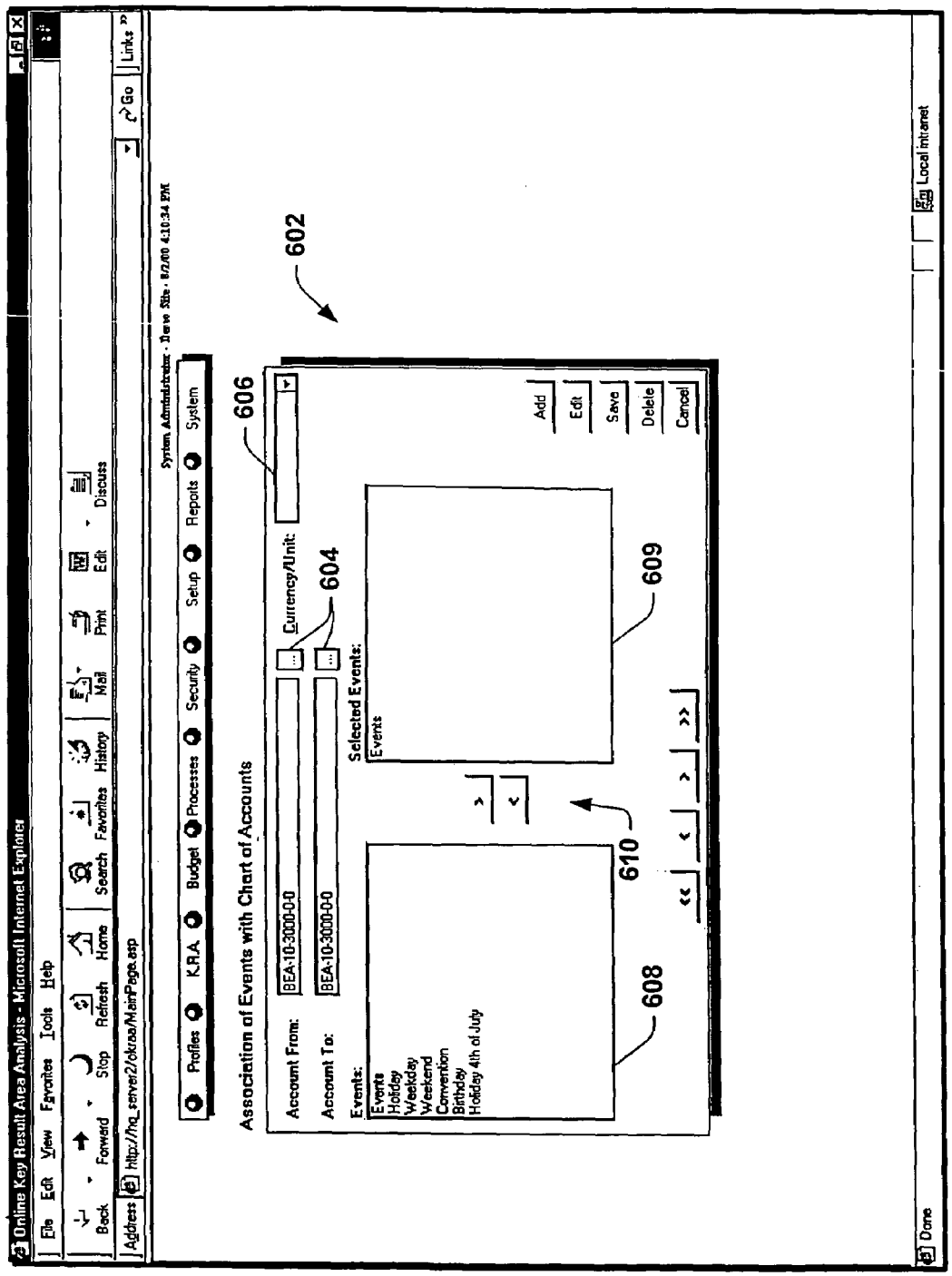
FIG. 17 is an example of a graphical user interface that may be employed to associate an event with one or more accounts in accordance with the present invention.

After an event has been defined, each event may be associated with one or more account attributes, which may be selected by a user. FIG. 17 illustrates an example of a GUI 602 may be employed to selectively associate events to accounts in accordance with an aspect of the present invention. The GUI includes user interface elements 604 for entering a range of one or more accounts to which an event is to be assigned. Another user interface element 606, which may include a drop down menu, is utilized to designate the type of unit for which an impact is to be derived. A list of events is provided in a user-selectable display portion 608. An event may be mapped between the display portion 608 and a selected events display portion 609 of the GUI 602 via mapping interface elements 610. The event mappings may be saved, modified, deleted by employing action buttons of the GUI 602.

As mentioned above, an impact is determined for each account associated with each event based on an evaluation of each respective account for at least one corresponding day in the historical data. By way of example, attributes may correspond to one or more accounts, such as the number of rooms sold, the number of covers at a hotel restaurant, labor hours for one or more aspects of facility operation, or any other quantifiable operating characteristics of an business for which historical data has been stored.

Referring back to FIG. 15, for example, the attribute method 566 may access actual data for the most recent year (e.g., CALENDAR YEAR 1) 570 that includes one or more days matching the event, such as by attribute name, description, and/or other characteristics associated with the event. If the identified day is located in, the CALENDAR YEAR 1 570, the method 566 then searches the next preceding year, CALENDAR YEAR 2, 572 to see if the identified event also exists in that year. For an annual event or holiday, it may be desirable to compare account data from the two most recent years in which the event occurred.

The designated account data for the identified event in each of the calendar years 570 and 572 may be correlated with respect to the same business unit (e.g. a hotel, a restaurant, cleaning staff, etc.) at the same facility. Alternatively or additionally, account data for the identified event may be correlated with respect to data associated with a different operating unit at the same or different facilities having data for each of the designated attributes. For example, if the calendar event is not located in the historical data associated with the same site, the attribute method of the system may search for the same or similar events at other sites based on the attribute data from which an impact value for each designated account may be determined.

The attribute method 566 compares the value of each designated attribute in the two calendar years 570 and 572 for each identified event. The attribute method 566, in turn, provides impact data having a value indicative of an impact that the identified event (e.g., an event, holiday convention, renovation, etc.) had on each designated account in the calendar attribute data 564. This comparative analysis and impact determination may be applied to each identified event for each user-defined calendar.

By way of example, if the identified day is a holiday and a selected attribute is room nights, the impact data for the room-nights attribute may provide a value indicative of an increase or decrease (or no change) in rooms sold each night in Calendar year 1 relative to the same identified day in Calendar Year 2. The impact value could correspond to a number or rooms sold and/or a percentage of change.

Those skilled in the art will understand and appreciate that any number of account attributes may be designated in connection with an identified event or days associated with the event to derive desired impact data. The attributes for a particular type of event may be predefined, such as based on an analysis of stored data, or one or more attributes may be selected by a user. In accordance with an aspect of the present invention, as set forth in greater detail below, more than one feature or method (e.g., calendar days, KRAs, profiles, action plans, etc.), may impact the same attribute(s) over a given period of time, so that the total impact on each such attribute on each day over the given time period may correspond to an aggregation of impact values for each respective day in the calendar period.

Profiles

Figure 18:
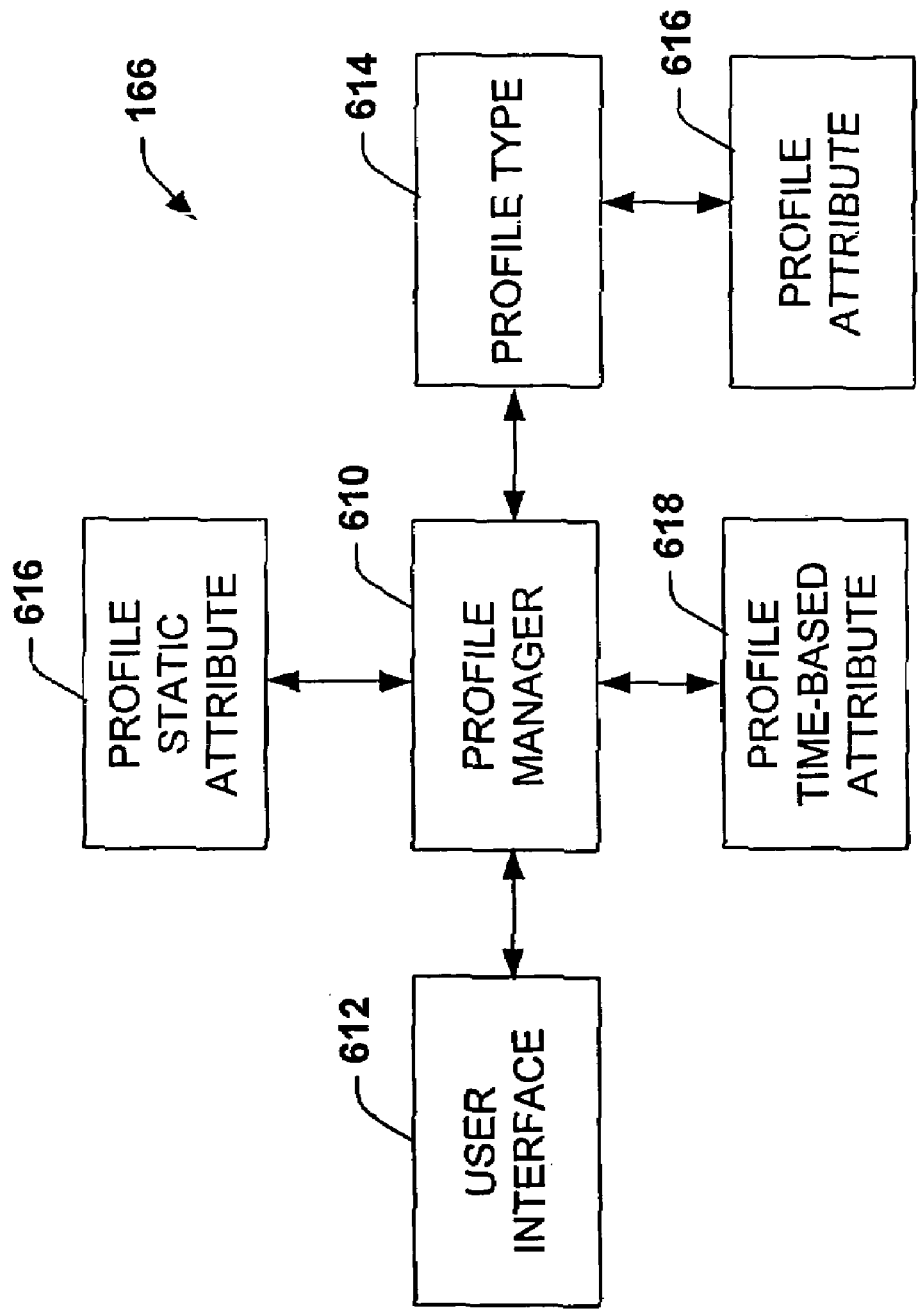
FIG. 18 is a functional block diagram of a profile component in accordance with the present invention.

As shown in FIG. 4, the system 150 also includes a profile component 166 that facilitates evaluating what internal and/or external factors may affect one or more aspect of a budget, forecast, business plan, etc. in accordance with an aspect of the present invention. FIG. 18 is a functional block diagram of the profile component 166 illustrating an interrelationship between profile-related data in accordance with an aspect of the present invention. The profile component 166 includes a profile manager 610, which may be associated with a user interface 612 to facilitate creation and modification of profiles. Generally speaking, a profile is a data structure that contains a data set (e.g., attributes) that models selected internal and/or external factors that may impact one or more operating characteristics (e.g., accounts of the COA) of a business. The attributes of a profile are selected so that one or more desired results or objectives are ascertainable based on the respective profile.

The profile component 166 also may include a profile type manager 614, which may include a user interface, for entering and storing data associated with profile attributes for each type of profile as well as an indication whether each such attribute is a static or time-based attribute. The attributes for each type of profile may be stored in a profile attribute table 616. Attributes may be predefined for each type of profile, although attributes (or attribute characteristics) also could be defined by a user during creation or modification of a profile.

Some attributes of a profile may be static attributes, which remain constant over time, while other attributes may be time-based attributes that may vary as a function of time. A user may select which attributes are to be static and which are to be time-based, such as through an appropriate user interface component. Each profile may store values for its attributes in a corresponding attribute table, indicated at 616 and 618, although profiles also could be stored as other data structures in accordance with an aspect of the present invention.

As set forth below, one or more KRAs or action plans may be created for a profile based on the attributes of the associated profile. Additionally or alternatively, one or more action plans may be created for each KRA to achieve an objective associated with the KRA and to identify an impact associated with carrying out the objective. An impact for one or more accounts of the COA may be determined based on each KRA and/or action plan associated with a profile. Moreover, a method may be developed based on a profile to further quantify an impact on one or more aspects of the budgeting/forecasting process. Such methods may be independent or associated with a KRA and/or an action plan.

An example of profile attribute data that may be utilized in accordance with an aspect of the present invention is illustrated in Table VII. Briefly stated, each profile includes a name that identifies the profile (e.g., operating as a key). A type also may be defined for a profile, which type may determine some or all of the attributes that may be employed to define the profile. The predefined attributes for each type of profile may for example be stored in connection with the profile attributes table 618 of FIG. 18. A profile also may be assigned a date range (one or more days) and a site ID for which the profile is to be applicable. Additionally, a user (e.g., a department head, manager, etc.) may enter values for each attribute in the profile. A user may enter the attributes and values for the attributes of a particular profile or the information may be retrieved from a commercially available database. One such database is the STAR™ database, which is commercially available from Smith Travel Research of Hendersonville, Tenn. As mentioned above, some of the attributes may be static and others may vary over time.

Another aspect of a profile is a SWOT field with which a user may characterize the Strengths, Weaknesses, Opportunities, and Threats associated with a particular profile.

The SWOT data may be based on a user's own experience or based on publicly available information.

TABLE VII

| Field | Description |
| --- | --- |
| Profile Name | The name of the profile |
| Profile Type | The type of the profile (e.g. attraction, event, competition, etc.) |
| Profile description | The description of the named profile |
| Date Range | The date range of the profile |
| Distance | The distance of the profile form the site/property |
| SWOT | The 'Strength', Weakness', 'Opportunities' and 'Threats' a particular 'profile type' may possess |
| SWOT Description | The description of the 'SWOT' |
| Attribute Name | The list identifying all attributes of a particular profile (e.g., Location, Traffic |
| Attribute Value | The values associated with each attribute |
| Site ID | The site/location associated with a particular attribute |
| Time-based attributes | Information about a time-based attribute's month wise for the budget year (BY), the previous year(BY − 1) and the year prior to that(BY − 2) |

Figure 19A:
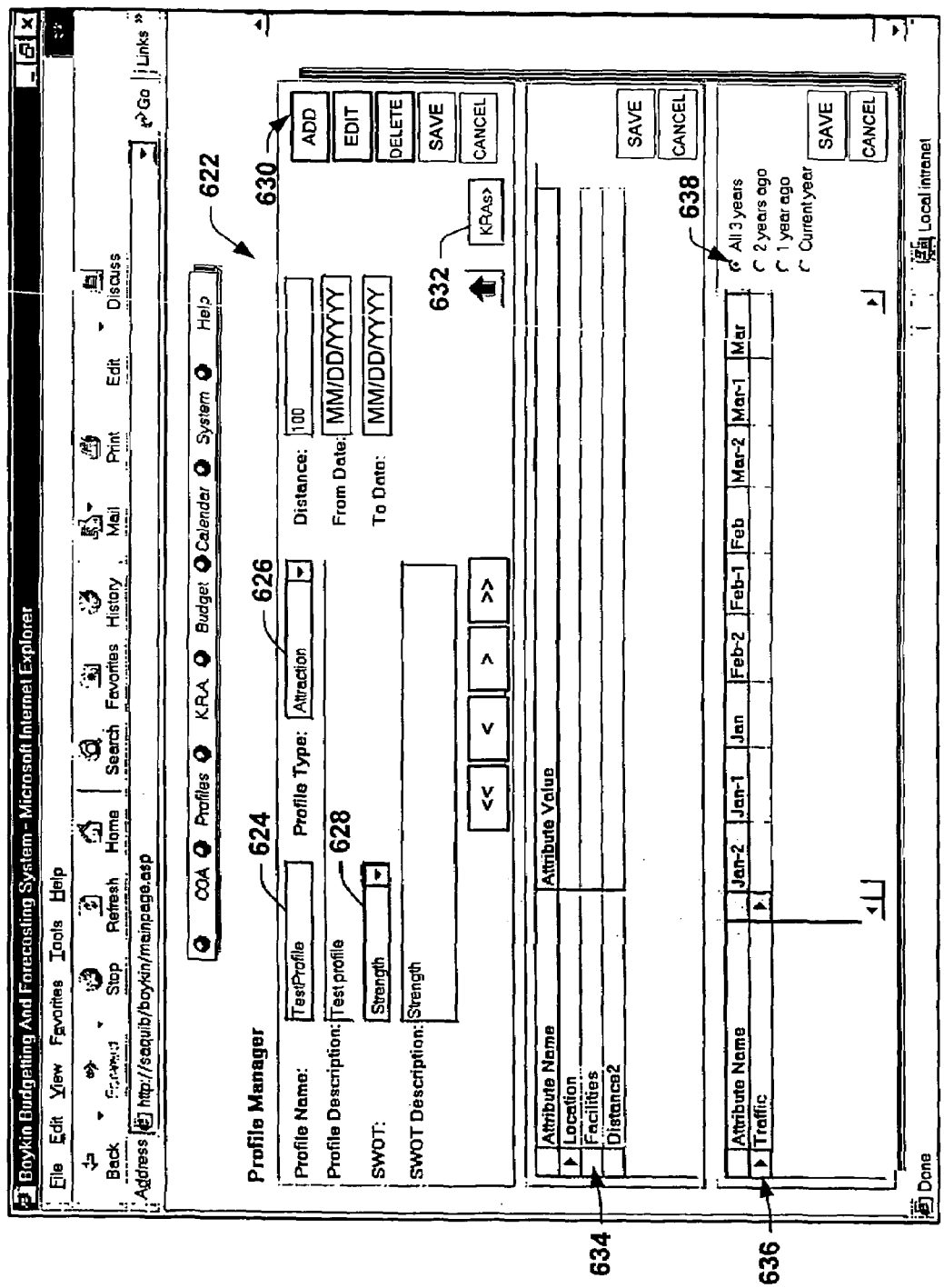
FIG. 19A is an example of a graphical user interface that may be employed to manage profile characteristics in accordance with the present invention.

FIG. 19A illustrates an example of a GUI 622 (illustrated as running within an Internet browser) that may be employed to create and/or modify a profile in accordance with an aspect of the present invention. The GUI 622 includes, for example, several user interface elements in which a user enters appropriate information associated with a profile being created. The user interface elements may correspond to the fields identified in Table VII above. In particular, the GUI 622 includes a user interface element 624 for entering the name of the profile. Pull down menus 626 and 628 also are associated with the profile type field and the SWOT field, respectively, which a user may employ to select from among several predefined profile characteristics.

The GUI 622 also includes action buttons 630 with which a user may perform selected operations concerning a profile. For example, a user may add a new profile, edit an existing profile, delete a stored profile, save the currently entered profile characteristics and update the profile table in the database, and/or cancel the last operation performed. Another action button 632 is provided to link a profile to one or more KRAs that may be utilized to achieve a desired result concerning one or more attributes associated with the respective profile.

The GUI 622 further includes a user-interface element 634 for static profile attributes and another user-interface element 636 for time-based profile attributes. The user-interface elements 634 and 636 may be employed to enter and store attributes and values for such attributes. The user-interface element 636 further may include a selection indicator 638 that may be employed to select a desired time base. For example, the time-based attributes may be entered over a time base covering the most recent three years, for up to two years ago, for up to one year ago, or a time period including only the current year. Values for each of the time-based attributes may, in turn, be entered for an incremental part of the selected time base (e.g., monthly, semi-monthly, quarterly, etc.). It is to be appreciated, however, that other time bases and incremental parts thereof also could be utilized to create a profile in accordance with an aspect of the present invention. A method also may be associated with each time-based attribute for deriving the attribute values for each interval of the selected time base.

Figure 19B:
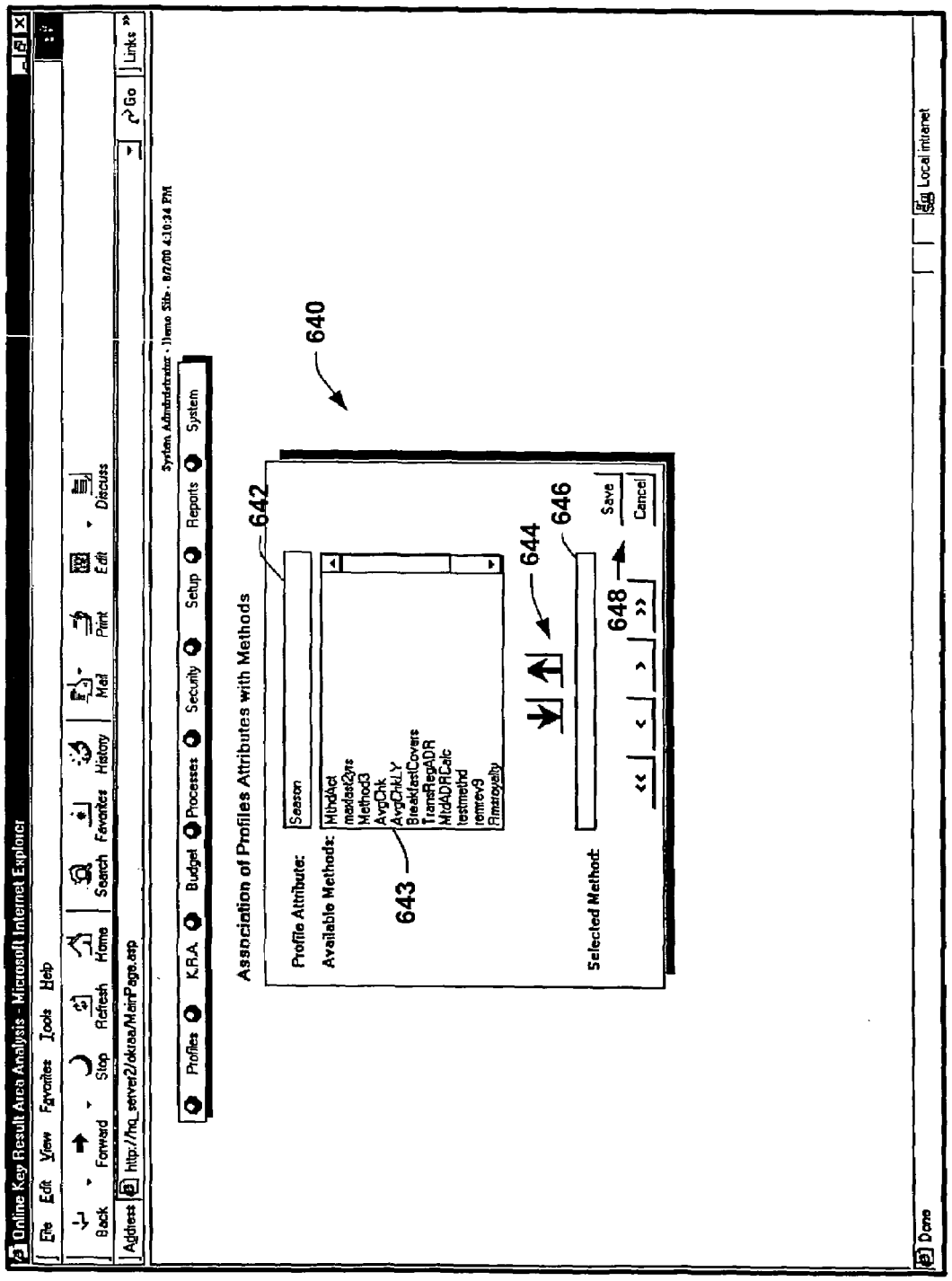
FIG. 19B is an example of a graphical user interface that may be employed to associate a profile attribute with a method in accordance with the present invention.

FIG. 19B illustrates an example of GUI 640 that may be employed to associate a profile attribute with a method. The GUI 640 includes a user interface element 642 for identifying each attribute for which a method is to be assigned. A method is selected is from an interactive list 643 of available methods, such as by activation of an appropriate user interface element 644. The user interface element 644 is operative to select and deselect a method for the profile identified in the user interface element 642. A selected method is displayed in a selected method field 646 of the GUI 640. The association between methods and profile attributes may be saved via action buttons 648.

FIG. 20 illustrates an example of a profile data structure 650 for a competition profile, such as may be generated with the GUI 622 of FIG. 19A. Profile details 652 may be entered into a profile to define items, such as, for example, a profile's name (New Supply), a profiled property's type (Competition), a description of the profiled entity or situation (Hotel 1), a date range over which the facility is profiled, the distance from the profiled site to the potentially affected site, a Strength/Weakness/Opportunity/Target (SWOT) designator (T=threat) and SWOT description (dilute demand). The illustrated example includes a plurality of time-based attributes 654, for which values are to be provided (e.g., based on application of corresponding methods) for the three preceding years (Yr-3, Yr-2, and Yr-1) 656, 658, and 659. The attributes, which are listed for purposes of illustration, indicate several data points that may be useful in evaluating competition relative to the identified business (Hotel 1). It will be understood and appreciated by those skilled in the art-that a greater (or lesser) number of data points may be utilized in accordance with the present invention.

Key Result Areas

Referring back to FIG. 4, another aspect of the system is a key results area (KRA) component 168 for, in accordance with an aspect of the present invention, capturing and quantifying an impact on one or more selected budget entities (or accounts) of the COA. A KRA may be an independent entity for characterizing a desired result or impact on a selected COA item. Alternatively or additionally, a KRA may be defined as a result that may be desired to influence one or more account attributes associated with a predefined profile, such as shown and described with respect to FIGS. 18-20. As mentioned above some KRAs may be generated by the system, such as for designated accounts associated with identified calendar attributes. A KRA also may be associated with one or more action plans, as described below, which establishes a cost or expense that may be associated with achieving the result defined by the KRA. Each KRA may be assigned an impact value for the account attribute associated with each respective KRA, which may further be provided as a percentage of a value derived by a selected method.

Table VIII illustrates an example of data that may be entered as part of a KRA. The characteristics of a KRA may be better appreciated with reference to FIG. 21.

TABLE VIII

| Field Name | Description/Functionality |
| --- | --- |
| KRA Name | The name of the KRA |
| Profile Name | The profile name that may be associated with the KRA |
| Description | The description of the particular KRA |
| Account From | The starting attribute (COA) for the KRA |
| Account To | The ending account (COA) for the KRA |
| Accumulator | The user can either select Account From and Account To or an Accumulator that has been defined in the system |
| From date | The starting date for the KRA |
| To Date | The ending date for the KRA |
| Impact Type | The type of impact - percentage or Absolute Value |
| Method | In case of a percentage type of impact, a user may select a method to apply for that impact |
| Impact % | The value of impact in percentage terms |
| Impact Value | The absolute value of the impact |
| Objective | A user-defined objective of the KRA |

Figure 21:
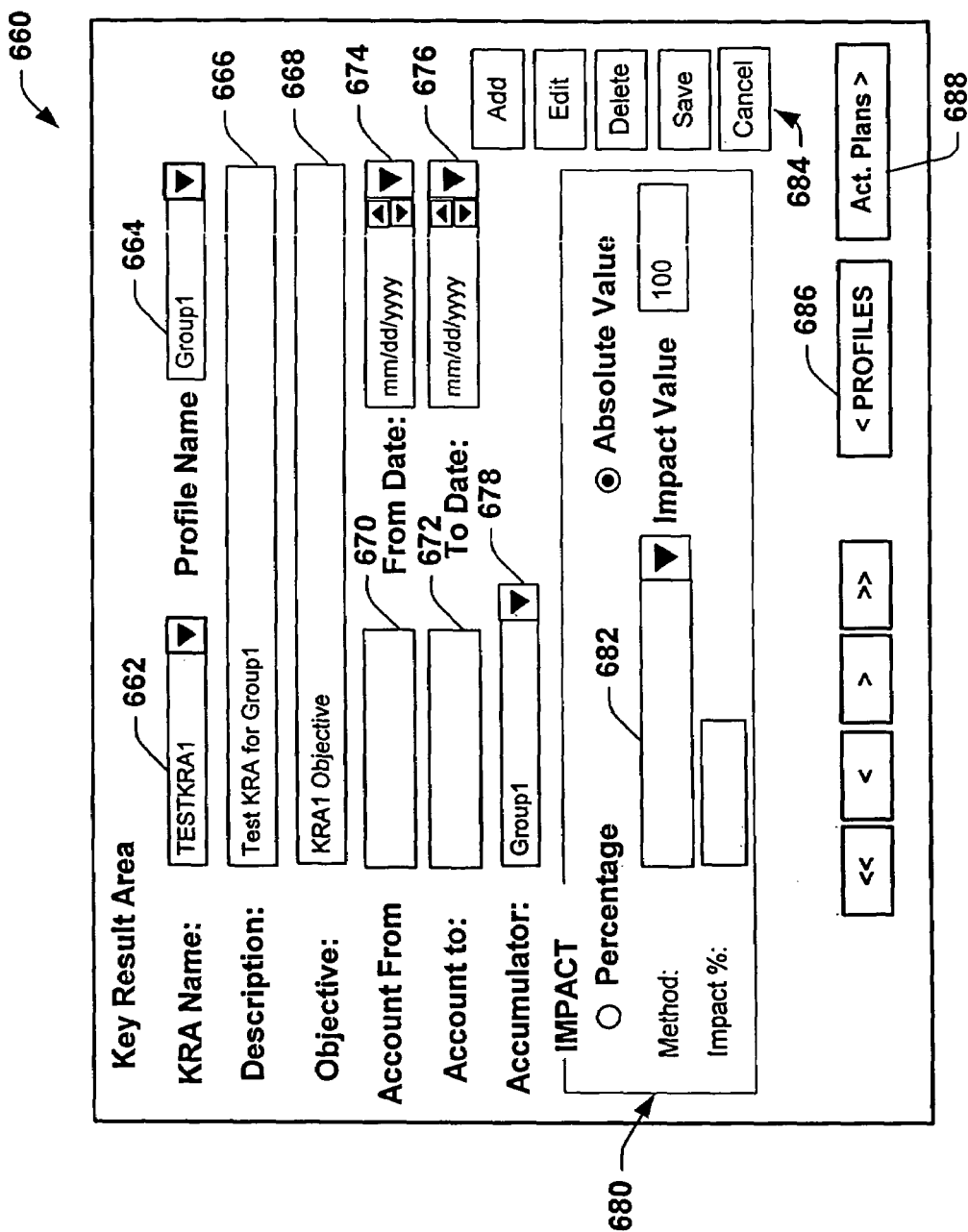
FIG. 21 is an example of a graphical user interface that may be employed to manage key result area characteristics in accordance with the present invention.

FIG. 21 illustrates an example of a GUI 660 that may be employed, in accordance with an aspect of the present invention, for defining characteristics of a KRA. Briefly stated, each KRA is provided a name, such as may be entered at a user interface element 662. The user interface element 662 may include a drop-down menu for displaying a list of predefined KRAs. Another user interface element 664 may be employed to link the named KRA to a selected one of a plurality of predefined profiles. A user also may enter a description of the named KRA as well as an objective that the user may intend to achieve in respective input fields 666 and 668.

Additionally, the system 150 (FIG. 4) may be programmed and/or configured to retrieve a list of one or more KRAs based on stored KRA data, from which a user may select an associated KRA that might better characterize a desired result. For example, the system may store KRA data, including a KRA name, description, and/or other associated characteristics for each created KRA. The system also may store data indicative of the actual impact realized in connection with each KRA. When a user employs the GUI 660 to create a new KRA, a search thus may be performed to locate related KRAs (from none to any number) from the stored KRA data. The related KRAs may be retrieved, for example, based on the name, description and/or any other attribute of the KRA being created. The retrieved list of the related KRAs provides the user with a choice of applying the new KRA the user has created (or is in the process of creating) or applying one of the related KRAs. The list of related KRAs further may include one or more system generated KRAs having computed impact values, such as an impact percentage. A computed impact value may be determined as a function of the actual results realized for a related stored KRA in one year relative to the actual results of the same (or different) KRA in a different year, such as a preceding year. The user thus may select (e.g., via a suitable user input device) one of the retrieved KRAs or utilize the KRA created by the user or modify the user-created KRA, such as based on information associated with the retrieved list.

As mentioned above, a KRA may apply to one or more accounts of the system COA over a selected date range. In this regard, the KRA GUI 660 also includes user interface elements 670, 672, 674, and 676 for entering a range of one or more accounts, a date range, as well as a drop-down menu 678 for entering a selected accumulator name. As mentioned above, an accumulator is name associated with a selected group of one or more accounts in the COA, which might be further limited to a selected account level.

The KRA GUI 660 may further include an impact user-interface element 680, with which a user may select the type of impact (percentage or absolute value) as well as a numerical impact number associated with the selected type of impact. The impact user-interface element 680 also includes a method selection user interface element 682 for linking a method to the identified KRA in accordance with an aspect of the present invention.

As described above, a KRA may be linked to a predefined method that is to be applied to the selected account(s) to derive an impact based on the data processed by the method, such as based on budget parameters in the budgeting/forecasting process (e.g., date range, account range, etc.). The method selection user interface element 682 may include a drop down menu listing the available methods that are applicable based on how the accounts have been selected. For example, some methods may only be applicable to a single account, other methods may be applicable to range of accounts, and other methods may be applicable to a set of accounts, such as may be defined by an accumulator. In this way, if an impact percentage is entered for a particular KRA attribute (e.g., an account of the COA), an associated method may derive value(s) associated with one or more other to which the impact percentage is applied to compute the impact value.

By way of example, a method (e.g., a maximum rooms sold method for a hotel) may be applied to the historical data for the selected accounts (elements 670, 672, 678) to determine, for example, the maximum number of rooms sold in the date range indicated at 674 and 676. The impact percentage may, in turn, be applied to the numerical result derived by the method to provide a corresponding impact value for the associated KRA. Moreover, a user may modify the KRA impact percentage and/or the method applied, such as via the GUI 660, which, in turn, may result in a corresponding update in the associated impact value.

The GUI 660 also includes action buttons 684 that may be activated or selected to add a new KRA, edit an existing KRA, delete an existing KRA, save a KRA to the system database, cancel a previous operation, and/or to sort through stored KRAs. The GUI 660 also may include action buttons 686 and 688 that provide links to a profile manager and to an action plan manager. The buttons 686 and 688 may provide a list of profiles and action plans associated with the corresponding KRA, so as to facilitate coordination between a KRA and one or more profiles and/or action plans.

Action Plan

With reference back to FIG. 4, the system 150 includes an action plan component 170 through which a user may implement and/or manipulate one or more action plans in accordance with an aspect of the present invention. An action plan may be utilized to budget, forecast, and/or plan expenses that may be required to achieve a business objective, such as budget revenue targets for one or more selected account areas. By way of example, an action plan enables a user to specify a time frame in which such expenses may be incurred, where in the COA such expenses may be incurred, and by whom (e.g., which employee(s) or business unit) such expenses are to be incurred. An action plan also provides a mechanism to establish employee goals and: objectives by date and to track their progress, which action plan may or may not have an impact on the budgeting process. A non-impacting action plan, for example, may correspond to a plan/goal that is to be assigned to an employee within the normal scope of the employee's duties and with which no additional expenses are associated.

An action plan may be utilized independently or in conjunction with one or more profiles and KRAs. For example, a user (e.g., a budgeting manager or department head) may evaluate defined profiles and KRAs via their appropriate GUIs (see, e.g., FIGS. 19A and 21) and formulate an action plan(s) for some or all of the KRAs and profiles within the user's responsibility. One or more action plans may be developed to achieve revenue targets associated with each KRA or profile and to identify expense items in the COA that may be affected by such action plans.

Table IX illustrates an example of the types of fields that may be defined to create an action plan in accordance with an aspect of the present invention. The fields and their relationship within the system 150 (FIG. 4) may be better appreciated with reference to FIG. 22.

TABLE IX

| Field Name | Description/Functionality |
| --- | --- |
| Action Plan Name | The name of the Action Plan |
| KRA Name | The KRA name that may be associated with the Action Plan |
| Description | The description of the particular Action Plan |
| Account From | The starting attribute (COA) for the Action Plan |
| Account To | The ending account (COA) for the Action Plan |
| Accumulator | The user can either select Account From and Account To or an Accumulator that has been defined in the system |
| From/to date | The date range for the Action Plan |
| Assigned To | The Job Description (e.g., employee) to which the Action Plan is assigned to |
| Due Date | The due date for the particular Action Plan |
| Status | Indicates whether the action plan is active or inactive |
| Status Comment | Comment describing the current status of the Action Plan |
| Completion Date | The Completion Date for the particular action plan, which is set when the Action Plan was created. |
| Impact Type | The type of impact - percentage or Absolute Value |
| Method | In case of a percentage type of impact, a user may select a method to apply for that impact |
| Impact % | The value of impact in percentage terms |
| Impact Value | The absolute value of the impact |

FIG. 22 illustrates an example of an action plan GUI 690 that may be utilized to add, remove, and/or manipulate action plan data in accordance with an aspect of the present invention. The GUI 690 includes a user interface element 692 that may have a drop-down menu that is utilized to enter or select a name of an action plan. Another user interface element 694 may be employed to link the selected action plan to a selected KRA from a plurality of predefined KRAs. A user also may enter a description of the action plan objective via 696.

As mentioned above, an action plan may be applicable to one or more accounts of the system COA over a selected date range. In this regard, the action plan GUI 690 also includes user interface elements 698 and 700 for entering a range of one or more accounts, and a drop-down menu element 702 for alternatively entering a selected accumulator name. Additional user-interface elements 704 are provided for selecting an applicable date range for an action plan (e.g., a range over which the expense may be amortized) and a due date by which the action plan is to be completed.

The action plan GUI 690 also includes a user interface element 706 for entering a name of the person(s) to whom the action plan is assigned. Additional fields 708 and 710 may be provided to enter a status value for the action plan (e.g., active or inactive) and comments that may pertain to the action plan. An action plan further may be linked with one or more external applications 80, 82, and/or 84 (FIG. 2), such as through the fields entered at elements 706, 708, 710 through which an employee may receive information identifying his/her goals and objectives.

The GUI 690 further includes an impact interface feature 712, with which a user may select the type of impact (percentage or absolute value) as well as a numerical value for the impact according to the selected type of impact. The impact interface feature 712 further may include a method selection user interface element 714 for linking a method to the identified action plan in accordance with an aspect of the present invention, such as when a percentage impact type is selected. As described above, an action plan may be linked to a pre-defined method that is to be applied to the selected account(s), such as to correlate related data and provide an indication as to the action plan's impact on one or more accounts. The method selection user interface element 714 may include a drop down menu listing the available methods that are applicable based on how the accounts have been selected (via user interface elements 698, 700, 702). For example, some methods may only be applicable to a single account, other methods may be applicable to range of accounts, and other methods may be applicable to a set of accounts, such as may be defined by an accumulator.

By way of example, if a percentage impact is entered for a particular action plan attribute (e.g., an account of the COA), an associated method may provide an impact value for each account associated with the action plan. By way of example, an action plan designed to achieve a desired result (e.g., an action plan to increase the number of contract rooms sold at a hotel) may have a cost impact associated with achieving that goal. For example, additional advertising money may be required to solicit business from corporate clients. The action plan may further include an associated method (e.g., an advertising expense method), which is applied to the historical data to determine some value indicative of the impact on the identified accounts. The method processes the historical data to determine a number based on the operands and expressions in the assigned method. The impact percentage is applied to the method number (e.g. an amount by which the identified accounts may be impacted as a result of an increase or decrease in advertising dollars for the action plan), which corresponds to the impact value associated with the corresponding action plan. Moreover, a user may modify a defined action plan value (the impact value, the method, etc.), such as via the GUI 690, which, in turn, may result in a corresponding update in the impact value associated the related accounts.

The GUI 690 also includes action buttons 716 that may be activated or selected to add a new action plan, edit an existing action plan, delete an existing action plan, save a action plan to the system database, cancel a previous operation, and/or to sort through stored action plans. The GUI 690 also may include action buttons 718 and 720 that provide links to a profile manager and to a KRA manager, respectively. The buttons 718 and 720 may be employed to facilitate coordination between an action plan and one or more profiles and/or KRAs. For example, the profile action button 718 may display a list of profiles to which the current action plan belongs. Similarly, the KRA action button 720 may allow a user to view the KRA to which the action plan belongs.

FIG. 23 is an example of a GUI 730 containing tables 732 and 734 that list the names for each KRA and action plan, respectively. The KRA table 732 includes fields 736 and 738 for the KRA name and a profile type, with which each KRA may be associated. The KRA table 732 is also associated with action buttons 740 that may be activated or selected to add a new action plan, edit an existing action plan, delete an existing action plan, save a action plan to the system database, and/or cancel a previous operation. Similarly, the action plan table 734 includes fields includes fields 742 and 744 for identifying the action plan name and a profile type, with which each action plan may be associated. Action buttons 746 also are associated with the action plan table 734.

Work Bench

Figure 24:
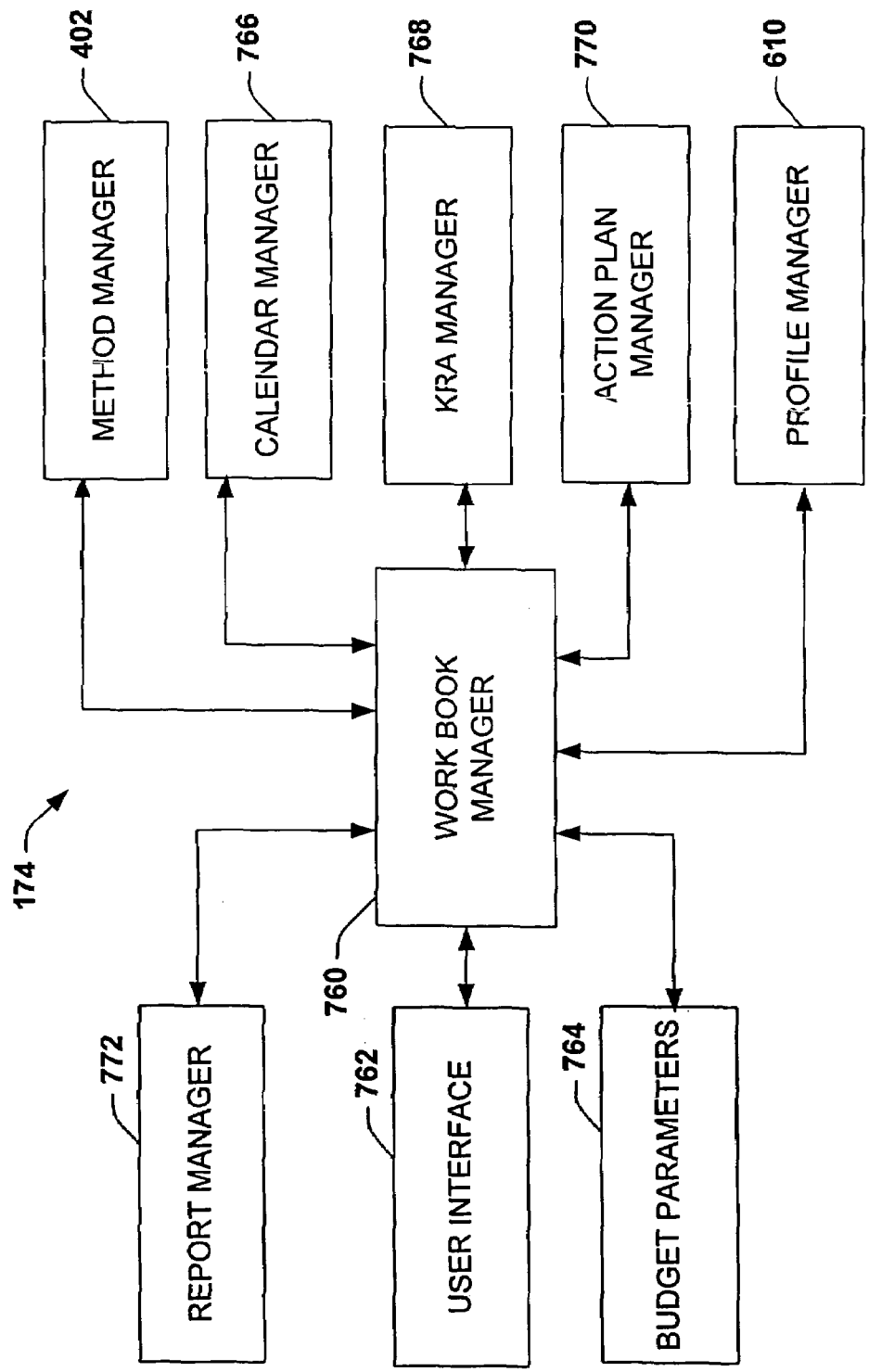
FIG. 24 is a functional block representation of a work bench management system in accordance with the present invention.

FIG. 24 is a functional block representation of the work bench component 174 in accordance with an aspect of the present invention. Briefly stated, work bench provides a powerful tool that integrates the functionality associated with other aspects of the system 150 to facilitate budgeting, forecasting, trend analysis, and/or business planning down to the lowest level at which data is stored for any aspect of a company or business.

The work bench component 174 includes a work bench manager 760 that coordinates budgeting and forecasting processes with various components that comprise the system 150 (FIG. 4). A user interface 762 is associated with the work bench manager 760 through which the user may enter and/or select budgeting/forecasting parameters 764 that are to be applied to data (e.g., historical and/or computed data) stored within the system. The parameters 764, may, for example, correspond to an account range, a selected user-defined calendar, a date range within one of the calendars, or any other parameters that may be utilized to help define and/or formulate a budget/forecast.

For example, the work bench manager 760 is associated with the method manager 402, a calendar manager 766 (which may include the calendar alignment function 548), the profile manager 610, as well as managers 768 and 770 that are respectively associated with the KRA component and the action plan component. The work bench manager further may include a work bench view component through which a user may selectively view and compare current budget/forecast data with corresponding data for one or more previous years. As a result, a user may better determine the efficacy of budgeting /forecasting parameters and, if desired, selectively modify various aspects of the budget for one or more accounts of the COA. Moreover, the work bench view in conjunction with the various interrelated interface components 402, 766, 768, 770, 610 facilitates implementation of speculative scenarios, in which a user may see how various aspects of the budget may be affected if certain changes are made to one or more methods, KRAs, Calendar attributes, action plans, profiles, etc. Implementation of such scenarios through the work bench component may be referred to as a "What if . . ." analysis. The user interface 762 thus provides a powerful centralized tool through which a user may utilize the other components that form the system 150 (FIG. 4) to produce an effective budget/forecast so as to increase profits.

A report manager 774 also may be associated with the work bench manager. The report manager 774 provides a tool from which a user may create budget reports based on user-defined parameters.

Table X illustrates examples of data fields that may be entered to implement budgeting and/or forecasting for each COA ID in a given budget in accordance with an aspect of the present invention. The Table X may be better appreciated with reference to FIG. 25A.

TABLE X

| Field Name | Description/Functionality |
| --- | --- |
| Budget | A drop down menu for selecting a budget name |
| Account type | A drop down menu for selecting an account type |
| Source | A drop down menu for selecting a source name |
| Currency/Unit | A drop down menu for selecting a type of currency or a unit |

TABLE X-continued

| Field Name | Description/Functionality |
| --- | --- |
| Account From | A starting account for a budget process |
| Account To | An ending account for a budget process |
| From date | A starting date for the budget process |
| To Date | An ending date for the budget process |
| Budget orientation | The mode of orientation for the budget process |
| Load | Initiates loading of a current budget |
| Account ID | A field for displaying an account ID (COA ID) |
| Ref/ceilings | A ceiling for the account |
| Reference Method | A user-selectable field indicating a reference method utilized for budgeting |
| Method | A user selectable field indicating base method utilized for budgeting |
| Base data | A field indicating budget data based on applying the Method to stored data |
| Impact | A field gives the net impact in numbers (according to the currency/unit) |
| Manual Changes | A user selectable field for specifying an impact in numbers (according to the currency/unit) |
| Budget | The sum of the budget data and impact |
| Ref2 | A field indicating budget data based on the Reference Method |
| Variance | A variance based on Ref2 and the Budget |

Figure 25A:
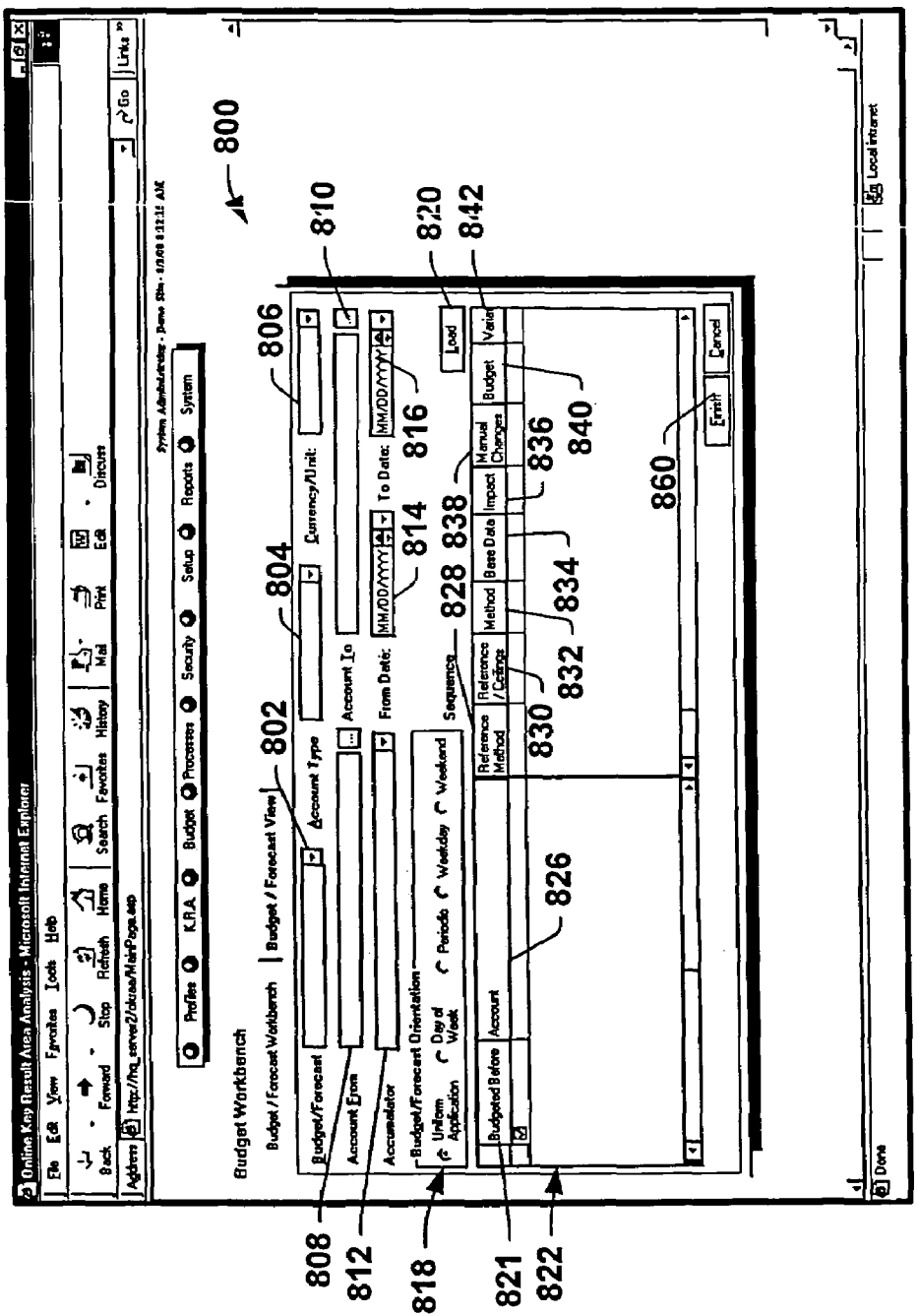
FIG. 25A is an example of a graphical user interface that may be employed to manage work bench characteristics in accordance with the present invention.

FIG. 25A is an example of a work bench manager GUI 800 (illustrated as running on an Internet browser) in accordance with an aspect of the present invention. The GUI 800 includes a plurality of fields that define the budget/forecast characteristics that are to be displayed in connection with an identified budget/forecast process. The GUI 800 includes a user interface element 802 for specifying which budget/forecast process is to be active, such as may be selected from an associated drop down menu. The GUI 800 also includes user interface elements 804 and 806 for respectively entering a type of account (e.g., expense, revenue) and the units (e.g., U.S. dollars, rooms, number of covers, etc.) that are to be utilized for the specified accounts. Account user interface elements 808, 810, and 812 also are provided for entering which accounts are to be employed by the work bench component, which accounts may be selected by specifying an account range or by selecting a desired accumulator name. A date range for performing an analysis also may be selected via user date interface features 814 and 816. The GUI further includes an orientation interface element 818, by which a user may select a desired orientation, such as a uniform application, by day of the week, periodic, weekday, or weekend. Certain orientations may be limited according to other parameters selected, such as according to the account type at 804 and/or units at 806. Once the foregoing parameters have been programmed a user may load corresponding budget data into active memory, such as by activating a "load" action button 820. As a result of activating the load button 820, corresponding budget/forecast data is displayed on an interactive display portion 822 of the GUI 800. The display portion 822 is interactive because it allows a user to select certain displayed fields associated with an account and to modify its associate attributes. As indicated with respect to table X, the displayed fields include an indication whether the data has been budgeted before 824, for example, if the account item has been budgeted before a check mark may show in an associated box with that account ID. An account Id field (COA ID) 826 also is displayed for the budget/forecast data. The account ID indicates which account in the COA the data represents.

Figure 11D:
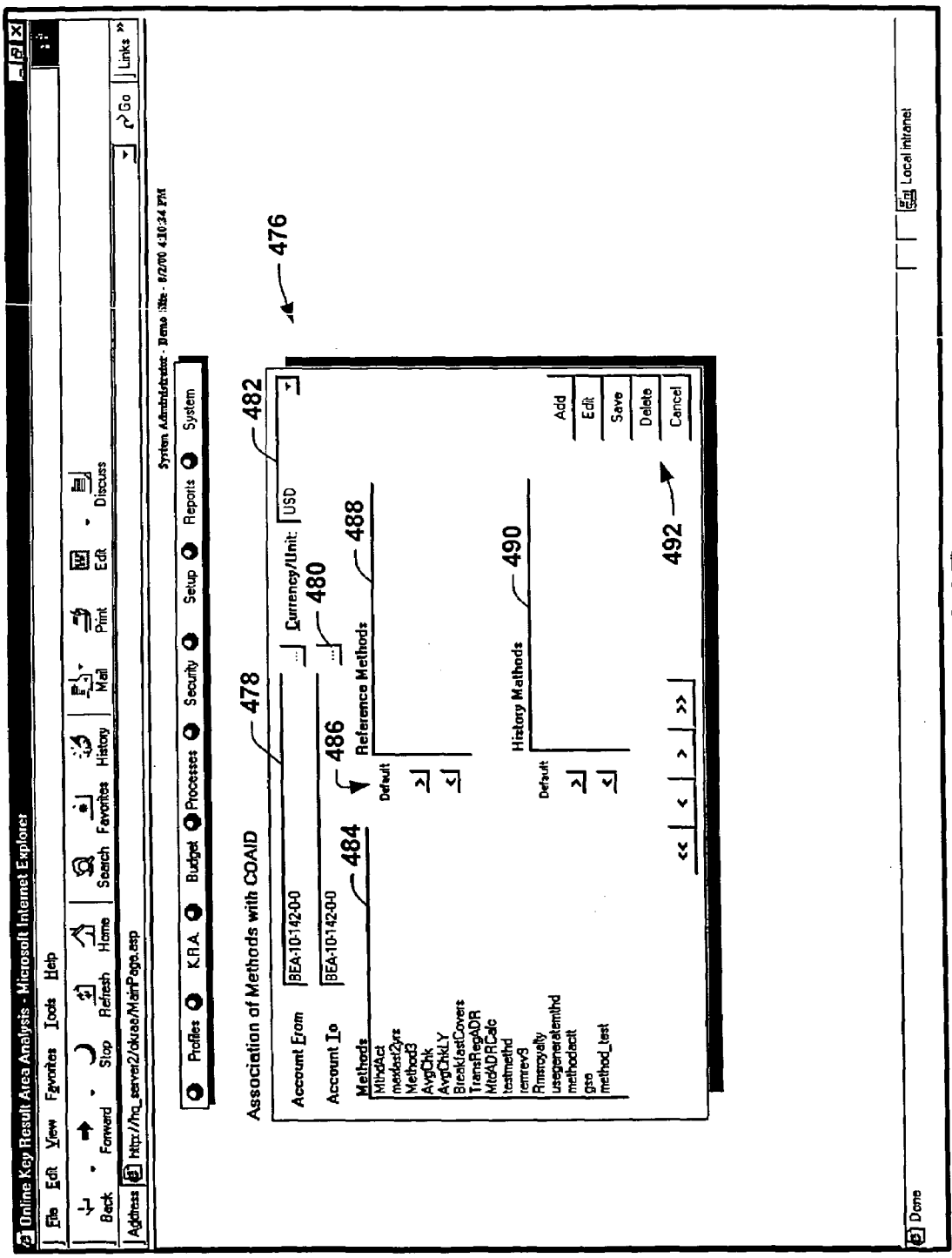
FIG. 11D is an example of a graphical user interface that may be employed to associate a method with one or more accounts in accordance with the present invention.

The remaining fields 828 through -840 are user selectable fields that may be adjusted to alter the associated budget data. A reference method field 828 indicates the reference method assigned to that account ID for the present units being employed. A user, for example, may select a reference method field associated with a particular account ID to modify the reference method. The result of the reference method may be displayed in a reference field (not shown) that may be compared with the computed budget/forecast for each account in the selected range. Similarly, a reference ceiling may be changed to provide for other reference ceilings. The display 822 also includes a method field 832 that identifies the base method (see e.g., FIG. 11d) that is assigned to each account. The user may activate the field in order to select an alternative method to be applied from those methods associated with that account. The base data field 834 indicates a base level of budget/forecast data for an account based on application of the method of field 832 to the stored data. Accordingly, if the method in field 832 is modified, the budget data in field 834 also might change.

The display portion 832 further includes an impact field 836 that displays the impact associated with that account. As mentioned above, the impact may be an aggregate of a plurality of impact values based on, for example, KRAs, action plans, and/or calendar attributes associated with the displayed account. A user may activate the field 836 to selectively modify one or more of such criteria. For example, a user may modify an associated KRA, action plan or calendar attributes to result in a modified level of impact on that account. In addition, a user may enter manual changes at field 838. The manual changes entered by a user may result in a system generated KRA having an impact value as entered by the user at field 830. Each time such changes are made, the corresponding budget data also is modified so that the user may see on the display 822 how such changes affect the budget/forecast data. The results of the budget data are provided in field 840, which combine the base data at field 834, the impact data at 836 and the manual changes entered at 838. A value associated with the reference method at field 828 also may be displayed as well as a variance in field 842.

Another powerful tool associated with the work bench component is a budget/forecast view feature. The view feature includes a GUI 850 for displaying a comparison of the current budget/forecast. The GUI 850 includes a source selection interface 852 in which a user may identify the source of the data being displayed in the budget/forecast work bench view GUI 850. The displayed data may include the account ID together with the description thereof, indicated at 854. Next to each account number, are the data for the current budget (field 856) and the data associated with that account from one or more previous years (fields 858).

Figure 25B:
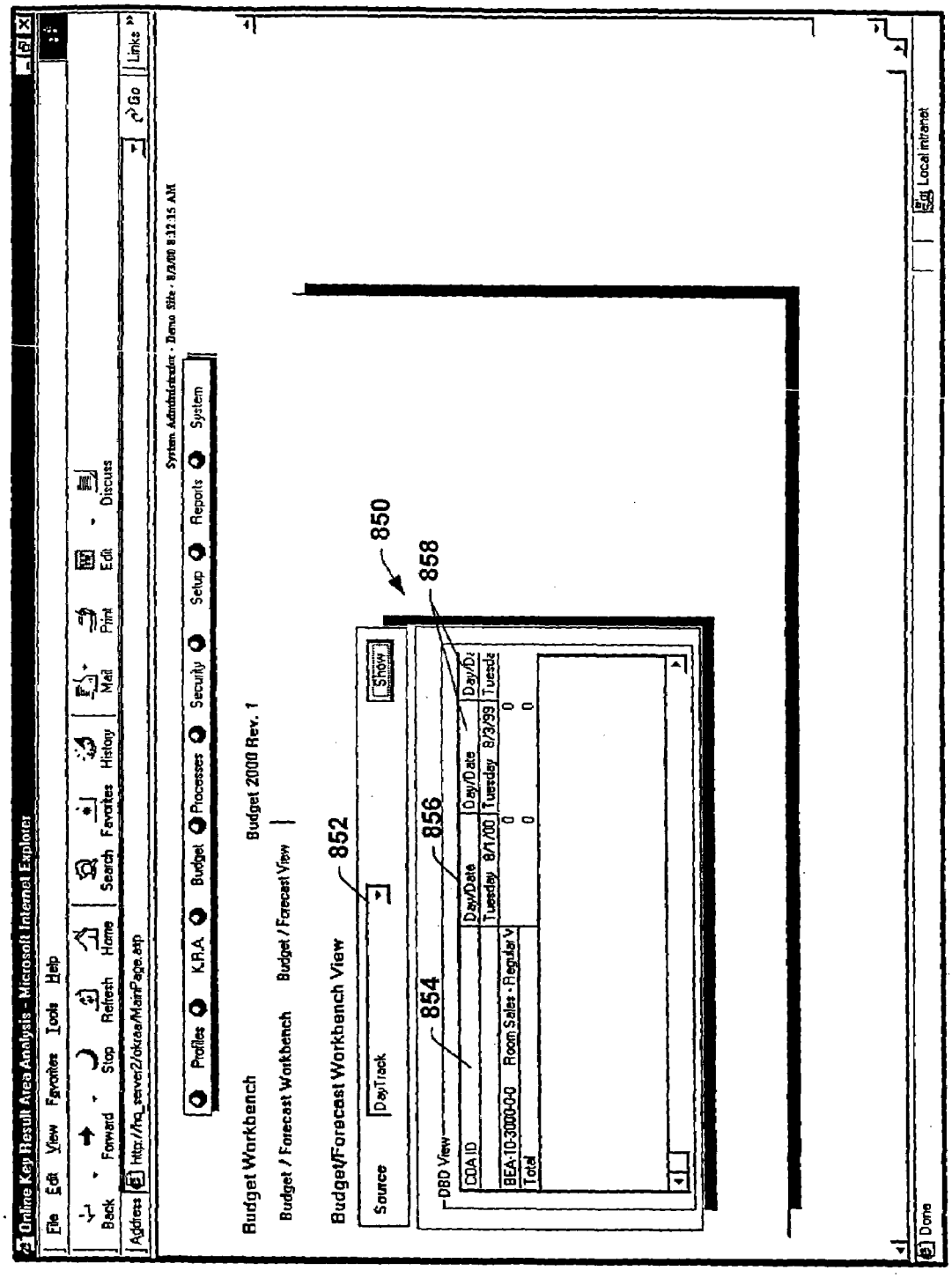
FIG. 25B is an example of a graphical user interface that may be employed to view work bench results in accordance with the present invention.

In the example of FIG. 25B, a view comparison is displayed for Budget 2000 Rev. 1, in a side-by-side comparison with the corresponding budget/forecast for each selected account for one or more previous years (e.g., a three year comparison). Accordingly, the data associated with each account identified in the budget parameters is displayed next to budget data for three previous years. Accordingly, a user may compare an intermediate budget that a user is preparing with the previous budget/forecast data to determine whether the numbers so far appear in line with the historical numbers from the three previous years. If the user is not satisfied with the results the user simply may switch back to the work bench manager GUI 800 that is shown in FIG. 25a and make changes to one or more budget parameters to adjust the budget data accordingly. This process may be repeated to perform the "what if" analysis described above. Once the budget is satisfactory to the user, the user may select a finish action button 860 in the GUI 800.

Figure 25C:
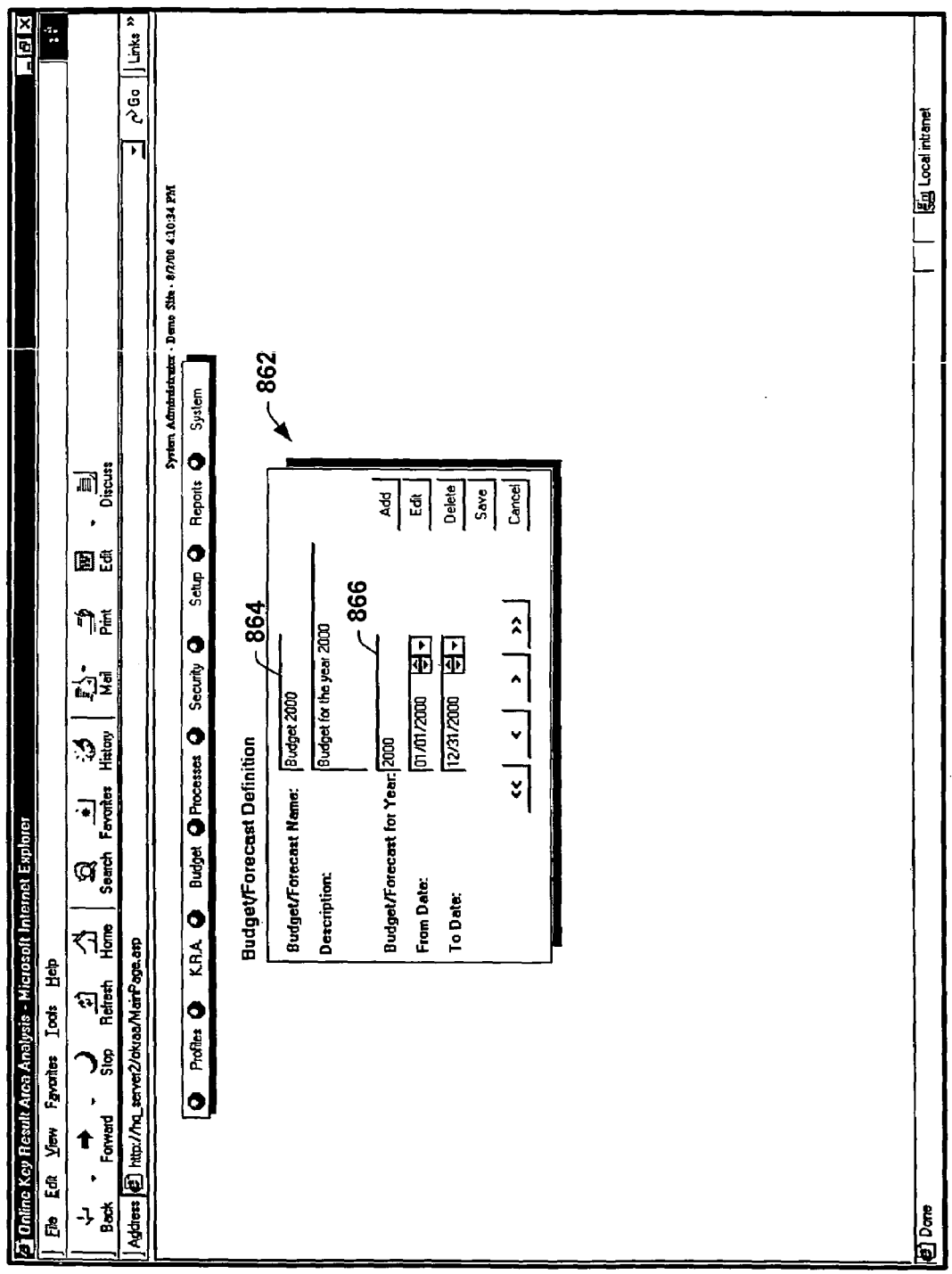
FIG. 25C is an example of a graphical user interface that may be employed to define budgeting/forecasting parameters in accordance with the present invention.

FIG. 25c illustrates an example of a GUI 862 that may be employed to set up and identify a budget for a desired year. The GUI 862 includes fields 864 for entering a budget name and a description thereof. Another user interface element 866 is provided for entering a year for the budget/forecast identified at 864. In addition, a user may specify a date range for which the budget is to be computed at 868. All data associated with this budget will then be stored in system memory.

After the budget/forecast data has been finalized, a user may activate a synchronization process for a selected budget/forecast ID covering an account type and a selected currency unit. A user also may specify an account range and a date range for which budget/forecast data is to be synchronized.

In view of the foregoing, the work bench component 174 provides a centralized interface that provides a powerful tool with which a user may view selected aspects of the budget. Moreover, a user may selectively modify KRAs, action plans, calendars, calendar attributes, methods, and/or profiles and be provided can visual indication via the user interface as to how each such change may affect the current budget and/or forecast. As mentioned above, modification of a single parameter may have a resounding impact on numerous aspects of a budget. The work manager 760, in conjunction with the other component managers, simplifies the entry of such changes into a budget and may provide a nearly instantaneous result for such changes on an entire budge. Furthermore, multiple budgets (or aspects thereof) may be displayed to a user via the user interface 762 for a side-by-side comparison. As a result, a user may easily fine tune budget characteristics so as to maximize profits.

System Environment

Figure 26:
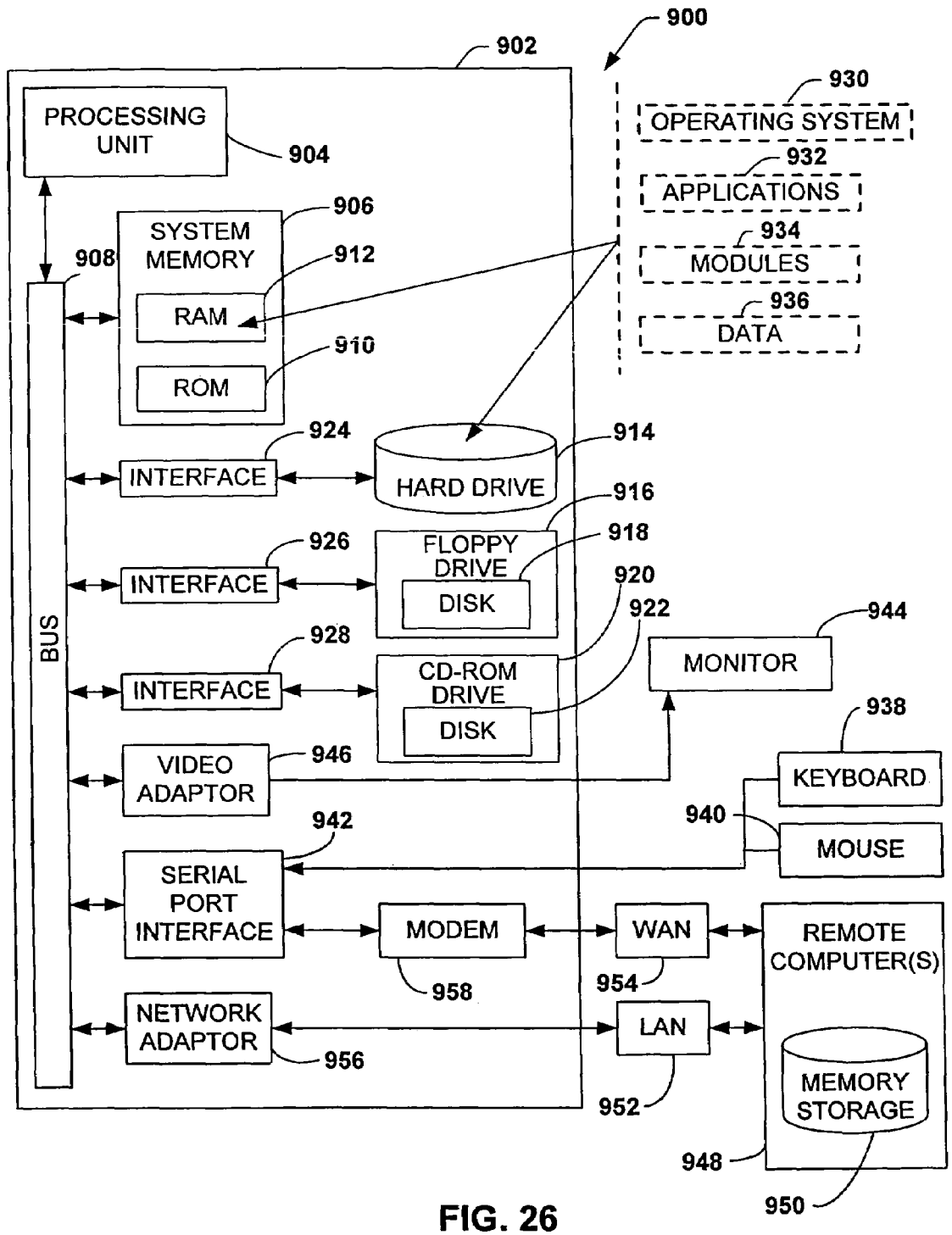
FIG. 26 is an example of an operating environment in which a system in accordance with the present invention may be implemented.

In order to provide additional context for various aspects of the present invention, FIG. 26 and the following discussion are intended to provide a brief, general description of a suitable computing environment 900 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc. that perform particular tasks or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference to FIG. 26, an exemplary environment 900 for implementing various aspects of the invention includes a server computer 902, including a processing unit 904, a system memory 906, and a system bus 908 that couples various system components including the system memory to the processing unit 904. The processing unit 904 may be any of various commercially available processors, including but not limited to Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 904.

The system bus 908 may be any of several types of bus structure including a memory bus or memory controller, a peripheral bus, and a local bus using any of a variety of conventional bus architectures such as PCI, VESA, Microchannel, ISA, and EISA, to name a few. The server computer 902 memory includes read only memory (ROM) 910 and random access memory (RAM) 912. A basic input/output system (BIOS), containing the basic routines that help to transfer information between elements within the server computer 902, such as during start-up, is stored in ROM 910.

The server computer 902 further includes a hard disk drive 914, a magnetic disk drive 916, e.g., to read from or write to a removable disk 918, and an optical disk drive 920, e.g., for reading a CD-ROM disk 922 or to read from or write to other optical media. The hard disk drive 914, magnetic disk drive 916, and optical disk drive 920 are connected to the system bus 908 by a hard disk drive interface 924, a magnetic disk drive interface 926, and an optical drive interface 928, respectively. The drives and their associated computer-readable media provide nonvolatile storage of data, data structures, computer-executable instructions, etc. for the server computer 902, including for the storage of broadcast programming in a suitable digital format. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 912, including an operating system 930, one or more application programs 932, other program modules 934, and program data 936. The operating system 930 in the illustrated computer is, for example, the "Microsoft Windows NT" operating system, although it is to be appreciated that the present invention may be implemented with other operating systems or combinations of operating systems, such as UNIX, LINUX, etc.

A user may enter commands and information into the server computer 902 through a keyboard 938 and a pointing device, such as a mouse 940. Other input devices (not shown) may include a microphone, an IR remote control, a joystick, a game pad, a satellite dish, a scanner, or the like. These and other input devices are often connected to the processing unit 904 through a serial port interface 942 that is coupled to the system bus 908, but may be connected by other interfaces, such as a parallel port, a game port, a universal serial bus ("USB"), an IR interface, etc. A monitor 944 or other type of display device is also connected to the system bus 908 via an interface, such as a video adapter 946. In addition to the monitor, a computer typically includes other peripheral output devices (not shown), such as speakers, printers etc.

The server computer 902 may operate in a networked environment using logical connections to one or more remote computers 948. The remote computer 948 may be a workstation, a server computer, a router, a personal computer, microprocessor based appliance (e.g., a palm computer), a peer device or other common network node, and typically includes many or all of the elements described relative to the server computer 902, although, for purposes of brevity, only a memory storage device 950 is illustrated in FIG. 26. The logical connections depicted in FIG. 26 include a local area network (LAN) 952 and a wide area network (WAN) 954. Such networking environments are commonplace in offices, enterprise-wide computer networks, intranets and the Internet.

When used in a LAN networking environment, the server computer 902 is connected to the local network 952 through a network interface or adapter 956. When used in a WAN networking environment, the server computer 902 typically includes a modem 958, or is connected to a communications server on the LAN, or has other means for establishing communications over the WAN 954, such as the Internet. The modem 958, which may be internal or external, is connected to the system bus 908 via the serial port interface 942. In a networked environment, program modules depicted relative to the server computer 902, or portions thereof, may be stored in the remote memory storage device 950. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the server computer 902 or remote computer(s) 948, unless otherwise indicated. Such acts and operations are sometimes referred to as being computer-executed. It will be appreciated that the acts and symbolically represented operations include the manipulation by the processing unit 604 of electrical signals representing data bits which causes a resulting transformation or reduction of the electrical signal representation, and the maintenance of data bits at memory locations in the memory system (including the system memory 906, hard drive 914, floppy disks 918, CD-ROM 922) to thereby reconfigure or otherwise alter the computer system's operation, as well as other processing of signals. The memory locations where such data bits are maintained are physical locations that have particular electrical, magnetic, or optical properties corresponding to the data bits.

In view of the foregoing structural and functional features described above, methodologies in accordance with various aspects of the present invention will be better appreciated with reference to FIGS. 27-35. While, for purposes of simplicity of explanation, the methodologies of FIGS. 27-35 are shown and described as a series of steps, it is to be understood and appreciated that the present invention is not limited by the order of steps, as some steps may, in accordance with the present invention, occur in different orders and/or concurrently with other steps from that shown and described herein. Moreover, not all illustrated steps may be required to implement a methodology in accordance with an aspect the present invention.

Figure 27:
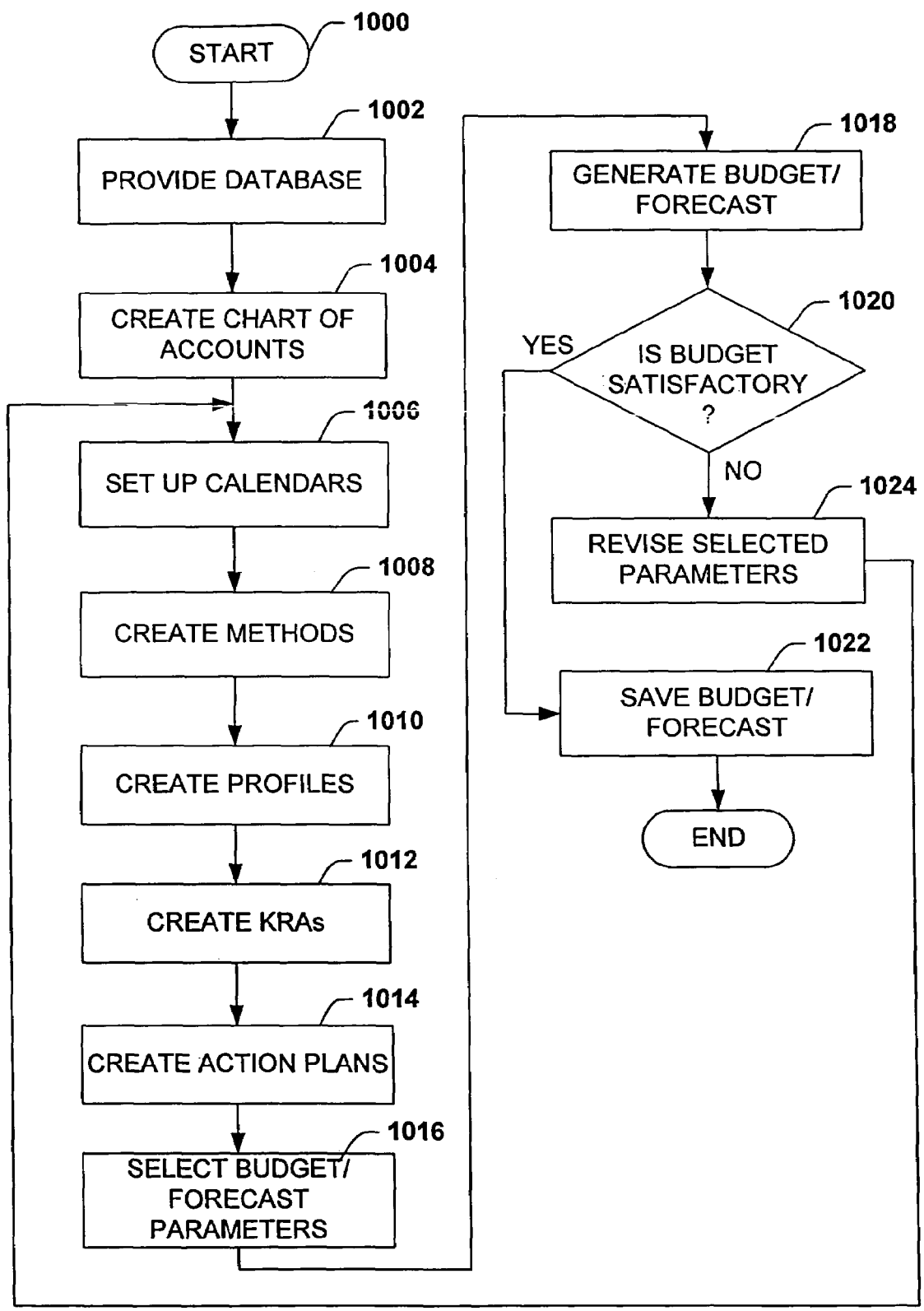
FIG. 27 is a flow diagram illustrating a basic methodology to implement budgeting and/or forecasting in accordance with the present invention.

FIG. 27 is a flow diagram illustrating a methodology to facilitate budgeting, forecasting, business planning and/or analysis in accordance with an aspect of the present invention. As set forth above, a methodology in accordance with the present invention, may be implemented as computer executable instructions embodied in a computer readable medium that may run on a computer, such as a server or another computer. The process begins at step 1000 in which parameters associated with the methodology are initialized and appropriate flag conditions are set to their starting values. The process proceeds to step 1002 in which a chart of accounts is created. As mentioned above, a chart of accounts is a list, such as may be stored in a table, that defines account entries associated with a particular aspect or operating characteristic of a facility or a group of facilities or business units.

Next, at step 1004, a database is generated. The database may include records collected from a plurality of data sources and translated into a desired consistent record format, such as described above with respect to FIG. 1. The database includes records in a consistent format, such as the OKRAA format described herein, which may be include both collected and computed data. The process then proceeds to step 1006.

At step 1006, one or more calendars are set up. A budgeting calendar may be any duration, such as a single day, a month, a fiscal quarter, a year, or any other time period for which data may have been acquired or which may otherwise be pertinent to budgeting/forecasting. Additionally, the calendar may include a period of one or more identified days that may include events, holidays, convention dates, renovations, etc. Each identified day may have one or more designated account attributes associated with the days that may affect a budgeting or forecasting process.

Next, the process proceeds to step 1008 in which one or more methods are created. As mentioned above, such methods may be predefined and/or a user may create methods that establish rules or formulas that define how data is to be retrieved and how an impact or other useful information may be extracted from the retrieved data. From step 1008 the process proceeds to step 1010 in which one or more profiles are created. A profile may be created by a user to model circumstances or situations that may affect on operations at a facility or an operating unit thereof. By way of example, profiles may model competition in an area, certain attractions local to an area, the weather in the local area, a foreign economy that may affect local tourism and, in turn, one or more aspects of a facility, etc. Each profile provides a qualitative and/or quantitative analysis of the circumstances that are profiled, from which a user may, in turn, generate one or more KRAs to achieve a desired result with respect to each profile and/or one or more action plans that provide a qualitative and/or quantitative indication of the impact associated with achieving a desired result.

From step 1010, the process proceeds to step 1012 in which one or more KRAs are created. As mentioned above, a KRA may be independent or it may be associated with a profile and/or one or more action plans. Each KRA includes data characterizing a desired result with an impact value associated with an account identified in the KRA data. A KRA also may have a method (step 1008) associated with the KRA to derive an impact based on application of the method to stored data (collected data and/or computed data). From step 1012 the process proceeds to step 1014.

At step 1014, one or more action plans are created. As mentioned above, an action plan may be independent or it may be tied to one or more profiles and/or KRAs. Each action plan includes an impact parameter that quantifies the impact (e.g., cost) on the budgeting and/or forecasting process associated with implementing an action plan. As mentioned above, however, the impact value may be zero. Moreover, an action plan may employ a method (such as created at step 1008) to determine the impact (e.g., a cost—labor, dollars, etc.) associated with implementing the respective action plan.

Next, at step 1016, budgeting/forecasting parameters are selected to define the characteristics for which a user desires to generate a budget and/or forecast. Such parameters may include a date or date range, a range of accounts in the COA to which the user may desire to limit the budget, as well as other parameters associated with the budgeting/forecasting process. From step 1016, the process proceeds to step 1018 in which a budget/forecast is generated based upon the parameters and data associated with steps 1002 through 1016. By way of example, a graphical user interface may display a plurality of attributes for the budget which a user may view and if desired modify selected attributes or components that provide corresponding attributes to create additional revisions in accordance with an aspect of the present invention. From step 1018 the process proceeds to step 1020, in which a determination is made, suitably by the user, as to whether the budget/forecast appears satisfactory. If the budget is satisfactory, the process proceeds to step 1022 in which the associated data is saved, such may be identified as a revision of a particular budget/forecast. From step 1022, the process ends. If the determination at step 1020 is negative, indicating that the budget is not satisfactory, the process proceeds to step 1024.

At step 1024, a user may revise selected parameters, such as by employing a user interface associated with an appropriate tool (e.g., the work bench). By way of example, the user may redefine one or more calendars associated with the budget, such as by entering or modifying calendar attributes (special days and accounts associated therewith). Additionally or alternatively, a user may create additional profiles and, in turn, create additional KRAs and/or action plans associated with the new profiles. The user also may create or modify KRAs or action plans independently of profiles. A user also may enter manual changes for a selected account, in response to which a system-generated KRA may be created. When a user modifies an aspect of the budget an auto-generate feature automatically may calculate new budget/forecast data. The process eventually returns to step 1022 in which the user determines whether the budget is satisfactory. Once the budget is satisfactory the process may end.

As a result, the methodology of FIG. 27 provides a powerful budgeting and/or forecasting tool that enables the user to derive budgets or forecasts for a facility, a group of facilities or business units within one or more facility that are capable of reflecting the impact of the internal operating data within the facilities or business units in conjunction with the impacts associated with external factors. Moreover, the methodology enables a user to achieve desired results and implement actual action plans and to monitor their impact on the budget and/or forecast. The process may be implemented with respect to any level of time period (e.g., from a day to a year) and with respect to any range of accounts (e.g., from a single account to all accounts) for a company or a business unit thereof.

Figure 28:
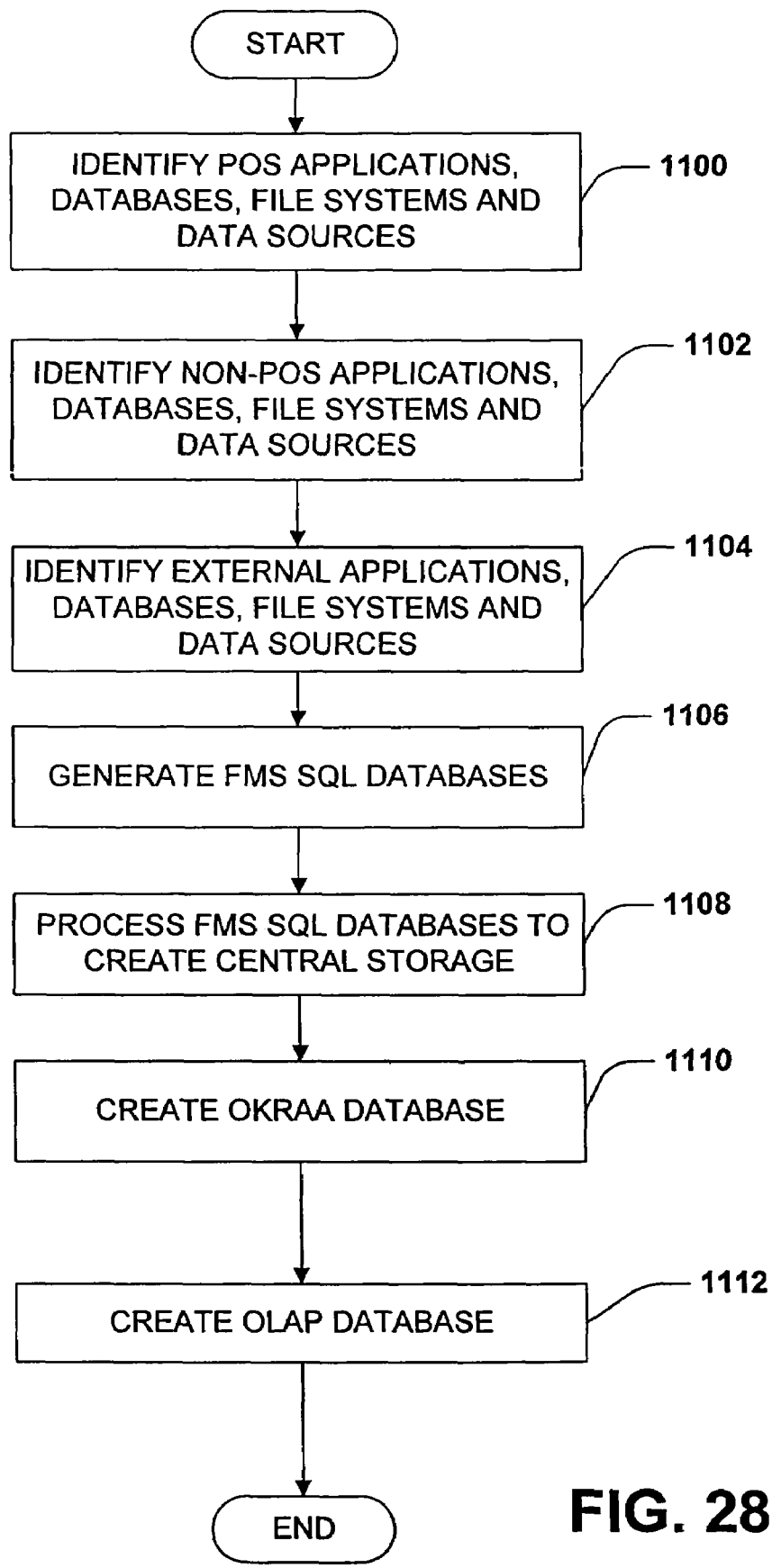
FIG. 28 is a flow diagram illustrating a methodology for creating a database of records in a desired format in accordance with the present invention.

Turning now to FIG. 28, a methodology for creating an OKRAA database and an OLAP database in accordance with one aspect of the present invention is flow charted. At step 1100, the point of sale applications, databases, file systems and data sources are identified. This identification can include, but is not limited to, names of the data sources, types of data in the data sources, record formats of the data sources, the account identifiers associated with the data sources, physical locations of the data sources and the computer systems supporting the data sources. Next, at step 1102, non-point of sale applications, databases, file systems and data sources are identified. This identification can include, but is not limited to, names of the data sources, types of data in the data sources, record formats of the data sources, the account identifiers associated with the data sources, physical locations of the data sources and the computer systems supporting the data sources. Next, at step 1104, the external applications, databases, file systems and data sources are identified. This identification can include, but is not limited to, names of the data sources, types of data in the data sources, record formats of the data sources, the account identifiers associated with the data sources, physical locations of the data sources and the computer systems supporting the data sources. While, for purposes of illustration, point of sale, non point of sale and external data sources are flow charted in FIG. 28, it will be understood and appreciated by those skilled in the art that other types of data sources that collect or store data that may affect a facility or any business or industry may be utilized in accordance with the present invention.

From step 1104, the process proceeds to step 1106, in which FMS SQL databases are generated. Further detail concerning step 1106 is included in FIG. 29. Next, at step 1108, the FMS SQL databases are used to populate a central storage. Next, at step 1110, the central storage is queried and processed on a scheduled and/or ad hoc basis to create an OKRAA database in accordance with the present invention. Next, at step 1112, the OKRAA database is queried and processed to create an OLAP database.

Figure 29:
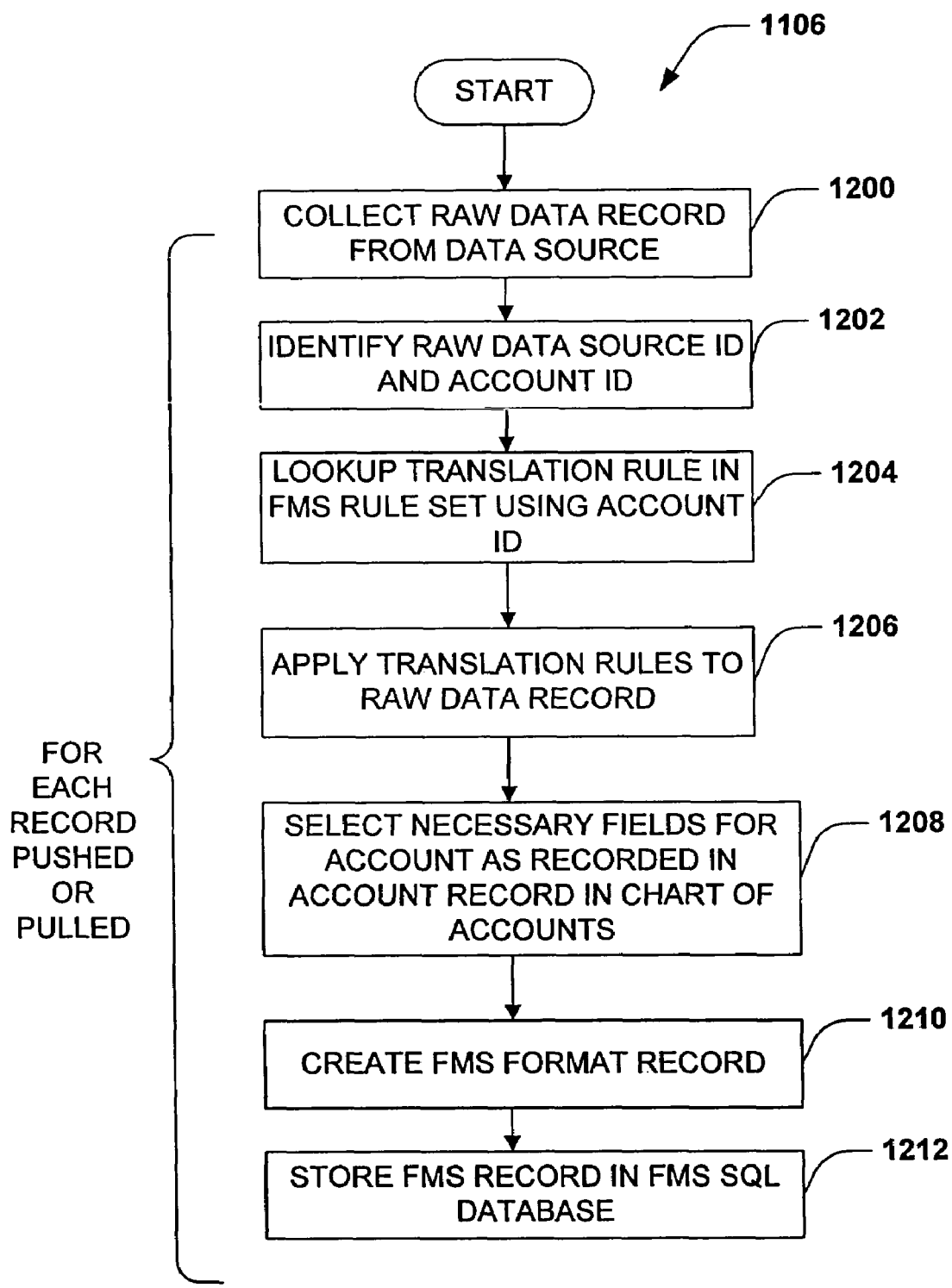
FIG. 29 is a flow diagram illustrating a part of the methodology of FIG. 28 in accordance with the present invention.

Turning now to FIG. 29, a methodology for generating FMS SQL databases in accordance with one aspect of the present invention is flow charted. For each record pushed or pulled from a data source, steps 1200 through 1212 will be performed. At step 1200 the raw data is collected from the data source. At step 1202 the source and account identifier associated with a raw data source is identified. Then at step 1204 the account identifier is used to look up the translation rules stored in an FMS rule set. After the appropriate rules are found, the process proceeds to step 1206 in which the rules are applied to the raw data to create translated data. Then at step 1208 additional fields necessary to create the desired FMS record format are created. After the data has been translated and the additional necessary fields have been created, the process proceeds to step 1210. At step 1210, an FMS format record corresponding to the collected raw data is created. Then, at step 1212, the FMS record is stored in the FMS SQL database.

Figure 30:
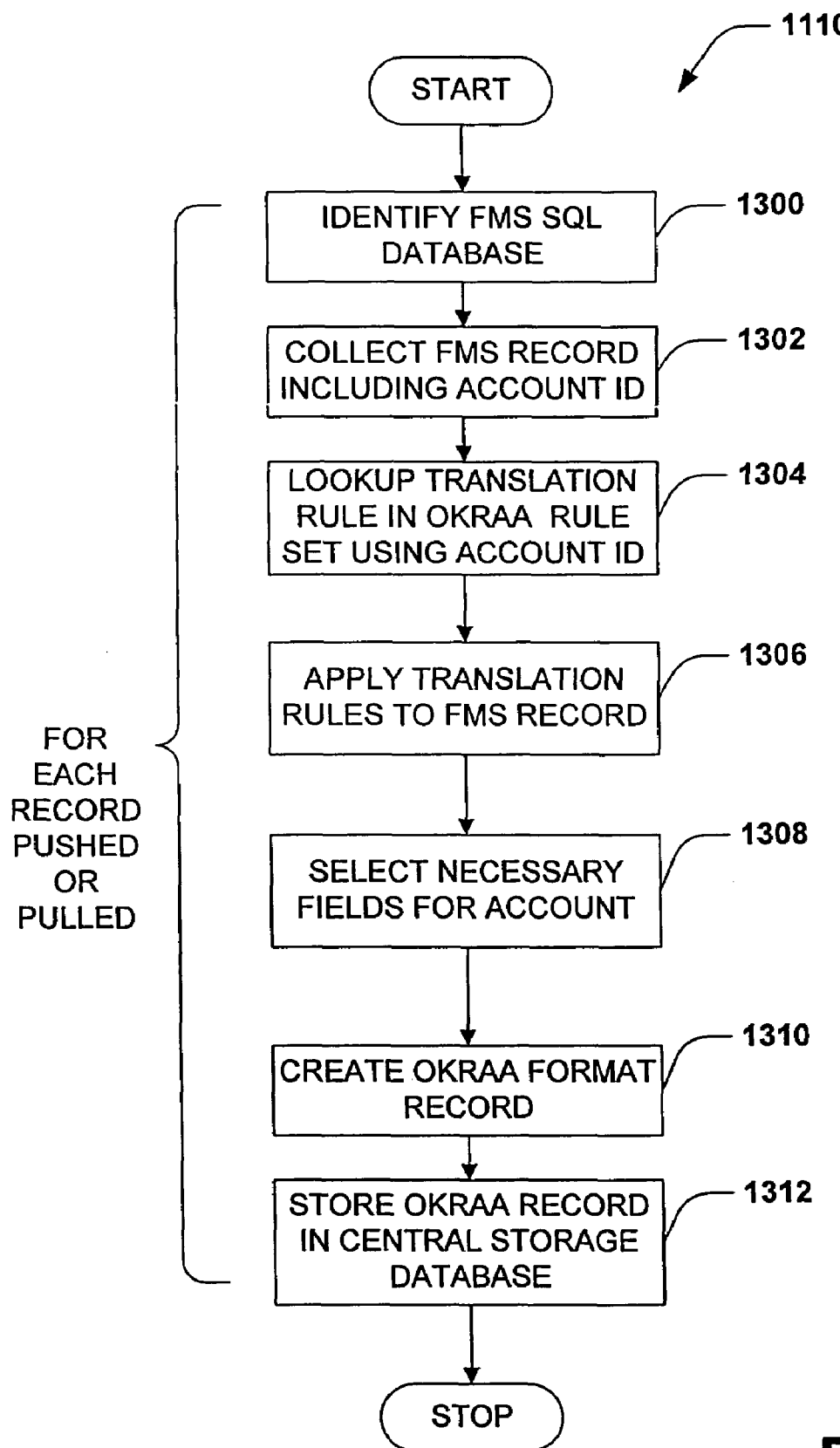
FIG. 30 is a flow diagram illustrating another part of the methodology of FIG. 28 in accordance with the present invention.

FIG. 30 illustrates a methodology for processing FMS SQL databases to create a central storage in accordance with one aspect of the present invention. For each record pushed or pulled from an SQL database, steps 1300 through 1312 will be performed. At step 1300, the FMS SQL database from which the record originated is identified. At step 1302, an FMS record, including its account identifier is retrieved. As mentioned above an account identifier can be used as a primary key to access records from one or more tables thus facilitating translation and other processing. Next, at step 1304 the account identifier is used as a key into the OKRAA rule set to lookup the translation rules to determine which rule or rules apply to this record. After the translation rules are found, the process proceeds to step 1306, in which the rules are applied to the FMS record of step 1302. After the data translations have occurred at step 1306, any additional fields required, as noted in the rule set, are created at step 1308. For example additional fields may be required to identify the source of the data, and to record creation and update information.

From step 1308 the process proceeds to step 1310 where an OKRAA format record is produced. As noted above, an OKRAA format record may include a combination of base fields and variable fields. The base fields may contain information associated with, for example, identifying a data source, identifying a transaction amount, identifying a currency type and identifying a date. The OKRAA record format is extensible to include account fields containing information associated with, for example, identifying a site, identifying a department, identifying an account, identifying a sub account and identifying a minor account. Next, at step 1312, the OKRAA format record is written to the central storage database.

Figure 31:
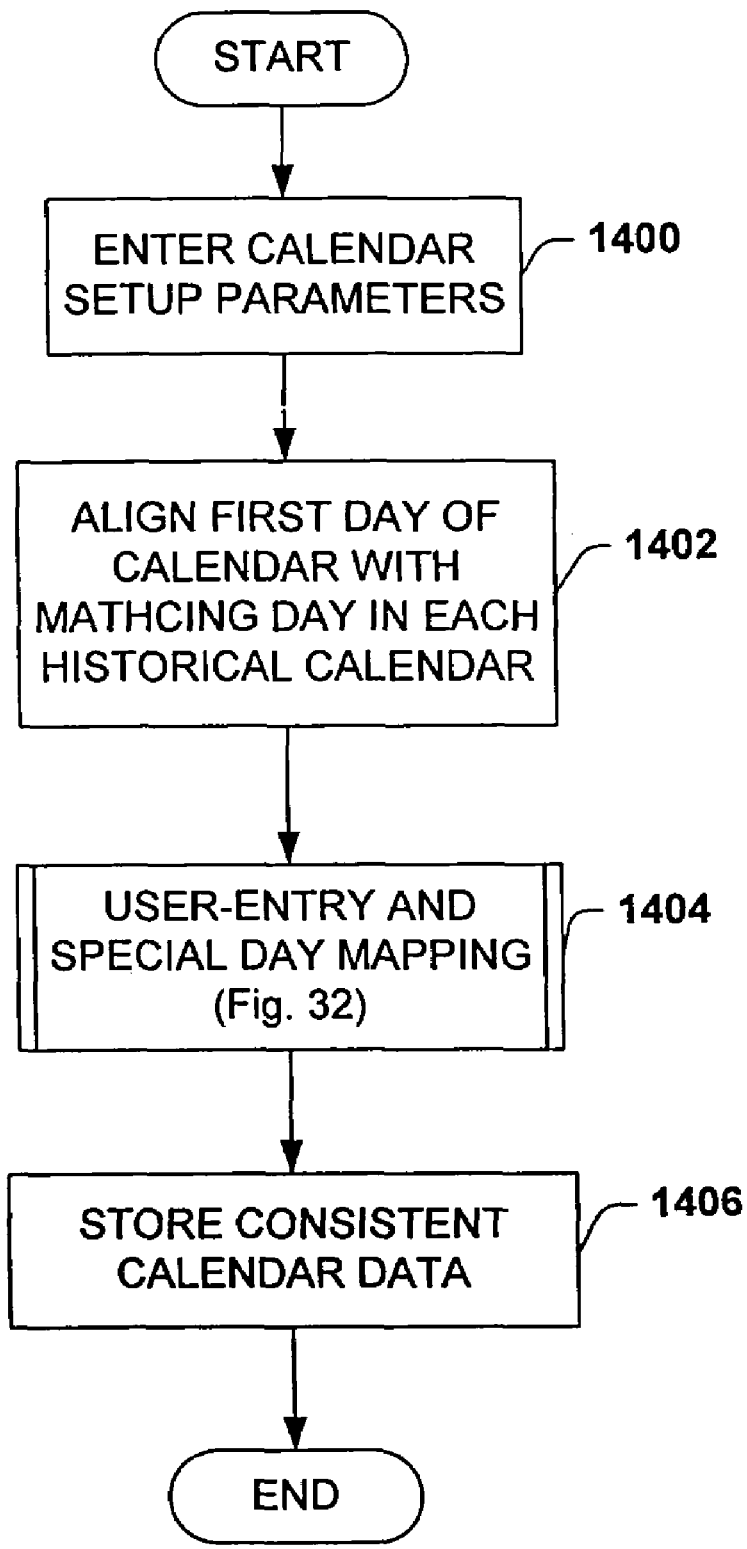
FIG. 31 is a flow diagram illustrating a methodology for generating a calendar in accordance with the present invention.
Figure 32:
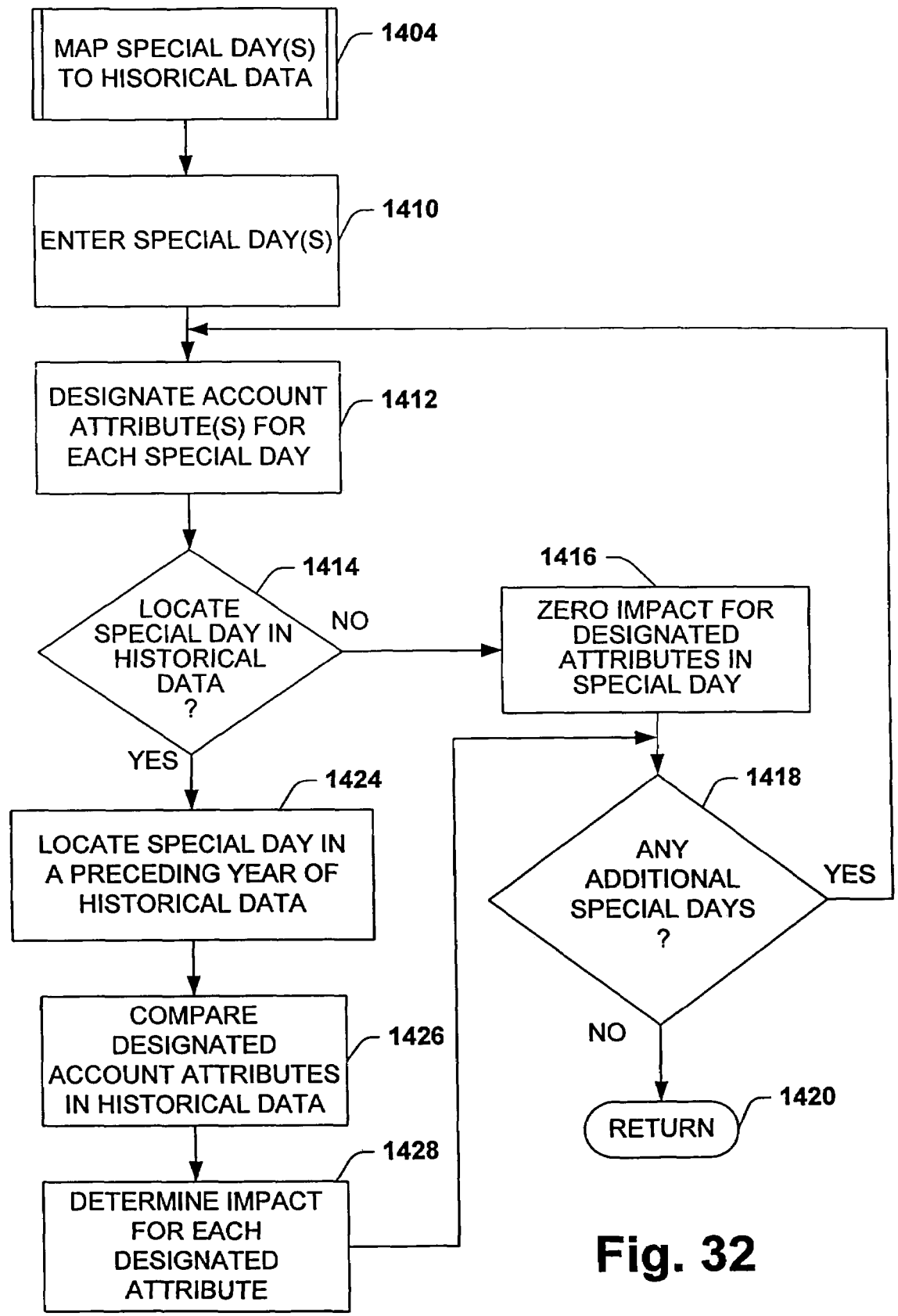
FIG. 32 is a flow diagram illustrating a part of the methodology of FIG. 31 in accordance with the present invention.

FIGS. 31 and 32 are flow diagrams that illustrate a methodology for setting various aspects of a calendar component in accordance with an aspect of the present invention. The methodology begins at step 1400, in which a user enters desired calendar set up parameters. The set up parameters may, for example, include the names, types of calendars, and calendar periods of user-defined calendars for a budget/forecast period, such as a selected year. From step 1400, the process proceeds to step 1402, in which a first day of the budget/forecast year is aligned with a like day in each historical year. For example, if a start day of a particular budget/forecast year is the second Tuesday of the year, the corresponding 365 days of each historical calendar year would utilize the second Tuesday of that year as its starting day for the corresponding calendar. In this way, the calendars are aligned by day of the week, and not the date, so as to improve upon the relevance of the historical data. This improves the reliability and accuracy of the budgeting and/or forecasting process for the various industries, such as the hospitality industry. As mentioned above, the day of the week has a significant impact in the budgeting characteristics in certain types of industries.

Next, at step 1404, a user-entry and mapping process is performed, in which each special day designated with the calendar set up data (step 1400) is mapped to corresponding historical data. The mapping process is described below with respect to FIG. 32. From step 1404, the process proceeds to step 1406 in which the consistent calendar data is stored. From step 1406 the calendar set up process ends. While the mapping and calendar alignment processes are illustrated together in FIG. 31, it is to be understood and appreciated that the two processes are independent of each other and, thus, could be implemented separately.

Referring now to FIG. 32 the process of mapping special days to the historical data (step 1404) is illustrated. From step 1404, the process proceeds to step 1410 in which the days of interest are entered, such as through a suitable user interface element (e.g., FIG. 17). Next, attributes for each special day are designated. The designation may be predefined according to the type of the special day. For example, holidays (or selected holidays) may have a particular impact on certain accounts at a facility. The effect of such special days may have been recognized over time or based on an event estimation, such as may be provided by an event coordinator. One or more accounts may be designated to derive a corresponding impact value for each respective designated account. From step 1412, the process proceeds to step 1414.

At step 1414, a determination is made as to whether the special day has been located in the historical data. By way of example, the most recent historical year may be searched (e.g., by name, description and/or other characteristics) first to determine whether the special day occurred in that year. Subsequently, if no matches are found, each proceeding year may be then searched. If the special day is not located in the historical data, the process proceeds to step 1416 in which a zero impact is assigned for the designated attributes for that special day. Additionally the historical data associated with the same site may be searched first. If the event is not located with respect to the same site, data associated with other sites may be searched to locate the identified special day, as the impact for a particular event at one site may have a substantially similar impact at a different site. From step 1416, the process proceeds to step 1418.

At step 1418, a determination is made as to whether there are any additional special days having designated attributes for which an impact value may be determined. For example, if a user wishes to enter additional days, the process proceeds to step 1412 in which the additional days are designated. If there are no additional days having such designated attributes, the process proceeds to step 1420 in which the process returns to step 1406 of FIG. 31.

If the determination at step 1414 is affirmative, indicating that the special day has been located in the historical data, the process proceeds to step 1424. At step 1424, the special day is located in a proceeding calendar year of the historical data. By way of example, if the special day is an annual event, such as an annual holiday, it may be desired to locate the two most recent adjacent years in the historical data in which the special day occurred. Once the special day has been located in two years of the historical data, the process proceeds to step 1426 in which the designated attributes for each of the years of historical data are compared. Next, at step 1428, an impact for each designated attribute is then determined based on the comparison. The impact may correspond to the change or difference in the attributes due to the circumstances associated with the special day. From step 1428 the process proceeds to step 1418. It is to be understood and appreciated that the account data associated with a single day in the historical data also could be employed to derive a corresponding impact value in accordance with an aspect of the present invention.

Figure 33:
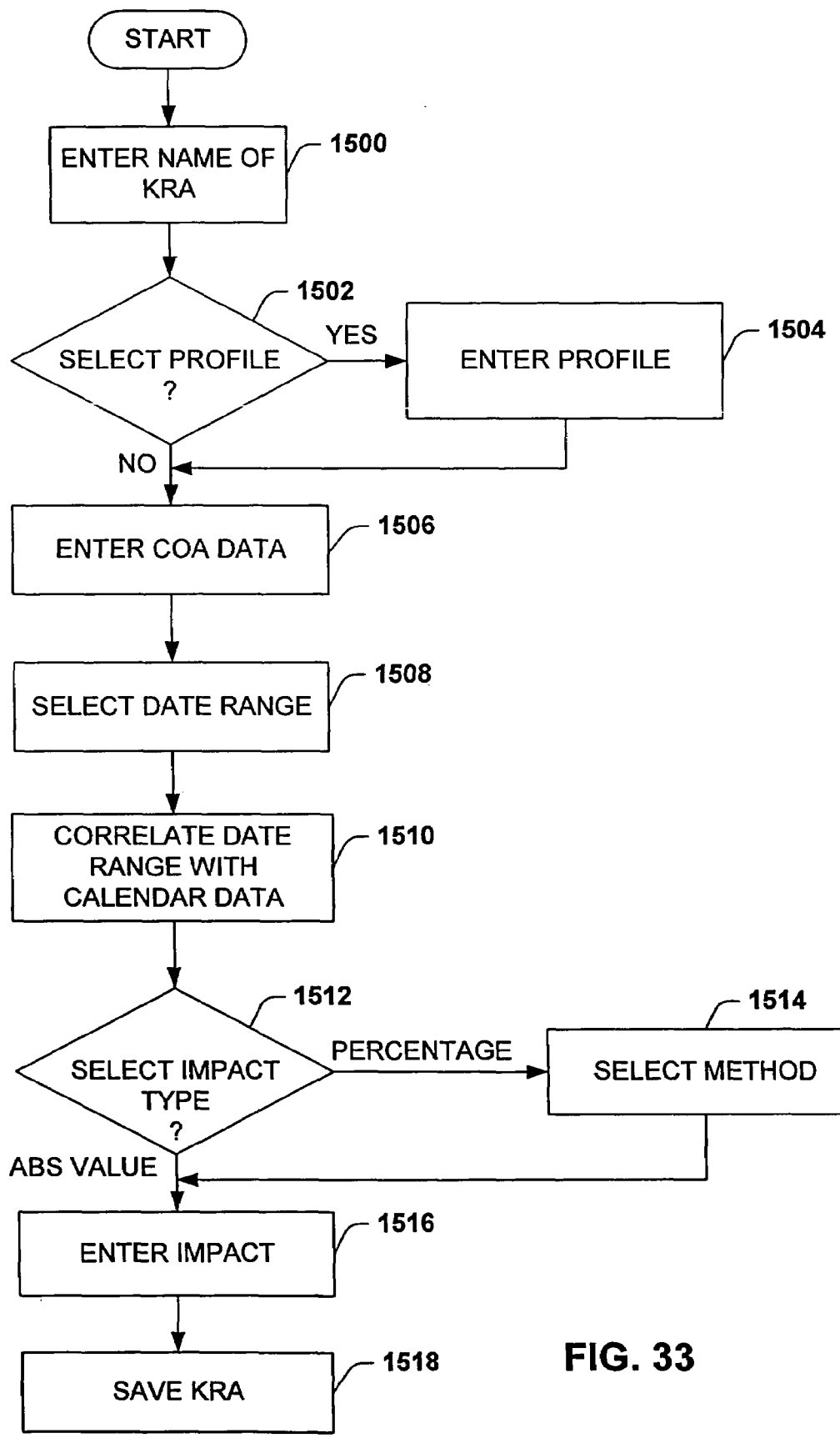
FIG. 33 is a flow diagram illustrating a methodology for creating a key result area in accordance with the present invention.

FIG. 33 is a flow diagram illustrating the methodology for generating a Key Results Area (KRA) in accordance with an aspect of the present invention. The methodology may be implemented in connection with a user interface running on a computer, such as may be operatively coupled to the server through a network infrastructure. The process begins at 1500 in which a name of the KRA is entered. Next, at step 1502 a determination is made as to whether a profile is to be selected for the KRA. If a profile is to be selected, the process proceeds to step 1504 in which the profile is entered, such as by selecting from one of a plurality of predefined profiles. From either of steps 1502 or 1504, the process proceeds to step 1506 in which selected COA data is entered. By way of example, the COA data may include a COA_ID that identifies an account of a COA or a range or set of accounts to which the KRA entered at step 1500 is to be applicable. From step 1506, the process proceeds to step 1508.

At step 1508 a date range is selected for which the KRA is to be applied. The impact value associated with the KRA thus may be applied over a certain time period in the budget/forecast process. For example, the date range may be a single day up to any time period during which the desired result is to be achieved. Next, at step 1510, the selected date range is correlated with the calendar data stored in the database. In this way, the KRA will be applied to each day in the calendar that corresponds to a day in the selected date range. From step 1510 the process proceeds to step 1512.

At step 1512, a determination is made as to whether the impact type is to be an absolute value impact or a percentage impact type. As mentioned above, an absolute value impact type corresponds to a value of impact having units indicative of the characteristic of the attribute or attributes for which a result is desired. If a percentage impact type is selected, the process proceeds to step 1514 in which a user may select a method to be applied in conjunction with the KRA being created. From either step 1512 or 1514 the process proceeds to step 1516. It is to be understood and appreciated by those skilled in the art that a method also could be applied to other types of impact in accordance with an aspect of the present invention.

At step 1516 an impact value is entered. The impact value corresponds to the impact type selected at step 1512. For example, if an absolute value impact type is selected, the impact value will have units of a type that correspond to the attribute for which a result is desired. For a rooms sold attribute, for example, an absolute value impact type will have a number characterizing a desired increase or decrease in the number of rooms sold, whereas a percentage impact type would be a percent increase or decrease in the rooms sold. From step 1516, the process proceeds to step 1518 in which the KRA data is saved.

Figure 34:
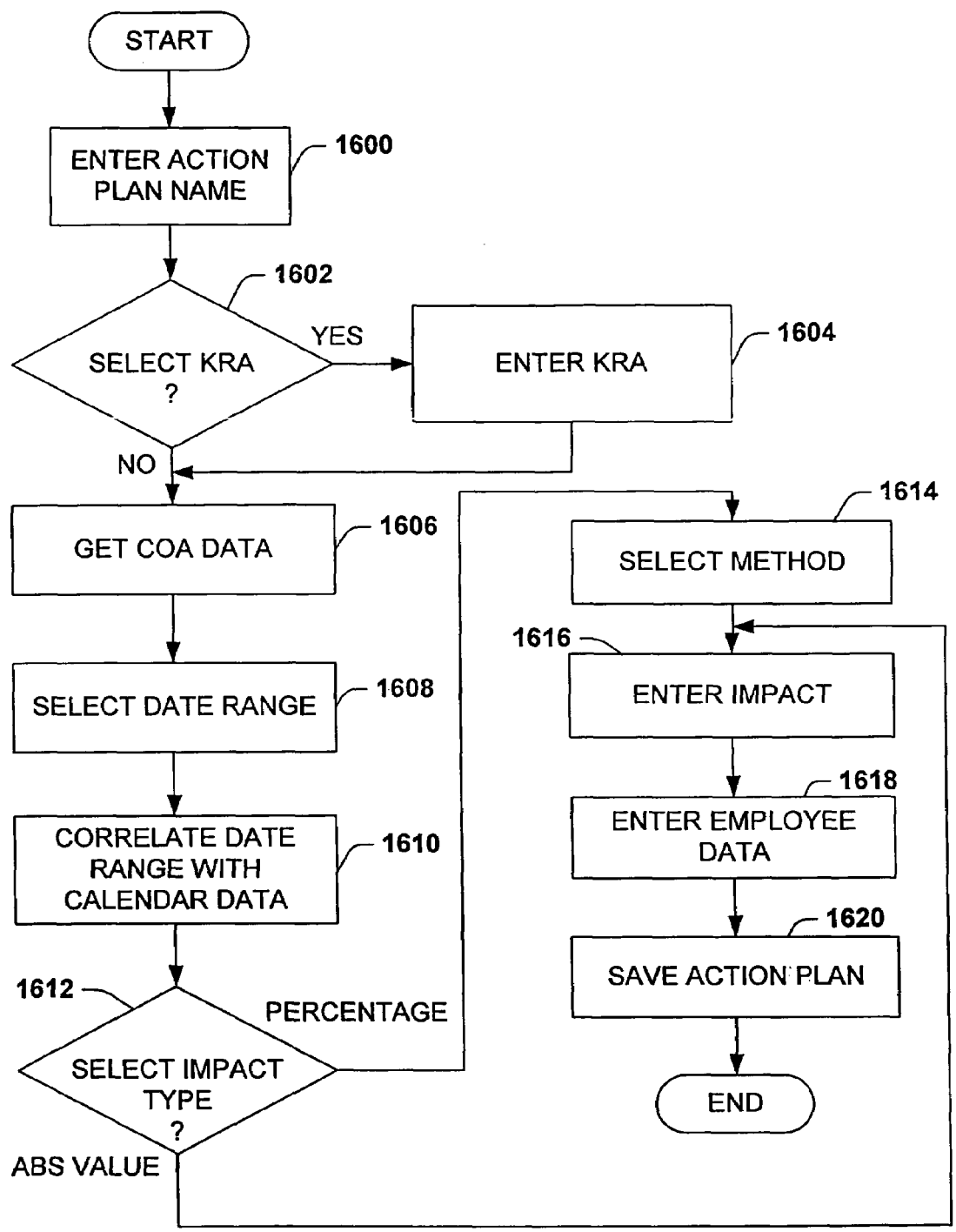
FIG. 34 is a flow diagram illustrating a methodology for creating an action plan in accordance with the present invention.

FIG. 34 is a flow diagram illustrating the methodology for generating an action plan in accordance with an aspect of the present invention. The process begins at 1600 in which a name of the action plan is entered. Next, at step 1602 a determination is made as to whether a KRA is to be selected for the action plan. If a KRA is to be selected, the process proceeds to step 1604 in which the KRA name is entered, such as by selecting from one of a plurality of predefined KRAs. From either of steps 1602 or 1604, the process proceeds to step 1606 in which selected COA data is entered. By way of example the COA data may include a COA_ID that identifies an account of a COA or a range or set of accounts to which the action plan entered at step 1600 is to be applicable. From step 1606, the process proceeds to step 1608.

At step 1608, a date range is selected over which the action is to be applied. For example, the date range may be a single day up to any time period during which the objective or goal is to be achieved. Next, at step 1610, the selected date range is correlated with the calendar data stored in the database. In this way, the action plan may be applied to each day in a calendar that corresponds to a day in the selected range. From step 1610 the process proceeds to step 1612.

At step 1612, a determination is made as to whether the impact type is to be an absolute value impact or a percentage impact type. If a percentage impact type is selected, the process proceeds to step 1614 in which a user may select a method to be applied in conjunction with the action plan being created. It is to be understood and appreciated by those skilled in the art that a method also could be applied to other types of impact in accordance with an aspect of the present invention. From either step 1612 or 1614 the process proceeds to step 1616.

At step 1616 an impact value is entered. The impact value corresponds to the impact type selected at step 1612. For example, if an absolute value impact type is selected, the impact value will have units of a type that corresponds to the account affected by implementing the objective of the action plan. For an increased local advertising attribute, for example, an absolute value impact type will have a number corresponding to a dollars amount of advertising associated with the cost of implementing the identified advertising, whereas a percentage impact type would be a percent increase in the associated advertising budget.

From step 1616, the process proceeds to step 1618 in which employee data is entered. The employee data may include an employee name or business unit to which the action plan is assigned. The employee data, for example, may be obtained from an associated employee database, such as maybe associated with a payroll processing software package or which may be part of the OKRAA database. The action plan data further may indicate the status (active or inactive) of each action plan as well as contain information about the progress of the action plan so that the employee assigned the plan (and/or the employee's supervisors) may monitor its progress. From step 1618, the process proceeds to step 1620 in which the action plan is saved.

Figure 35:
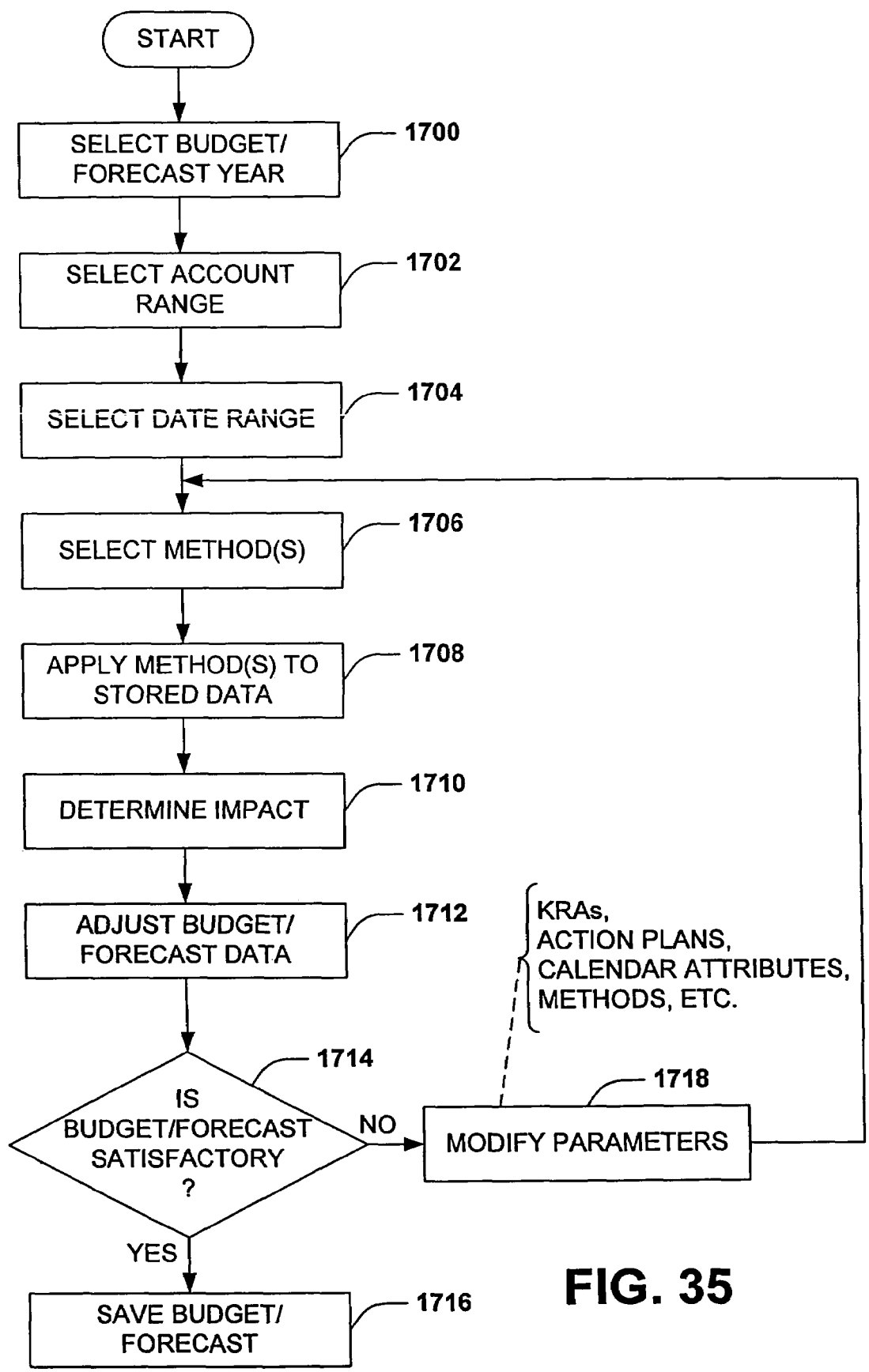
FIG. 35 is a flow diagram illustrating a methodology for utilizing a work bench component in accordance with an aspect of the present invention.

FIG. 35 illustrates a methodology for implementing a budget work bench process in accordance with an aspect of the present invention. The budget work bench may, in accordance with an aspect of the present invention, be implemented as computer executable instructions that provide a GUI to facilitate budgeting, forecasting, planning, trend analysis, or other evaluation of a business or industry.

The budget process begins at step 1700 by selecting a budget/forecast year for which the process is to be applied. Next, at step 1702, an account range is entered for which the work bench process is to be applied. The account range may be as small as one account or as many as all accounts in the COA. Similarly, selected accounts may be grouped by an accumulator. At step 1704, a date range is entered for which the budget/forecast process is to be applicable.

The process proceeds to step 1706, in which one or more methods are retrieved for each identified account for performing the budget analysis. As mentioned above, the methods may be selectable, such as by employing a method GUI by which a base method is associated with a particular account ID for a particular type of currency or unit. A reference method also may be associated with each account for computing a reference data that may be employed in a comparative analysis for each account. From step 1706, the process proceeds to step 1708 in which the methods are applied to the stored data, which may include historical and computed data, for each selected account.

At step 1710, an impact is calculated based on, for example, one or more KRAs associated with each selected account, one or more action plans that may be associated with each such account, one or more calendar attributes that may be associated with such accounts, as well as other system generated KRAs. As a result, the impact may be an aggregation of a plurality of impact values for each account. Next, at step 1712, the budget/forecast for each selected account is generated based on the aggregate impact value and the based method applied to each respective account.

Next at step 1714, a determination is made, such as by the user, as to whether to modify the budget parameters. The computed budget/forecast data may be displayed locally to the user, such as through an appropriate GUI. A user may in turn view the data alone or as compared to budget data from one or more previous years, such as associated with a work bench view component. A user also may endeavor to modify certain budget/forecast constraints to see whether a better more effective budget may be determined (e.g., the What if analysis). If the determination at step 1714 is affirmative, indicating that the user does not desire to modify the budget/forecast, the process proceeds to step 1716. At step 1716, the current budget/forecast may be save. If, however, the user desires to modify one or more parameters of the budget/forecast process, the process proceeds to step 1718 in which such modifications are made. From step 1718, the process may return to step 1706 so that the foregoing process is repeated to recalculate the budget/forecast data based on the modifications. As mentioned above, a user may modify one or more KRAs, one or more action plans, and/or one or more calendar attributes. A user also may modify methods associated with an account in order to derive more accurate and effective budget data. Once the budget appears satisfactory to a user, the user may save to the budget/forecast (step 1716), such as a revision, for that budget ID.

What has been described above includes one or more examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Furthermore, to the extent that the terms "includes" and variations thereof and "having" and variations thereof are used in either the detailed description or the claims, such term is intended to be inclusive in a manner similar to the term "comprising."

What is claimed is:

1. An interactive budget and forecast system comprising:
   one or more chart of accounts to retain hierarchical data concerning accounts that describe various aspects of a business, the one or more chart of accounts are sortable by date;
   a calendar alignment component that defines a starting time period in a selectable calendar time period;
   the calendar alignment component locates a time period that matches the defined starting time period of the selectable calendar time period;
   the calendar alignment component is programmed to align a plurality of time periods associated with the retained data relative to the defined starting day of the selectable calendar time period such that each day in each of the plurality of time periods is matched and aligned with a corresponding day in the calendar time period to facilitate day-by-day analysis of the retained data for each respective day in the plurality of time periods matched and aligned with the corresponding day in the calendar time period;
   the calendar alignment component is programmed to align the plurality of time periods associated with the retained data relative to the defined starting day of the selectable calendar time period such that each corresponding day is a same day of the week as each respective day aligned thereto, and where at least one day in the calendar time period has an account attribute associated therewith that affects the operating characteristics of a business, the account attribute corresponds to an external event; and
   a processor that executes the calendar alignment component.

2. The system of claim 1, the starting day is a day of the week including one of Monday, Tuesday, Wednesday, Thursday, Friday, Saturday, and Sunday.

3. The system of claim 2, a user designates an account attribute associated with at least one day in the calendar time period.

4. The system of claim 2, the system further comprising an attribute function programmed to determine an impact value for the account attribute as a function of an account attribute value associated with a corresponding day in at least one year of data.

5. The system of claim 1, the event is at least one of a holiday, a convention, a sporting event, a festival, a concert, an attraction, weather, news, and a renovation.

6. The system of claim 4, the impact value for the account attribute affects a plurality of hierarchically linked accounts in the chart of account.

7. The system of claim 6, further comprising a key result area that generates data for each account attribute, the data includes a key result impact value corresponding to the attribute impact value.

8. The system of claim 1, each of the plurality of time periods in the retained data includes a plurality of data records arranged by associated date fields, the calendar alignment function employs the date fields to locate data records having a date field corresponding to a day that is a same day of the week as the starting day of the calendar time period.

9. The system of claim 8, the calendar time period is a user selectable period having a selectable calendar orientation that defines incremental intervals of the calendar time period, a process generating data for at least one account for each incremental interval of the calendar orientation in the calendar time period.

10. A computer implemented method of managing a business comprising:
    electronically storing lowest level business data hierarchically linked in one or more charts of accounts;
    employing a processor for defining a lowest level unit of time associated with the business data;
    defining a beginning unit of time in a selectable time period;
    locating a unit of time in each of a plurality of time periods associated with the stored data that matches the defined beginning unit of time of the selectable time period, the stored data including a plurality of records stored by time; and
    aligning each of the plurality of time periods of the stored data so that each of the plurality of time periods has a starting unit of time that matches the defined beginning unit of time of the selectable period, whereby each unit of time associated with each of the plurality of time periods is aligned with a corresponding unit of time of the selectable period to facilitate time unit data analysis for each respective unit of time in the plurality of time periods aligned with the corresponding unit of time in the time period, the beginning unit and a beginning corresponding unit of time are the same lowest level unit of time.

11. The method of claim 10, further comprising importing data into a chart of accounts.

12. The method of claim 10, further comprising associating an attribute with at least one unit of time in a time period.

13. The method of claim 12, further comprising generating an impact value for the attribute as a function of the attribute value.

14. The method of claim 13, the impact value affects a plurality of accounts in the chart of accounts by virtue of account dependency.

15. The method of claim 10, the unit of time is a single day.

16. The method of claim 15, aligning units of time comprises:
    defining a starting day in a selectable time period;
    locating a day in each of a plurality of time periods associated with the stored data that matches the defined starting day of the selectable time period, the stored data including a plurality of records stored by date; and
    aligning each of the plurality of time periods of the stored data so that each of the plurality of time periods has a starting day that matches a same day of the week as the defined starting day of the selectable period, whereby each day associated with each of the plurality of time periods is aligned with a corresponding day of the selectable period to facilitate daily data analysis for each respective day in the plurality of time periods aligned with the corresponding day in the time period.

17. The method of claim 16, the starting day of the selectable time period corresponds to a day of the week in a particular week in a year defined by the selectable time period.

18. The method of claim 15, further comprising associating at least one day with an account attribute, the attribute impacts at least one account and those accounts dependant thereon.

19. The method of claim 18, further comprising determining an impact value for the attribute as a function of an attribute value on a corresponding day from at least one year of stored data.

20. The method of claim 18, the account attribute corresponds to at least of a holiday, an event, a convention, a sporting event, a festival, a concert, an attraction, weather, news, and a renovation.

21. A non-transitory computer readable medium having stored thereon computer executable instructions for carrying out the method of claim 10.

22. A computer implemented budgeting and forecasting methodology comprising:
  employing a computer processor for defining parent child relationships amongst a plurality of account records in a chart of accounts, each record contains a date field, by which the plurality of account records are orderable;
  defining a starting day for a selectable time period for analysis;
  locating a matching day from the plurality of account records that is a same day of the week as the defined starting day; and
  electronically aligning the matching day associated with the plurality of account records to the defined starting day for the selectable time period such that each of the days included in the selectable time period is aligned relative to a corresponding matching day from the plurality of account records to facilitate daily data analysis of comparable data and whereby each corresponding matching day from the plurality of account records is the same day of the week as each respective associated day included in the selectable time period.

23. The method of claim 22, the time period is a day, the day being aligned with another corresponding day in a calendar time period.

24. The method of claim 23, further comprising applying an impact to one or more accounts in the chart of accounts based on a designated account attribute associated with a particular day.

25. A non-transitory computer readable medium having stored thereon computer executable instructions for carrying out the method of claim 22.

26. A computer implemented facility management methodology comprising:
  collecting data related to circumstances external to the internal operations of the facility from a plurality of data sources;
  collecting data related to the internal operations of the facility;
  populating a computer-based central database with all such data into a hierarchical chart of accounts each account record storing different aspects of data indicative of various business aspects associated with each respective account, at least one account including an account attribute that impacts the account based on collected external data;
  defining a starting day for the account data that is a same day of the week as a matching day in a selectable calendar time period;
  aligning the starting day with the matching day such that a plurality of time periods associated with the account data is matched relative to the matching day of the selectable calendar time period, whereby each day in each of the plurality of time periods is aligned with a corresponding day in the calendar time period by a day of the week such that each respective corresponding day in the calendar time period is a same day of the week as each respective day in each of the plurality of time periods aligned thereto in order to facilitate analysis of each respective day in the plurality of time periods aligned with the corresponding day in the calendar time period.

27. The method of claim 26, the external data corresponds to at least of a holiday, an event, a convention, a sporting event, a festival, a concert, an attraction, a weather forecast, news, and a renovation.

* * * * *